(12) United States Patent
Saitoh et al.

(10) Patent No.: US 11,693,278 B2
(45) Date of Patent: Jul. 4, 2023

(54) LIQUID CRYSTAL DIFFRACTION ELEMENT AND METHOD FOR PRODUCING LIQUID CRYSTAL DIFFRACTION ELEMENT

(71) Applicant: FUJIFILM Corporation, Tokyo (JP)

(72) Inventors: Yukito Saitoh, Minamiashigara (JP); Keisuke Kodama, Minamiashigara (JP); Hiroshi Sato, Minamiashigara (JP); Katsumi Sasata, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/702,909

(22) Filed: Mar. 24, 2022

(65) Prior Publication Data

US 2022/0214584 A1  Jul. 7, 2022

Related U.S. Application Data

(63) Continuation of application No. PCT/JP2020/035906, filed on Sep. 24, 2020.

(30) Foreign Application Priority Data

Sep. 25, 2019  (JP) .................. 2019-174141

(51) Int. Cl.
*G02F 1/1337*  (2006.01)
*G02F 1/1335*  (2006.01)
(Continued)

(52) U.S. Cl.
CPC .... *G02F 1/133788* (2013.01); *G02F 1/13718* (2013.01); *G02F 1/133504* (2013.01); *G02F 1/133636* (2013.01)

(58) Field of Classification Search
CPC .................................................. G02F 1/1362
See application file for complete search history.

(56) References Cited

U.S. PATENT DOCUMENTS

2006/0257586 A1  11/2006  Umeya
2012/0086903 A1*  4/2012  Escuti .................. G02F 1/1323
                                                      349/201
(Continued)

FOREIGN PATENT DOCUMENTS

JP          2006-317656 A    11/2006
WO    WO 2006/092758 A2     9/2008
(Continued)

OTHER PUBLICATIONS

International Preliminary Report on Patentability and English translation of the Written Opinion of the International Searching Authority (Forms PCT/IB/326, PCT/IB/373 and PCT/ISA/237) for International Application No. PCT/JP2020/035906, dated Apr. 7, 2022.
(Continued)

*Primary Examiner* — Sang V Nguyen
(74) *Attorney, Agent, or Firm* — Birch, Stewart, Kolasch & Birch, LLP

(57) ABSTRACT

Provided are a liquid crystal diffraction element which exhibits low scattering and high sharpness of diffracted light, and a method for producing the same. A liquid crystal diffraction element having an alignment film which has a periodic pattern and also having a cholesteric liquid crystal layer, in which: the periodic pattern is imparted to the alignment film as a result of alignment elements having different tilt angles being periodically arranged in the alignment film or the alignment elements being arranged in a manner such that the azimuth direction thereof swings in one in-plane direction; the direction of the molecular axis of a liquid crystal compound changes while continuously rotating and in at least one in-plane direction on at least one main surface among the pair of main surfaces of the cholesteric liquid crystal layer; the molecular axis of the liquid crystal compound is tilted with respect to the main surfaces of the cholesteric liquid crystal layer; and an arrangement direction
(Continued)

of bright portion and dark portion derived from the cholesteric liquid crystalline phase observed by a scanning electron microscope in a cross section perpendicular to the main surfaces is tilted with respect to the main surfaces of the cholesteric liquid crystal layer.

20 Claims, 9 Drawing Sheets

(51) Int. Cl.
  *G02F 1/13363* (2006.01)
  *G02F 1/137* (2006.01)

(56) References Cited

U.S. PATENT DOCUMENTS

| | | | | |
|---|---|---|---|---|
| 2012/0169979 A1* | 7/2012 | Cheng | ................... | G02B 30/25 |
| | | | | 445/24 |
| 2015/0205182 A1* | 7/2015 | Leister | ............... | G02B 26/0808 |
| | | | | 349/201 |
| 2017/0373459 A1 | 12/2017 | Weng et al. | | |
| 2018/0164480 A1 | 6/2018 | Yoshida | | |
| 2020/0271839 A1 | 8/2020 | Saitoh et al. | | |
| 2020/0409202 A1* | 12/2020 | Kodama | ............. | G02F 1/13718 |
| 2021/0026049 A1 | 1/2021 | Saitoh et al. | | |
| 2021/0116615 A1* | 4/2021 | Kodama | .............. | C09K 19/601 |
| 2022/0099872 A1 | 3/2022 | Sasata et al. | | |

FOREIGN PATENT DOCUMENTS

| WO | WO 2016/194961 A1 | 12/2016 |
|---|---|---|
| WO | WO 2017/030176 A1 | 2/2017 |
| WO | WO 2019/093228 A1 | 5/2019 |
| WO | WO 2019/181247 A1 | 9/2019 |
| WO | WO 2019/189586 A1 | 10/2019 |
| WO | WO 2020/122127 A1 | 6/2020 |

OTHER PUBLICATIONS

International Search Report (Form PCT/ISA/210) for International Application No. PCT/JP2020/035906, dated Dec. 8, 2020, with English translation.

* cited by examiner

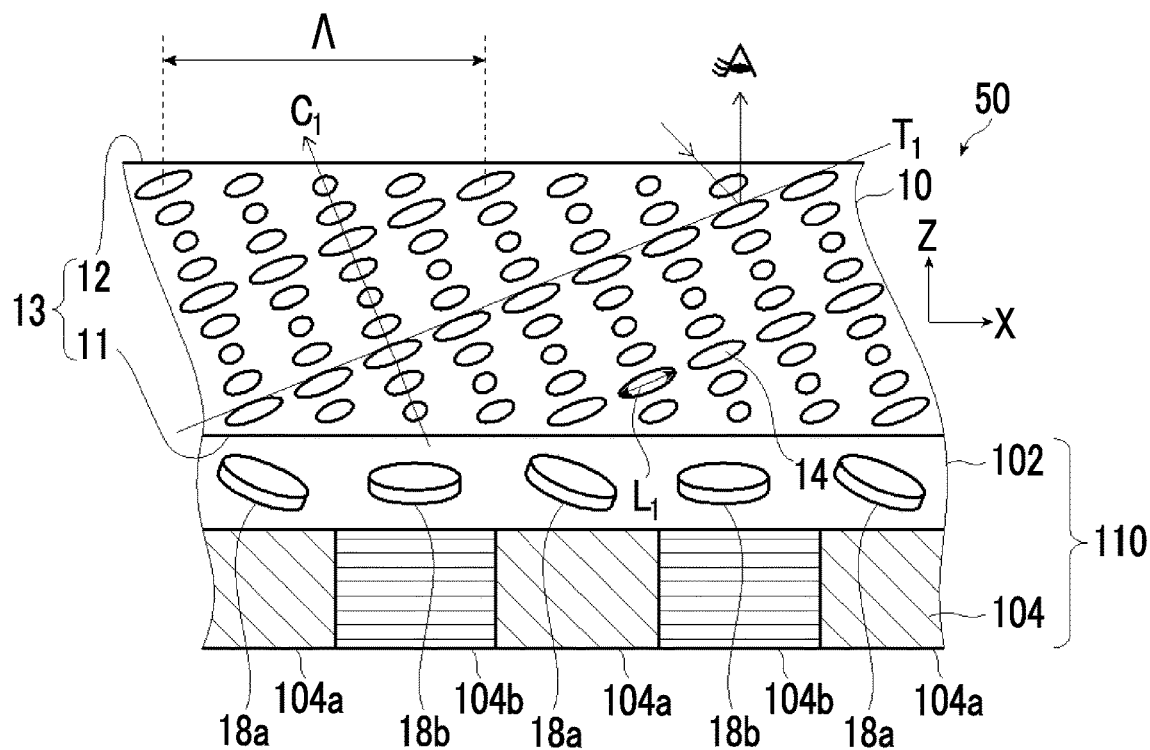
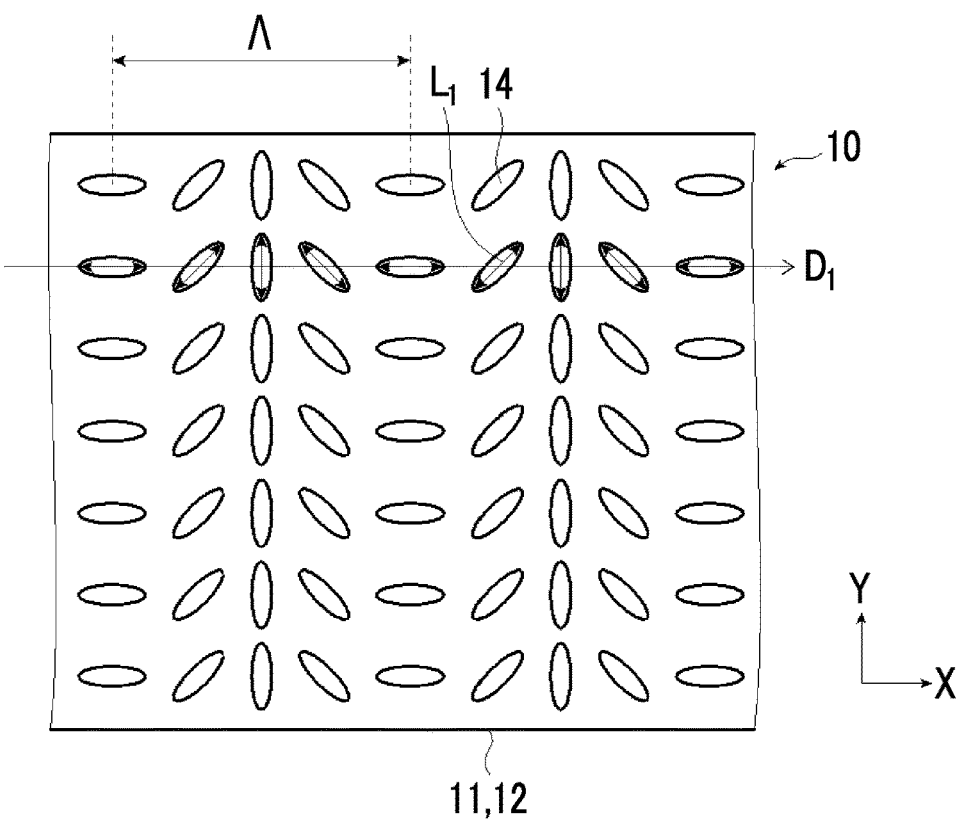
FIG. 2

LIQUID CRYSTAL DIFFRACTION ELEMENT AND METHOD FOR PRODUCING LIQUID CRYSTAL DIFFRACTION ELEMENT

CROSS-REFERENCE TO RELATED APPLICATIONS

This application is a Continuation of PCT International Application No. PCT/JP2020/035906 filed on Sep. 24, 2020, which claims priority under 35 U.S.C. § 119(a) to Japanese Patent Application No. 2019-174141 filed on Sep. 25, 2019. The above application is hereby expressly incorporated by reference, in its entirety, into the present application.

BACKGROUND OF THE INVENTION

1. Field of the Invention

The present invention relates to a liquid crystal diffraction element and a method for producing a liquid crystal diffraction element.

2. Description of the Related Art

A cholesteric liquid crystal layer is known as a layer having properties of selectively reflecting either dextrorotatory circularly polarized light or levorotatory circularly polarized light in a specific wavelength range. Therefore, the cholesteric liquid crystal layer has been developed for various applications, and is used, for example, as a projected image display member (for example, a reflecting element) such as a projection screen.

In addition, an attempt has recently been made to impart reflection anisotropy to a cholesteric liquid crystal layer (JP2006-317656A). In a case where the cholesteric liquid crystal layer has reflection anisotropy, and for example, in a case where light is incident from a normal direction of the cholesteric liquid crystal layer, the light is reflected in a direction different from the normal direction. The cholesteric liquid crystal layer having reflection anisotropy can be used as a diffraction element.

JP2006-317656A discloses an "anisotropic optical element having anisotropic optical properties with respect to a normal direction of an element plane, including a molecularly aligned cholesteric liquid crystal layer consisting of polymerizable liquid crystals exhibiting cholesteric regularity and formed to have a flat layer plane, in which a helical axis main direction defined as an average of helical axis directions of liquid crystal domains in the cholesteric liquid crystal layer is tilted by a predetermined angle with respect to a normal direction of the layer plane".

JP2006-317656A discloses, as a method for producing the anisotropic optical element, a procedure in which the temperature of a coating film including a liquid crystal compound and heated to a temperature equal to or higher than a first phase transition temperature (that is, a temperature at which the liquid crystal compound exhibits an isotropic phase) is lowered to a temperature equal to or lower than the first phase transition temperature in a state where a gas is blown to the coating film from a predetermined direction. The above-mentioned procedure leads to a transition of the liquid crystal compound in the coating film from an isotropic phase to a cholesteric liquid crystalline phase, and an alignment such that a helical axis main direction of a liquid crystal domain in the coating film is tilted by a predetermined angle with respect to a normal direction of a film plane.

SUMMARY OF THE INVENTION

The present inventors produced and studied an element including a substrate and a cholesteric liquid crystal layer (reflective film) disposed on the substrate with reference to the production method disclosed in JP2006-317656A, and then found that it is extremely difficult to adjust an angle of a liquid crystal domain in a coating film with respect to a normal direction of a film plane in a helical axis main direction. With regard to the cholesteric liquid crystal layer obtained by the production method of JP2006-317656A, it is difficult to adjust an angle of a reflecting surface derived from a cholesteric liquid crystalline phase (a plane which is orthogonal to a helical axis direction and in which liquid crystal molecules having the same azimuthal angle are present) with respect to a substrate surface, and therefore an amount of scattering components increases in a case where the incident light is reflected. Therefore, it has been found that, in a case of being used as a diffraction element for diffracting light, the diffracted light is diffracted in various directions, which leads to a problem that the sharpness of the diffracted light is low.

Therefore, an object of the present invention is to provide a liquid crystal diffraction element having low scattering and high sharpness of diffracted light, and a method for producing the same.

The present inventors have found that the foregoing object can be achieved by the following configuration.

[1] A liquid crystal diffraction element including an alignment film having a periodic pattern in an alignment treatment direction at least in a part of a plane, and a cholesteric liquid crystal layer formed of a liquid crystal compound on the alignment film, in which, in the alignment film, alignment elements having different tilt angles are periodically arranged, or azimuth directions of the alignment elements are arranged to swing along one in-plane direction such that the periodic pattern is imparted to the alignment film, in at least one main surface out of a pair of main surfaces of the cholesteric liquid crystal layer, a direction of a molecular axis of the liquid crystal compound changes while continuously rotating along at least one in-plane direction in the cholesteric liquid crystal layer, the molecular axis of the liquid crystal compound is tilted with respect to the main surface of the cholesteric liquid crystal layer, and an arrangement direction of bright portion and dark portion derived from a cholesteric liquid crystalline phase, as observed by a scanning electron microscope in a cross section perpendicular to the main surface, is tilted with respect to the main surface of the cholesteric liquid crystal layer.

[2] The liquid crystal diffraction element according to [1], in which the alignment film has a liquid crystal layer containing a liquid crystal compound, and the liquid crystal compound of the alignment film is an alignment element.

[3] The liquid crystal diffraction element according to [2], in which the liquid crystal compound contained in the liquid crystal layer is a disk-like liquid crystal compound.

[4] The liquid crystal diffraction element according to any one of [1] to [3], in which the period of a periodic pattern of the alignment film is 0.1 μm to 5 μm.

[5] The liquid crystal diffraction element according to any one of [1] to [4], in which one period of the periodic pattern of the alignment film is asymmetric in a periodic direction.

[6] A method for producing a liquid crystal diffraction element according to any one of [1] to [5], including an alignment film forming step of forming an alignment film having alignment elements, in which the alignment elements having different tilt angles are periodically arranged, or the alignment elements are arranged so that an azimuth direction of a molecular axis of the alignment element swings along one in-plane direction, and a cholesteric liquid crystal layer forming step of forming a cholesteric liquid crystal layer on the alignment film, using a liquid crystal composition containing a liquid crystal compound, in which the liquid crystal composition contains two or more chiral agents, at least one of the chiral agents is any chiral agent selected from the group consisting of a chiral agent X whose helical twisting power changes upon irradiation with light and a chiral agent Y whose helical twisting power changes upon a change of temperature, and in the cholesteric liquid crystal layer forming step, in a case where the liquid crystal composition contains the chiral agent X, a light irradiation treatment is carried out to cholesterically align the liquid crystal compound, and in a case where the liquid crystal composition contains the chiral agent Y, a cooling treatment or a heat treatment is carried out to cholesterically align the liquid crystal compound.

[7] The method for producing a liquid crystal diffraction element according to [6], in which the alignment film forming step includes an alignment treatment step of forming a photo-alignment film for forming the alignment elements on the surface, and in the alignment treatment step, light emitted from two different directions are allowed to interfere with each other to carry out an alignment treatment.

According to an aspect of the present invention, it is possible to provide a liquid crystal diffraction element having low scattering and high sharpness of diffracted light, and a method for producing the same.

BRIEF DESCRIPTION OF THE DRAWINGS

FIG. 1 is a schematic diagram of an X-Z plane of an example of a liquid crystal diffraction element of the present invention.

FIG. 2 is a schematic diagram of an X-Y plane of a cholesteric liquid crystal layer included in the liquid crystal diffraction element shown in FIG. 1.

DESCRIPTION OF THE PREFERRED EMBODIMENTS

Figure 3:
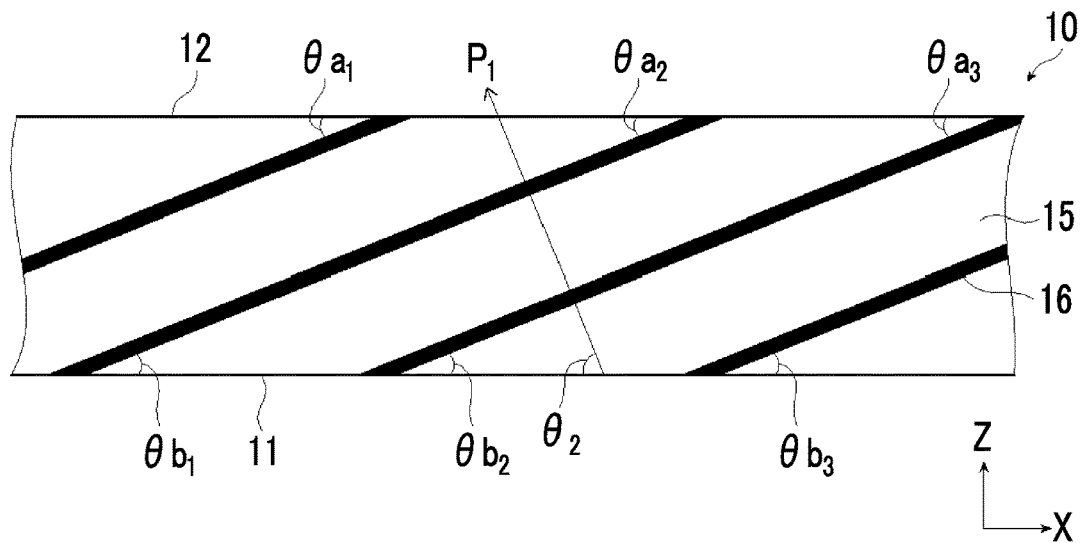
FIG. 3 is a schematic diagram of the X-Z plane of the cholesteric liquid crystal layer included the liquid crystal diffraction element shown in FIG. 1 upon observation with a scanning electron microscope (SEM).

Hereinafter, the present invention will be described in detail. Any numerical range expressed by using "to" in the present specification means a range including the numerical values before and after the "to" as a lower limit value and an upper limit value, respectively.

In addition, in the present specification, the term "(meth) acrylate" is a notation representing both acrylate and methacrylate, the term "(meth)acryloyl group" is a notation representing both an acryloyl group and a methacryloyl group, and the term "(meth)acrylic" is a notation representing both acrylic and methacrylic.

In the present specification, the term "same" includes an error range generally accepted in the art. In addition, in the present specification, the "same" with respect to an angle means that a difference from an exact angle is within a range of less than 5 degrees unless otherwise specified. The difference from an exact angle is preferably less than 4 degrees and more preferably less than 3 degrees.

[Liquid Crystal Diffraction Element]

The liquid crystal diffraction element according to the embodiment of the present invention is a liquid crystal diffraction element including an alignment film having a periodic pattern in an alignment treatment direction at least in a part of a plane, and a cholesteric liquid crystal layer formed of a liquid crystal compound on the alignment film, in which, in the liquid crystal layer, alignment elements having different tilt angles are periodically arranged, or azimuth directions of the alignment elements are arranged to swing along one in-plane direction such that the periodic pattern is imparted to the alignment film, in at least one main surface out of a pair of main surfaces of the cholesteric liquid crystal layer, a direction of a molecular axis of the liquid crystal compound changes while continuously rotating along at least one in-plane direction in the cholesteric liquid crystal layer, the molecular axis of the liquid crystal compound is tilted with respect to the main surface of the cholesteric liquid crystal layer, and an arrangement direction of bright portion and dark portion derived from a cholesteric liquid crystalline phase, as observed by a scanning electron microscope in a cross section perpendicular to the main surface, is tilted with respect to the main surface of the cholesteric liquid crystal layer.

In addition, it is preferable that the alignment film has a liquid crystal layer containing a liquid crystal compound, and the liquid crystal compound in the liquid crystal layer is an alignment element. That is, it is preferable that, in the liquid crystal layer, liquid crystal compounds having different tilt angles are periodically arranged, or the azimuth directions of the molecular axes of the liquid crystal compounds are arranged so as to swing along one in-plane direction, whereby the alignment film is imparted with a periodic pattern.

Hereinafter, the liquid crystal diffraction element according to the embodiment of the present invention will be described with reference to the accompanying drawings.

FIG. 1 is a schematic diagram of an X-Z plane of an example of a liquid crystal diffraction element of the present invention.

A liquid crystal diffraction element 50 shown in FIG. 1 includes an alignment film 110 having a liquid crystal layer 102 formed of a disk-like liquid crystal compound 18 and a photoalignment layer in which the disk-like liquid crystal compound 18 in the liquid crystal layer 102 is arranged in a predetermined pattern, and a cholesteric liquid crystal layer 10 disposed so as to be in contact with the liquid crystal layer 102 are included.

In the following, the description will be made assuming that the plane parallel to a main surface 11 and a main surface 12 of the cholesteric liquid crystal layer 10 is defined as an X-Y plane, the cross section perpendicular to the X-Y plane is defined as an X-Z plane, and the direction in which the liquid crystal compound 14 in the cholesteric liquid crystal layer 10 is aligned in a predetermined alignment pattern in the X-Y plane is defined as an X direction.

[Cholesteric Liquid Crystal Layer]

The cholesteric liquid crystal layer 10 is a layer in which the liquid crystal compound 14 is cholesterically aligned, which is formed on the alignment film 110.

The cholesteric liquid crystal layer 10 has a configuration in which, in at least one main surface out of a pair of main surfaces of the cholesteric liquid crystal layer 10, a direction of a molecular axis of the liquid crystal compound 14 changes while continuously rotating along at least one in-plane direction, the molecular axis of the liquid crystal compound 14 is tilted with respect to the main surface of the cholesteric liquid crystal layer 10, and an arrangement direction of bright portion and dark portion derived from a cholesteric liquid crystalline phase, as observed with a scanning electron microscope (SEM) in a cross section perpendicular to the main surface, is tilted with respect to the main surface of the cholesteric liquid crystal layer.

FIG. 2 is a schematic diagram showing an in-plane alignment state of a liquid crystal compound in the main surface 11 and the main surface 12 of the cholesteric liquid crystal layer 10 having a pair of main surfaces 13 consisting of the main surface 11 and the main surface 12.

It should be noted that, in the following, an aspect of a rod-like liquid crystal compound as the liquid crystal compound in the cholesteric liquid crystal layer will be described as an example.

As shown in FIG. 2, in the X-Y plane of the cholesteric liquid crystal layer 10, a liquid crystal compound 14 is arranged along a plurality of parallel arrangement axes $D_1$ in the X-Y plane, and in the respective arrangement axes $D_1$, the direction of a molecular axis $L_1$ of the liquid crystal compound 14 changes while continuously rotating in one in-plane direction along the arrangement axis $D_1$. Here, for the sake of explanation, it is assumed that the arrangement axis $D_1$ faces in an X direction. In addition, in a Y direction, the liquid crystal compounds 14 having the same direction of the molecular axis $L_1$ are aligned at equal intervals.

It should be noted that the phrase "the direction of the molecular axis $L_1$ of the liquid crystal compound 14 changes while continuously rotating in one in-plane direction along the arrangement axis $D_1$" means that an angle formed by the molecular axis $L_1$ of the liquid crystal compound 14 and the arrangement axis $D_1$ varies depending on the position in the direction of the arrangement axis $D_1$, and therefore the angle formed by the molecular axis $L_1$ and the arrangement axis $D_1$ along the arrangement axis $D_1$ gradually changes from $\theta_1$ to $\theta_1+180°$ or $\theta_1-180°$. That is, in the plurality of liquid crystal compounds 14 arranged along the arrangement axis $D_1$, the molecular axis $L_1$ changes while rotating by a constant angle along the arrangement axis $D_1$ as shown in FIG. 2.

With regard to the cholesteric liquid crystal layer 10, in such an alignment pattern of the liquid crystal compound 14 (also referred to as a liquid crystal alignment pattern), the length (distance) at which the molecular axis $L_1$ of the liquid crystal compound 14 rotates 180° in the direction of the arrangement axis $D_1$ in the X-Y plane is defined as a length $\Lambda$ of one period in the liquid crystal alignment pattern.

That is, the distance between the centers of the two liquid crystal compounds 14 having the same angle with respect to the direction of the arrangement axis $D_1$ in the direction of the arrangement axis $D_1$ is defined as the length $\Lambda$ of one period. Specifically, as shown in FIG. 2, the distance between the centers of the two liquid crystal compounds 14 in which the direction of the arrangement axis $D_1$ and the direction of the molecular axis $L_1$ coincide with each other is defined as the length $\Lambda$ of one period. In the following description, the length $\Lambda$ of one period is also referred to as "one period $\Lambda$".

The liquid crystal alignment pattern of the cholesteric liquid crystal layer 10 repeats this one period $\Lambda$ in one direction in which the direction of the arrangement axis $D_1$, that is, the direction of the molecular axis $L_1$ continuously rotates and changes.

In addition, in the present specification, in a case where the liquid crystal compound 14 is a rod-like liquid crystal compound, the molecular axis $L_1$ of the liquid crystal compound 14 is intended to be a molecular major axis of the rod-like liquid crystal compound. On the other hand, in a case where the liquid crystal compound 14 is a disk-like liquid crystal compound, the molecular axis $L_1$ of the liquid crystal compound 14 is intended to be an axis parallel to the direction normal to the disc plane of the disk-like liquid crystal compound.

In the X-Z plane of the cholesteric liquid crystal layer 10 shown in FIG. 1, the liquid crystal compound 14 is aligned with its molecular axis $L_1$ tilted with respect to the main surface 11 and the main surface 12 (X-Y plane).

The average angle (average tilt angle) $\theta_3$ formed by the molecular axis $L_1$ of the liquid crystal compound 14 and the main surface 11 and the main surface 12 (X-Y plane) is preferably 5° to 45° and more preferably 12° to 22°. The angle $\theta_3$ can be measured by observing the X-Z plane of the cholesteric liquid crystal layer 10 by a polarization microscope. Above all, in the X-Z plane of the cholesteric liquid crystal layer 10, the liquid crystal compound 14 is preferably tilt-aligned in the same direction as the molecular axis $L_1$ with respect to the main surface 11 and the main surface 12 (X-Y plane).

The average angle is a value obtained by measuring angles formed by the molecular axis $L_1$ of the liquid crystal compound 14 and the main surface 11 and the main surface 12 at any 5 or more points in the cross-sectional polarization microscope observation of the cholesteric liquid crystal layer, and then arithmetically averaging the measured values.

As shown in FIG. 1, in the cholesteric liquid crystal layer 10, a helical axis $C_1$ derived from the cholesteric liquid crystalline phase is tilted at a predetermined angle with respect to the main surface 11 and the main surface 12 (X-Y plane) in a case where the molecular axis $L_1$ has the above-described alignment. That is, a reflecting surface $T_1$ of the cholesteric liquid crystal layer 10 (a plane which is orthogonal to the helical axis $C_1$ and in which liquid crystal molecules having the same azimuthal angle are present) is tilted in a substantially constant direction with respect to the main surface 11 and the main surface 12 (X-Y plane).

The phrase "liquid crystal molecules having the same azimuthal angle" refers to liquid crystal molecules in which the alignment directions of the molecular axes are the same as each other in a case of being projected on the main surface 11 and the main surface 12 (X-Y plane).

In a case where the X-Z plane of the cholesteric liquid crystal layer 10 shown in FIG. 1 is observed by SEM, a stripe pattern is observed in which an arrangement direction $P_1$ in which bright portions 15 and dark portions 16 are alternately arranged as shown in FIG. 3 is tilted at a predetermined angle $\theta_2$ with respect to the main surface 11 and the main surface 12 (X-Y plane). It should be noted that two bright portions 15 and two dark portions 16 in FIG. 3 correspond to one helical pitch (one helical turn).

In the cholesteric liquid crystal layer 10, the molecular axis $L_1$ of the liquid crystal compound 14 is substantially orthogonal to the arrangement direction $P_1$ in which the bright portions 15 and the dark portions 16 are alternately arranged.

The angle formed by the molecular axis $L_1$ and the arrangement direction $P_1$ is preferably 80° to 90° and more preferably 85° to 90°.

The cholesteric liquid crystal layer 10 having such a configuration has reflection anisotropy. Therefore, the cholesteric liquid crystal layer 10 can reflect the incident light in a direction different from the direction of specular reflection, and can be used as a diffraction element.

Hereinafter, various characteristics of the cholesteric liquid crystal layer will be described.

<Reflection Anisotropy>

Figure 4:
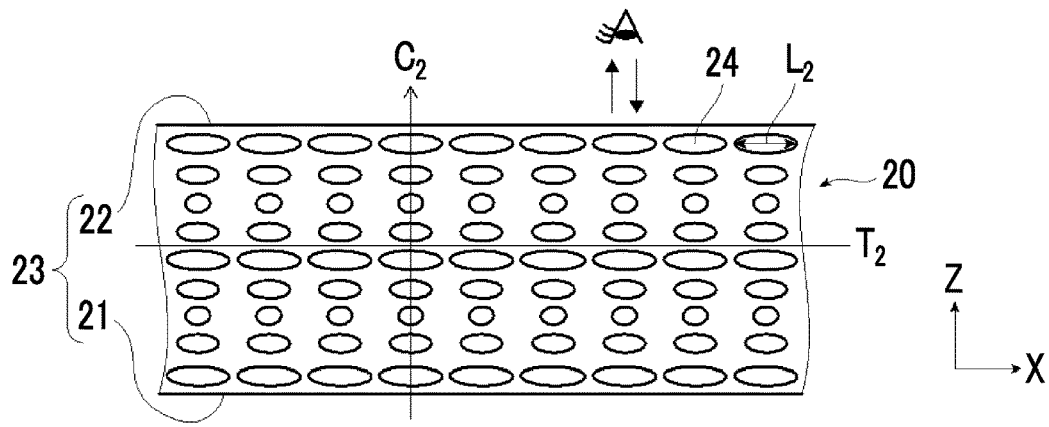
FIG. 4 is a schematic diagram of an X-Z plane of a cholesteric liquid crystal layer of the related art.

Here, FIG. 4 shows a schematic cross-sectional diagram of a cholesteric liquid crystal layer of the related art. Specifically, FIG. 4 shows a state of the cholesteric liquid crystal layer in a cross section perpendicular to a main surface 23 of a cholesteric liquid crystal layer 20 having a pair of main surfaces 23 consisting of a main surface 21 and a main surface 22. Hereinafter, the description will be made with the main surface 21 and the main surface 22 of the cholesteric liquid crystal layer 20 being defined as an X-Y plane, and a cross section perpendicular to the X-Y plane being defined as an X-Z plane. That is, FIG. 4 corresponds to a schematic diagram of the cholesteric liquid crystal layer 20 on the X-Z plane.

Figure 5:
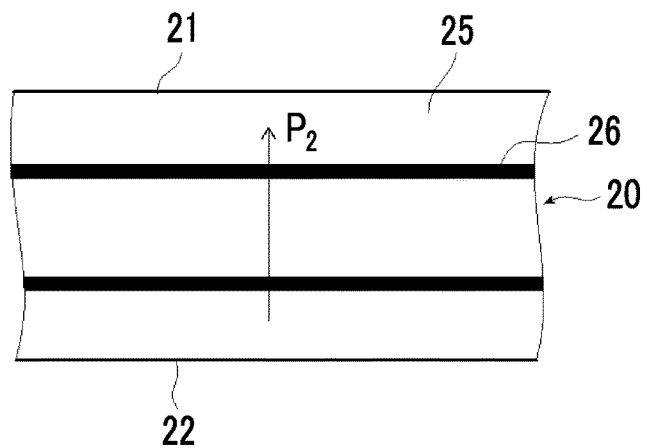
FIG. 5 is a schematic diagram of the X-Z plane of the cholesteric liquid crystal layer of the related art upon observation with SEM.

In the cholesteric liquid crystal layer 20 shown in FIG. 4, the helical axis $C_2$ derived from the cholesteric liquid crystalline phase is perpendicular to the main surface 21 and the main surface 22 (X-Y plane), and the reflecting surface $T_2$ is a plane parallel to the main surface 21 and the main surface 22 (X-Y plane). In addition, the molecular axis $L_2$ of the liquid crystal compound 24 is not tilted with respect to the main surface 21 and the main surface 22 (X-Y plane). In other words, the molecular axis $L_2$ is parallel to the main surface 21 and the main surface 22 (X-Y plane). Therefore, as shown in FIG. 5, in a case where the X-Z plane of the cholesteric liquid crystal layer 20 is observed by SEM, an arrangement direction $P_2$ in which the bright portions 25 and the dark portions 26 are alternately arranged is perpendicular to the main surface 21 and the main surface 22 (X-Y plane).

Since the cholesteric liquid crystalline phase is specularly reflective, for example, in a case where light is incident on the cholesteric liquid crystal layer 20 in a normal direction, the light is reflected in the normal direction (see the arrow in FIG. 4).

On the other hand, in the cholesteric liquid crystal layer 10 shown in FIG. 1 and FIG. 2, the reflecting surface $T_1$ thereof is tilted in a predetermined direction with respect to the main surface 11 and the main surface 12 (X-Y plane), thus having reflected light anisotropy. For example, in a case where light is incident on the cholesteric liquid crystal layer 10 from an oblique direction, the light is reflected by the reflecting surface $T_1$ in a normal direction of the main surface 11 and the main surface 12 (X-Y plane) (see the arrow in FIG. 2).

As a result, the cholesteric liquid crystal layer 10 can reflect the incident light in a direction different from the direction of specular reflection.

<Haze>

As described above, in the cholesteric liquid crystal layer 10, in the X-Z plane, the liquid crystal compound 14 is tilt-aligned with its molecular axis $L_1$ with respect to the main surface 11 and the main surface 12 (X-Y plane), and in the main surface 11 and the main surface 12 (X-Y plane), the direction of the molecular axis $L_1$ of the liquid crystal compound 14 changes while continuously rotating in one in-plane direction along the arrangement axis $D_1$. It is presumed that, due to having the above-mentioned configuration, the cholesteric liquid crystal layer 10 exhibits a high linearity in the bright and dark lines consisting of bright portions and dark portions derived from the cholesteric liquid crystalline phase observed by SEM in the X-Z plane, and as a result, the cholesteric liquid crystal layer 10 has low haze and high transparency.

<Circular Polarization Degree of Reflected Light>

Figure 6:
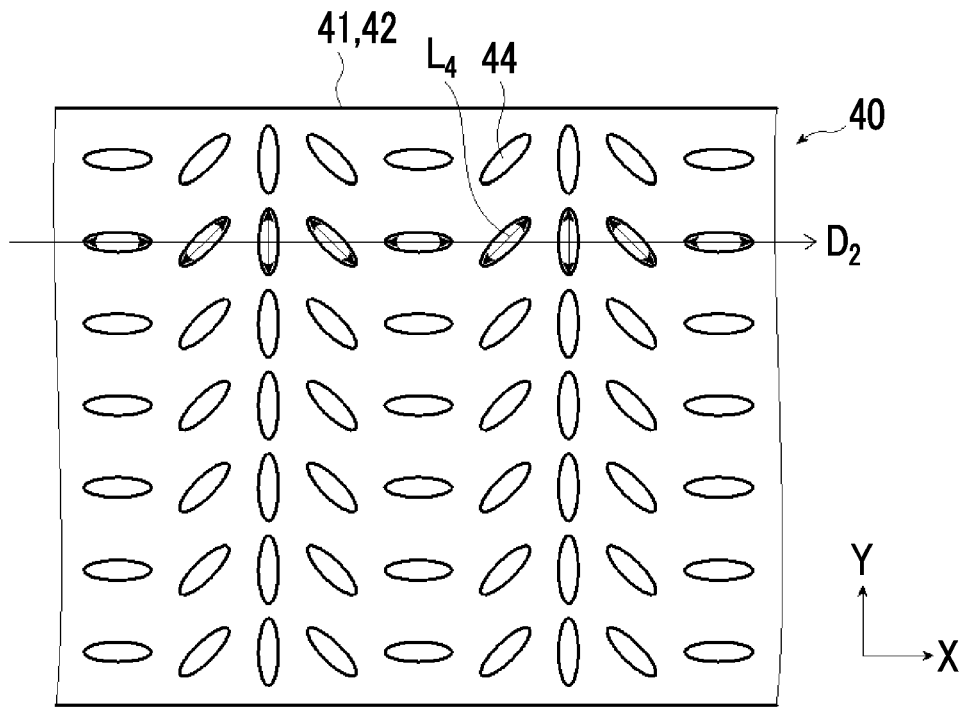
FIG. 6 is a schematic diagram of an X-Y plane of the cholesteric liquid crystal layer of the related art.
Figure 7:
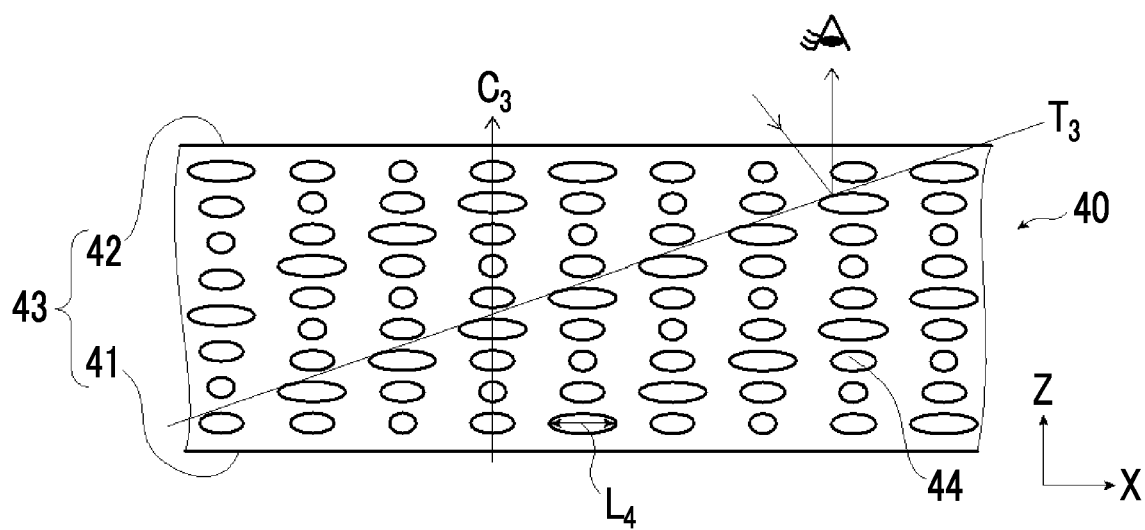
FIG. 7 is a schematic diagram of an X-Z plane of the cholesteric liquid crystal layer of the related art.

Here, FIG. 6 and FIG. 7 show schematic diagrams of a cholesteric liquid crystal layer of the related art. Specifically, FIG. 6 is a schematic diagram conceptually showing an alignment state of a liquid crystal compound in a main surface 41 and a main surface 42 of a cholesteric liquid crystal layer 40 having a pair of main surfaces 43 consisting of the main surface 41 and the main surface 42. In addition, FIG. 7 shows a state of the cholesteric liquid crystal layer in a cross section perpendicular to the main surface 43 of the cholesteric liquid crystal layer 40. Hereinafter, the description will be made with the main surface 41 and the main surface 42 of the cholesteric liquid crystal layer 40 being defined as an X-Y plane, and a cross section perpendicular to the X-Y plane being defined as an X-Z plane. That is, FIG. 6 is a schematic diagram of the cholesteric liquid crystal layer 40 on the X-Y plane, and FIG. 7 is a schematic diagram of the cholesteric liquid crystal layer 40 on the X-Z plane.

As shown in FIG. 6, in the X-Y plane of the cholesteric liquid crystal layer 40, a liquid crystal compound 44 is arranged along a plurality of parallel arrangement axes $D_2$ in the X-Y plane, and in the respective arrangement axes $D_2$, the direction of a molecular axis $L_4$ of the liquid crystal compound 44 changes while continuously rotating in one in-plane direction along the arrangement axis $D_2$. That is, the alignment state of the liquid crystal compound 44 on the X-Y plane of the cholesteric liquid crystal layer 40 is the same as the alignment state of the liquid crystal compound 14 on the X-Y plane of the cholesteric liquid crystal layer 10 shown in FIG. 2.

As shown in FIG. 7, in the X-Z plane of the cholesteric liquid crystal layer 40, the molecular axis $L_4$ of the liquid crystal compound 44 is not tilted with respect to the main surface 41 and the main surface 42 (X-Y plane). In other words, the molecular axis $L_4$ is parallel to the main surface 41 and the main surface 42 (X-Y plane).

The cholesteric liquid crystal layer 40 has the X-Y plane shown in FIG. 6 and the X-Z plane shown in FIG. 7, and therefore the helical axis $C_3$ derived from the cholesteric liquid crystalline phase is perpendicular to the main plane 41 and the main plane 42 (X-Y plane), and the reflecting surface $T_3$ is tilted in a predetermined direction with respect to the main plane 41 and the main plane 42 (X-Y plane). In a case where the X-Z plane of the cholesteric liquid crystal layer 40 is observed by SEM, a stripe pattern is observed in which an arrangement direction in which bright portions and dark portions are alternately arranged is tilted at a predetermined angle with respect to the main surface 41 and the main surface 42 (X-Y plane) (not shown).

On the other hand, in the cholesteric liquid crystal layer 10 shown in FIG. 1 and FIG. 2, the molecular axis $L_1$ is substantially orthogonal to the arrangement direction $P_1$ in which the bright portions 15 and the dark portions 16 observed by SEM observation in the X-Z plane are alternately arranged. That is, the direction of the helical axis $C_1$ is substantially parallel to the arrangement direction $P_1$ in which the bright portions 15 and the dark portions 16 are alternately arranged. As a result, the light incident from an oblique direction and the helical axis $C_1$ are more likely to be parallel to each other, and the reflected light on the reflecting surface has a high circular polarization degree. On the other hand, in a case of the cholesteric liquid crystal layer 40, since the helical axis $C_3$ is perpendicular to the main surface 41 and the main surface 42 (X-Y plane), and therefore the angle formed by the incident direction of the light incident from an oblique direction and the direction of the helical axis $C_3$ becomes larger. That is, the incident direction of the light incident from an oblique direction and the direction of the helical axis $C_3$ become more not parallel. Therefore, in the cholesteric liquid crystal layer 10, the circular polarization degree of the reflected light on the reflecting surface is higher than that of the cholesteric liquid crystal layer 40.

Here, the cholesteric liquid crystal layer included in the liquid crystal diffraction element according to the embodiment of the present invention has the characteristics of low scattering and high sharpness of diffracted light. This point will be described in detail later.

[Alignment Film]

The alignment film 110 has a periodic pattern in an alignment treatment direction at least in a part of the plane, and is for aligning the liquid crystal compound in the cholesteric liquid crystal layer 10 laminated on the liquid crystal layer 102 of the alignment film 110 in the above-mentioned predetermined alignment pattern.

The alignment film 110 has a liquid crystal layer 102 and a photoalignment layer 104.

<Liquid Crystal Layer>

The liquid crystal layer 102 is formed on the photoalignment layer 104, and liquid crystal compounds having different tilt angles are periodically arranged thereon. This imparts a periodic pattern to the alignment film.

Figure 8:
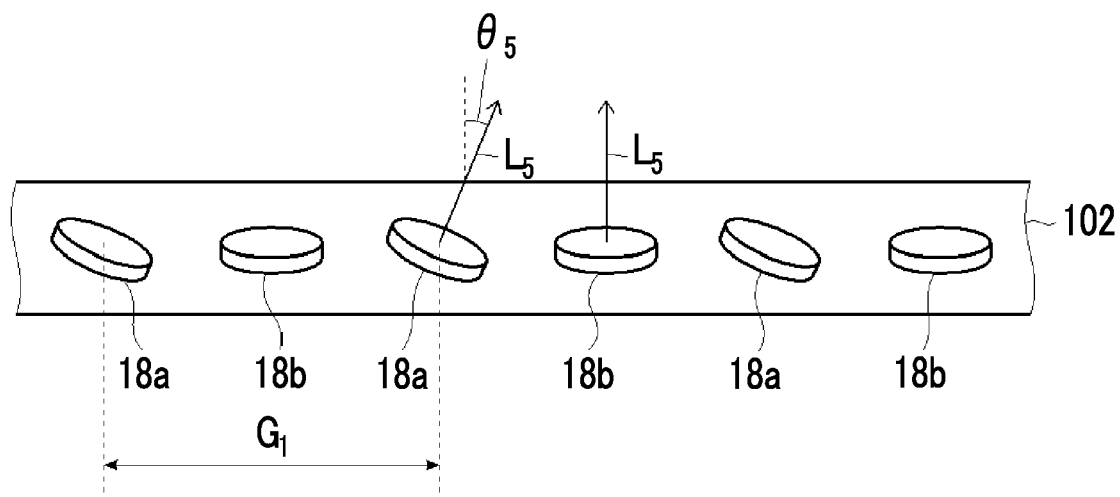
FIG. 8 is a schematic diagram of an X-Z plane of a liquid crystal layer included in the liquid crystal diffraction element shown in FIG. 1.

FIG. 8 shows a schematic diagram of the X-Z plane of the liquid crystal layer 102.

As shown in FIG. 8, on the surface of the liquid crystal layer 102 on the side in contact with the cholesteric liquid crystal layer 10, a disk-like liquid crystal compound 18a in which the molecular axis $L_5$ of the disk-like liquid crystal compound 18 is tilted with respect to the surface of the liquid crystal layer 102 (it also corresponds to the main surface 11 (X-Y plane) of the cholesteric liquid crystal layer 10) and a disk-like liquid crystal compound 18b in which the molecular axis $L_5$ of the disk-like liquid crystal compound 18 is perpendicular to the surface of the liquid crystal layer 102 are alternately arranged in an X direction.

Assuming that the angle formed by the molecular axis $L_5$ of the disk-like liquid crystal compound 18 and the normal line of the surface of the liquid crystal layer 102 is defined as a tilt angle $\theta_5$, it can be said that the disk-like liquid crystal compounds 18 having different tilt angles $\theta_5$ are alternately arranged in the liquid crystal layer 102.

In addition, in the arrangement direction of the disk-like liquid crystal compound 18, the length of one period of the periodic pattern is defined as $G_1$. In the example shown in FIG. 8, one disk-like liquid crystal compound 18a and one disk-like liquid crystal compound 18b have one period, and the length between the disk-like liquid crystal compounds 18a (or the length between the disk-like liquid crystal compounds 18b) is the length $G_1$ of the periodic pattern. The length $G_1$ of the periodic pattern is constant in an X direction and a Y direction.

The disk-like liquid crystal compound 18a tilted with respect to the surface of the liquid crystal layer 102 exerts an azimuthal angle regulating force on the liquid crystal compound in the cholesteric liquid crystal layer formed on the liquid crystal layer 102. The azimuthal angle regulating force increases as the inclination angle (tilt angle θ5) of the disk-like liquid crystal compound 18 increases.

Therefore, the liquid crystal layer 102 has a periodic pattern in an alignment treatment direction by an alternate arrangement of the disk-like liquid crystal compounds 18 having different tilt angles $\theta_5$.

Specifically, in a case of the example shown in FIG. 1, the azimuthal angle regulating force is large in the region where the tilted disk-like liquid crystal compound 18a is present, and the azimuthal angle regulating force is small in the region where the non-tilted disk-like liquid crystal compound 18b is present. Therefore, the liquid crystal compound 14 in the cholesteric liquid crystal layer 10 present directly above the tilted disk-like liquid crystal compound 18a (on the liquid crystal layer 102 side), in the plane direction of the X-Y plane, is aligned such that the molecular axis is toward an X direction and rises and tilts with respect to the X-Y plane due to the azimuthal angle regulating force of the disk-like liquid crystal compound 18a. On the other hand, the liquid crystal compound 14 in the cholesteric liquid crystal layer 10 present directly above the non-tilted disk-like liquid crystal compound 18b (on the liquid crystal layer 102 side) can be aligned in any direction according to the alignment of the surrounding liquid crystal compound 14, due to a weak azimuthal angle regulating force on the disk-like liquid crystal compound 18b. In the example shown in FIG. 1, the liquid crystal compound 14 present immediately above the disk-like liquid crystal compound 18b has a molecular axis toward the Y direction and is aligned parallel to the X-Y plane.

The cholesteric liquid crystal layer 10 is cholesterically aligned starting from the alignment state of the liquid crystal compound 14 present on the liquid crystal layer 102 side, and therefore has a configuration in which the molecular axis $L_1$ of the liquid crystal compound 14 is tilted, and the helical axis $C_1$ derived from the cholesteric liquid crystalline phase is tilted at a predetermined angle with respect to the main surface 11 and the main surface 12 (X-Y plane), as shown in FIG. 1. That is, the cholesteric liquid crystal layer 10 has a configuration in which a reflecting surface $T_1$ of the cholesteric liquid crystal layer 10 (a plane which is orthogonal to the helical axis $C_1$ and in which liquid crystal compounds having the same azimuthal angle are present) is tilted in a substantially constant direction with respect to the main surface 11 and the main surface 12 (X-Y plane). In addition, along with this, the alignment state of the cholesteric liquid crystal layer 10 on the X-Y plane has a configuration in which the liquid crystal compound 14 is arranged along the arrangement axis $D_1$, and the direction of the molecular axis $L_1$ of the liquid crystal compound 14 changes while continuously rotating in one in-plane direction along the arrangement axis $D_1$, as shown in FIG. 2.

Here, the present inventors have found that, in a case where one period Λ of the liquid crystal alignment pattern fluctuates in an X direction and/or a Y direction, in the cholesteric liquid crystal layer, the amount of scattering components of the light reflected and diffracted by the liquid crystal diffraction element increases, and the sharpness of the diffracted light decreases.

Figure 9:
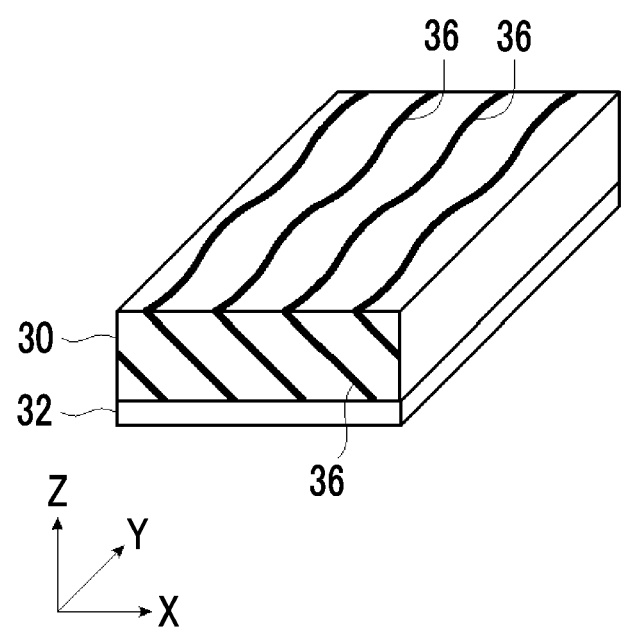
FIG. 9 is a perspective view of an example of a liquid crystal diffraction element of the related art.

In a case where one period Λ of the liquid crystal alignment pattern fluctuates in an X direction and/or a Y direction, a dark portion 36 (and a bright portion) in a case of being viewed with SEM or polarization microscope observation on the X-Y plane is in a fluctuated state, for example, as in the cholesteric liquid crystal layer 30 shown in FIG. 9.

In a case where one period Λ of the liquid crystal alignment pattern is different, the inclination angle of the reflecting surface $T_1$ of the cholesteric liquid crystal layer with respect to the main surface (X-Y plane) is different. Therefore, in a case where one period Λ of the liquid crystal alignment pattern fluctuates in an X direction and/or a Y direction, the inclination angle of the reflecting surface $T_1$ with respect to the main surface (X-Y plane) differs depending on the position of the X-Y plane in a plane direction. In a case where the inclination angle of the reflecting surface $T_1$ differs depending on the position of the X-Y plane in a plane direction, the diffraction angle with respect to the incident light will differ depending on the position of the X-Y plane in a plane direction. Therefore, the diffracted light is reflected so as to be scattered in various directions. Accordingly, the sharpness of the diffracted light decreases.

The sharpness of the diffracted light can be determined by measuring a half-width in a case of measuring the relationship between the angle of the diffracted light and the light amount distribution. Therefore, the half-width of the diffracted light becomes wide in a case of the cholesteric liquid crystal layer in which one period Λ of the liquid crystal alignment pattern fluctuates in an X direction and/or a Y direction.

On the other hand, the liquid crystal diffraction element 50 according to the embodiment of the present invention has a configuration in which the alignment film 110 has a periodic pattern by periodic arrangement of liquid crystal compounds 18 having different tilt angles in the liquid crystal layer 102. As a result, the alignment film 110 has a periodic pattern in which a region having a large azimuthal angle regulating force and a region having a small azimuthal angle regulating force are periodically arranged. Therefore, as described above, in the cholesteric liquid crystal layer 10 formed on the alignment film 110, the liquid crystal compound 14 present on the region having a large azimuthal angle regulating force is aligned in a predetermined direction by the azimuthal angle regulating force, and the other liquid crystal compounds 14 are also in a cholesterically aligned state with the liquid crystal compound 14 as a starting point.

Here, in the liquid crystal layer 102, the length $G_1$ of one period of the periodic pattern of the disk-like liquid crystal compound 18 is constant in an X direction and a Y direction. That is, in the alignment film 110, the interval between the regions having a large azimuthal angle regulating force is constant in an X direction and a Y direction. Accordingly, liquid crystal compounds 14 aligned in a predetermined direction due to a strong azimuthal angle regulating force are present at regular intervals in an X direction and a Y direction in the cholesteric liquid crystal layer 10, and therefore the cholesteric liquid crystal layer 10 cholesterically aligned with the liquid crystal compound 14 as a starting point has a uniform (constant) one period Λ of the liquid crystal alignment pattern in an X direction and a Y direction.

Figure 10:
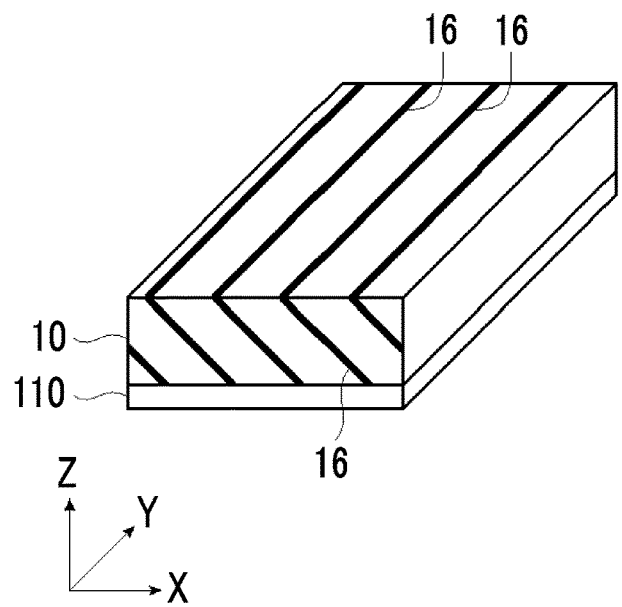
FIG. 10 is a perspective view of an example of the liquid crystal diffraction element of the present invention.

As a result, the dark portion 36 (and the bright portion) in a case of being viewed with SEM or polarization microscope observation on the X-Y plane has a configuration in which the linearity is high, and the dark portions 36 are parallel to each other, as shown in FIG. 10.

In this manner, one period Λ of the liquid crystal alignment pattern becomes uniform in an X direction and a Y direction, and therefore the inclination angle of the reflecting surface $T_1$ with respect to the main surface (X-Y plane) is constant regardless of the position of the X-Y plane in a plane direction. Accordingly, in the liquid crystal diffraction element according to the embodiment of the present invention, the diffraction angle with respect to the incident light is a constant angle regardless of the position of the X-Y plane in a plane direction, so that the diffracted light is not scattered and the sharpness of the diffracted light is increased.

The periodic pattern in the liquid crystal layer 102 is not limited to the example shown in FIG. 8.

Figure 11:
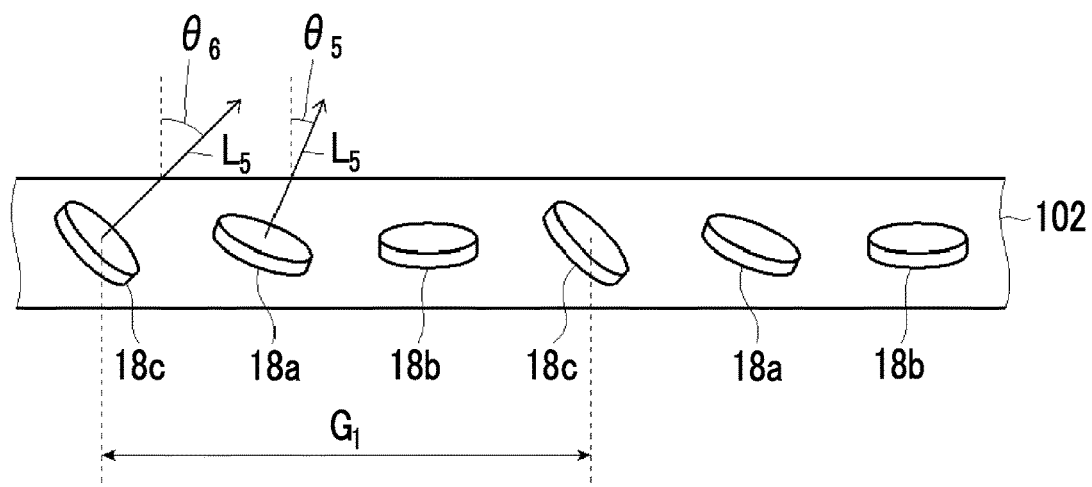
FIG. 11 is a schematic diagram of an X-Z plane of another example of the liquid crystal layer included in the liquid crystal diffraction element of the present invention.

For example, the example shown in FIG. 8 has a configuration having a disk-like liquid crystal compound 18a whose molecular axis $L_5$ is tilted with respect to the surface of the liquid crystal layer 102 in one period of the periodic pattern and a disk-like liquid crystal compound 18b whose molecular axis $L_5$ is not tilted, but the present invention is not limited thereto. The configuration may be a configuration having two or more disk-like liquid crystal compounds having different tilt angles $θ_5$ of the molecular axis $L_5$ in one period of the periodic pattern; or a configuration having two disk-like liquid crystal compounds 18a and 18c having different tilt angles $θ_5$ of the molecular axis $L_5$ in one period of the periodic pattern and the non-tilted disk-like liquid crystal compound 18b, as shown in the example shown in FIG. 11.

Figure 12:
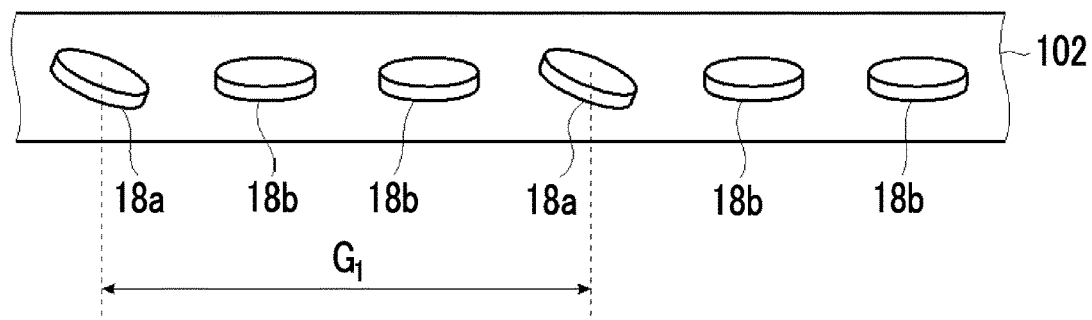
FIG. 12 is a schematic diagram of an X-Z plane of another example of the liquid crystal layer included in the liquid crystal diffraction element of the present invention.

In addition, a disk-like liquid crystal compound having the same tilt angle may be contained in one period of the periodic pattern. For example, the example shown in FIG. 12 has one tilted disk-like liquid crystal compound 18a and two non-tilted disk-like liquid crystal compounds 18b in one period of the periodic pattern. In addition, two or more disk-like liquid crystal compounds having the same tilt angle $\theta_5$ may be contained in one period of the periodic pattern.

In addition, one period of the periodic pattern in the liquid crystal layer 102 (alignment film 110) is preferably asymmetric in a periodic direction. In other words, it is preferable that the average value of the tilt angle $\theta_5$ of the disk-like liquid crystal compound in one period of the periodic pattern is other than 0. In a case where the liquid crystal layer 102 has disk-like liquid crystal compounds whose tilt directions are opposite to each other, the average value of the tilt angle may be calculated with one thereof as a negative angle.

Here, in the example shown in FIG. 1, the liquid crystal layer 102 has a configuration having a disk-like liquid crystal compound as the liquid crystal compound, but the present invention is not limited thereto, and the liquid crystal layer 102 may be configured to contain a rod-like liquid crystal compound.

In a case where the liquid crystal layer contains a rod-like liquid crystal compound, the liquid crystal layer may have a configuration in which the rod-like liquid crystal compounds having different angles (tilt angles) formed by the molecular axis (major axis) of the rod-like liquid crystal compound and the surface (X-Y plane) of the liquid crystal layer 102 are periodically arranged as in the case of the disk-like liquid crystal compound.

Alternatively, in a case where the liquid crystal layer contains a rod-like liquid crystal compound, the liquid crystal layer may have a configuration in which the azimuth direction of the molecular axis of the rod-like liquid crystal compound is arranged so as to swing along one direction in the plane (X-Y plane).

Figure 13:
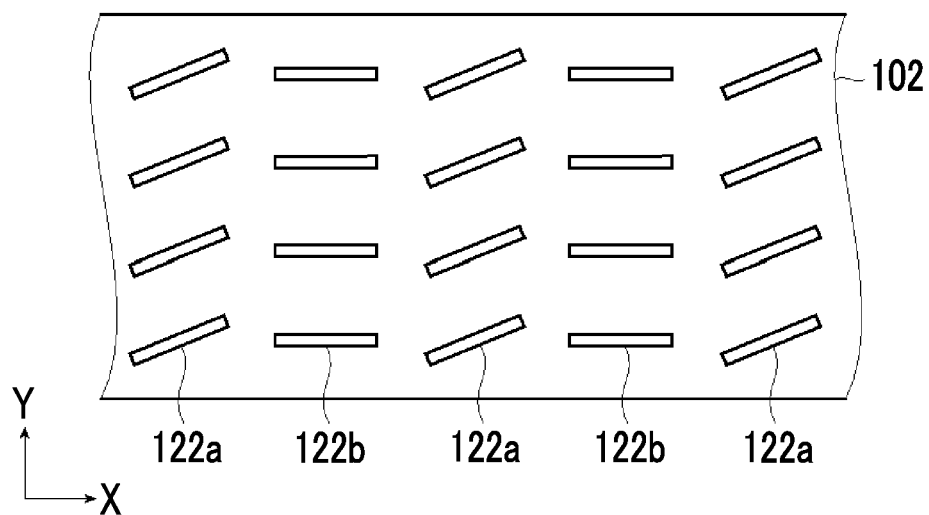
FIG. 13 is a schematic diagram of an X-Y plane of another example of the liquid crystal layer included in the liquid crystal diffraction element of the present invention.

For example, in the liquid crystal layer 120 shown in FIG. 13, a rod-like liquid crystal compound 122a and a rod-like liquid crystal compound 122b having different angles of the molecular axis with respect to the X direction are alternately arranged in an X direction in the X-Y plane.

Even in a case where the liquid crystal layer has a configuration in which the azimuth direction of the molecular axis of the rod-like liquid crystal compound is arranged so as to swing along one in-plane direction, one period $\Lambda$ of the liquid crystal alignment pattern of the liquid crystal compound of the cholesteric liquid crystal layer 10 becomes constant since the azimuthal angle regulating force on the liquid crystal compound of the cholesteric liquid crystal layer 10 disposed on the liquid crystal layer changes depending on the position in the X-Y plane.

In the liquid crystal layer, the length $G_1$ of one period of the periodic pattern of the liquid crystal compound may be set according to one period $\Lambda$ of the in-plane alignment pattern of the cholesteric liquid crystal layer to be prepared. Specifically, the length $G_1$ is preferably 0.1 μm to 5 μm, more preferably 0.2 μm to 3 μm, and still more preferably 0.3 μm to 1 μm.

Here, the average value of the inclination angle (tilt angle) $\theta_5$ of the liquid crystal compound 18 with respect to the surface of the liquid crystal layer 102 is, for example, preferably 20° to 90°, more preferably 20° to 80°, still more preferably 30° to 80°, and particularly preferably 30° to 65°.

The average inclination angle $\theta_5$ of the liquid crystal compound 18 with respect to the surface of the liquid crystal layer 102 can be measured by observing a cross section of the liquid crystal layer with a polarization microscope. The average inclination angle is a value obtained by measuring angles formed by the molecular axis $L_5$ of the disk-like liquid crystal compound 18 and the surface of the liquid crystal layer 102 at any 5 or more points in the observation of the cross section of the liquid crystal layer with a polarization microscope, and then arithmetically averaging the measured values.

In a case of adjusting the inclination angle of the disk-like liquid crystal compound in the liquid crystal layer, there is an advantage that the inclination angle of the molecular axis of the liquid crystal compound in the cholesteric liquid crystal layer with respect to the main surface can be easily adjusted to a predetermined angle. That is, taking the above-mentioned cholesteric liquid crystal layer 10 (see FIG. 1) as an example, there is an advantage that the average angle $\theta_3$ of the molecular axis $L_1$ of the liquid crystal compound 14 in the cholesteric liquid crystal layer 10 with respect to the main surface 11 can be easily adjusted.

In addition, by adjusting the azimuthal angle regulating force in the liquid crystal layer, the direction of the molecular axis of the liquid crystal compound is likely to change while continuously rotating in one in-plane direction on the main surface in the cholesteric liquid crystal layer. That is, in a case of taking the above-mentioned cholesteric liquid crystal layer 10 (see FIG. 1 and FIG. 2) as an example, by adjusting the azimuthal angle regulating force in the tilt alignment surface of the liquid crystal layer, the liquid crystal compound 14 is arranged along a plurality of parallel arrangement axes $D_1$ in the X-Y plane, and in the respective arrangement axes $D_1$, the direction of a molecular axis $L_1$ of the liquid crystal compound 14 is likely to change while continuously rotating in one in-plane direction along the arrangement axis $D_1$.

Although it is described in FIG. 1 that the helical axis of the cholesteric liquid crystal layer and the molecular axis of the disk-like liquid crystal compound are tilted in the opposite directions, the tilt directions may be the same.

In addition, in the liquid crystal diffraction element 50, it is sufficient that the disk-like liquid crystal compound 18 retains its alignment state in the layer, and finally the composition in the layer does not need to exhibit liquid crystallinity.

In the above-described embodiment, the alignment film has a configuration having a liquid crystal layer 102 formed of a liquid crystal compound as an alignment element having a different tilt angle, but the alignment element is not limited to the liquid crystal compound. For example, an azo molecule may be used as the alignment element.

In a case where an azo molecule is used as the alignment element, the azo molecule in the photoalignment layer 104 is aligned with a tilt angle, so that a layer having only a tilted alignment element is unnecessary, and the photoalignment layer 104 simultaneously satisfies two functions of imparting an inclination angle with respect to the liquid crystal compound of the cholesteric liquid crystal layer and imparting the alignment pattern of the alignment film.

<Photoalignment Layer 104>

The photoalignment layer 104 is a so-called photo-alignment film obtained by irradiating a photo-alignable material with polarized light or non-polarized light to form an alignment film. The photoalignment layer 104 is a layer for aligning the liquid crystal compound in the liquid crystal layer 102 in the above-mentioned periodic pattern. The photoalignment layer 104 has an in-plane alignment pattern in order to align the liquid crystal compound in the liquid crystal layer 102 in the above-mentioned periodic pattern.

In the example shown in FIG. 1, the photoalignment layer 104 has a configuration in which a region 104a where the liquid crystal compound in the liquid crystal layer 102 is tilt-aligned and a region 104b where the liquid crystal compound in the liquid crystal layer 102 is horizontally aligned are alternately arranged in an X direction.

The photoalignment layer 104 having such an alignment pattern can be formed by light irradiation and interference from two different directions in a case where the photo-alignment material is applied and dried on a support 12, and then the coating film is irradiated with light for exposure to light.

Preferred examples of the photo-alignment material used for the alignment film that can be used in the present invention include the azo compounds described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B; aromatic ester compounds described in JP2002-229039A; maleimide and/or alkenyl-substituted nadiimide compounds having a photo-alignment unit described in JP2002-265541A and JP2002-317013A; photocrosslinkable silane derivatives described in JP4205195B and JP4205198B; photocrosslinkable polyimides, photocrosslinkable polyamides, and photocrosslinkable polyesters described in JP2003-520878A, JP2004-529220A, and JP4162850B; and photodimerizable compounds, particularly cinnamate compounds, chalcone compounds, and coumarin compounds described in JP1997-118717A (JP-H09-118717A), JP1998-506420A (JP-H10-506420A), JP2003-505561A, WO2010/150748A, JP2013-177561A, and JP2014-12823A.

Among them, azo compounds, photocrosslinkable polyimides, photocrosslinkable polyamides, photocrosslinkable polyesters, cinnamate compounds, and chalcone compounds are suitably used.

The thickness of the photo-alignment film is not limited, and the thickness at which the required alignment function can be obtained may be appropriately set according to the material for forming the photo-alignment film. The thickness of the photo-alignment film is preferably 0.01 to 5 µm and more preferably 0.05 to 2 µm.

Figure 19:
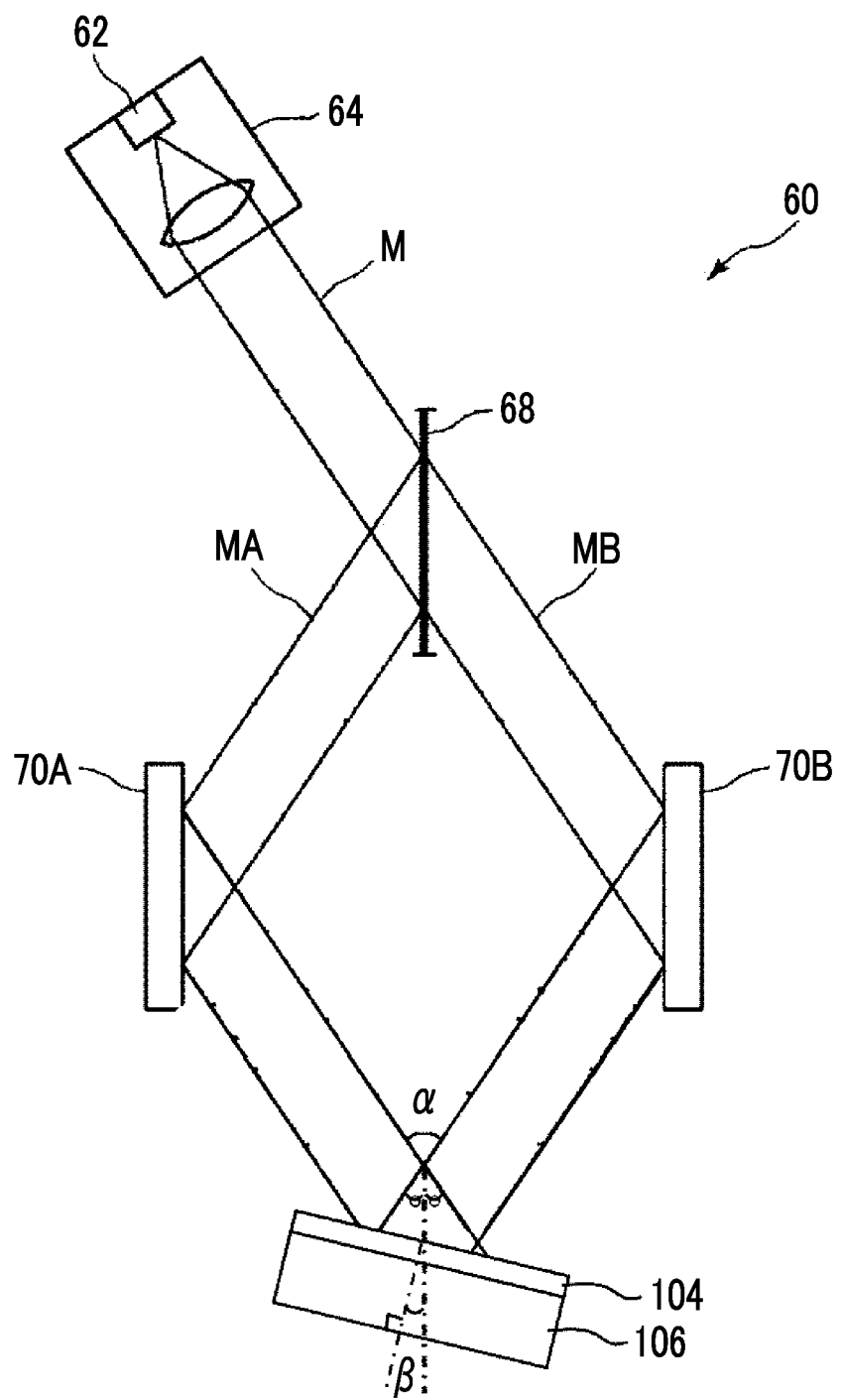
FIG. 19 is a schematic diagram for explaining an alignment treatment step.

FIG. 19 conceptually shows an example of an exposure device that exposes the photoalignment layer 104 to light to form an alignment pattern (see FIG. 1).

An exposure device 60 shown in FIG. 19 includes a light source 64 equipped with a laser 62, a beam splitter 68 that separates laser light M emitted by the laser 62 into two rays MA and MB, and mirrors 70A and 70B disposed on optical paths of the two separated rays MA and MB, respectively.

A support 106 having the photoalignment layer 104 before the alignment pattern is formed is disposed in the exposed portion, and the two ray MA and ray MB are crossed and interfered with each other on the photoalignment layer 104, and the photoalignment layer 104 is irradiated with the interfered light for exposure to light. At that time, as shown in FIG. 19, the exposure to light is carried out such that the angles of the two rays MA and MB with respect to the support 106 are different.

Due to the interference at this time, an alignment pattern in which the alignment state changes periodically is formed in the photoalignment layer 104.

In the exposure device 60, the period of the alignment pattern can be adjusted by changing an intersecting angle α of the two rays MA and MB and a tilt angle β of the substrate. That is, in the exposure device 60, the length $G_1$ of one period of the periodic pattern of the liquid crystal compound 18 in the liquid crystal layer 102 can be adjusted by adjusting the intersecting angle α and the tilt angle β of the substrate.

It is possible to form a cholesteric liquid crystal layer having a liquid crystal alignment pattern in which an optical axis $L_1$ derived from the liquid crystal compound 14 rotates continuously in one direction by forming a cholesteric liquid crystal layer on the liquid crystal layer 102 formed on the photoalignment layer 104 having such an alignment pattern in which the alignment state changes periodically.

The liquid crystal diffraction element according to the embodiment of the present invention may have another layer.

For example, the liquid crystal diffraction element according to the embodiment of the present invention may have an absorption layer that absorbs at least a part of light having a wavelength transmitting through the cholesteric liquid crystal layer (light absorption layer).

Including the absorption layer makes it possible to improve the visibility of the reflected light reflected by the cholesteric liquid crystal layer.

A material that absorbs light in a predetermined wavelength range may be used as the absorption layer. Alternatively, the absorption layer may have a configuration in which a light absorption material is contained in a resin.

For example, in a case where the light to be absorbed is visible light, a colored (particularly black) resin material, paper, inorganic material, or the like can be used as the absorption layer.

The light absorption material is not limited, and a known light absorption material can be used depending on the wavelength range to be absorbed. For example, in a case where the light to be absorbed is visible light, it is possible to use a known light absorbing agent, including, for example, an inorganic pigment such as carbon black or iron black, an organic pigment such as an insoluble azo pigment, and a dye such as azo or anthraquinone.

The type and concentration of the light absorption material may be appropriately selected according to the dispersibility in the resin to be dispersed, the solubility, the absorption wavelength, the absorption coefficient, the thickness of the support, and the like.

In addition, the liquid crystal diffraction element may have two or more cholesteric liquid crystal layers. For example, it is possible to diffract light in a plurality of wavelength ranges by including cholesteric liquid crystal layers having different selective reflection wavelengths.

In a case of having two or more cholesteric liquid crystal layers, another layer may be provided between any cholesteric liquid crystal layers of the two or more cholesteric liquid crystal layers. For example, a liquid crystal layer, a rubbing alignment layer, or a photoalignment layer may be included between the cholesteric liquid crystal layers.

In addition, the liquid crystal diffraction element according to the embodiment of the present invention may be used as a cholesteric liquid crystal layer alone by peeling off a liquid crystal layer and a photoalignment layer (alignment film), or may be used in the form of a cholesteric liquid crystal layer and a liquid crystal layer by peeling off a photoalignment layer.

Other Embodiments

The cholesteric liquid crystal layer 10 shown in FIG. 1 shows a configuration in which the direction of the molecular axis $L_1$ of the liquid crystal compound 14 changes while continuously rotating in one in-plane direction along the arrangement axis $D_1$ on both main surface 11 and main surface 12, but may have a configuration in which the direction of the molecular axis $L_1$ of the liquid crystal compound 14 changes while continuously rotating in one in-plane direction along the arrangement axis $D_1$ only on one main surface of the main surface 11 and the main surface 12.

In addition, in the cholesteric liquid crystal layer 10 of the first embodiment, the arrangement axis $D_1$ existing on the main surface 11 and the arrangement axis $D_1$ existing on the main surface 12 are preferably parallel to each other.

In addition, the cholesteric liquid crystal layer 10 shown in FIG. 1 may have a configuration in which there are a plurality of regions where intervals between the lines (bright lines) formed by the bright portions 15 derived from the cholesteric liquid crystalline phase observed by SEM in the X-Z plane are different in a thickness direction (Z direction). As described above, two bright portions 15 and two dark portions 16 correspond to one helical pitch. That is, in each region where the intervals between the bright lines derived from the cholesteric liquid crystalline phase are different from each other, the helical pitch is different from region to region, and therefore a central wavelength λ of selective reflection is also different from region to region. By making the cholesteric liquid crystal layer 10 have the above-mentioned configuration, the reflection wavelength range can be further widened.

As a specific example of the above-mentioned configuration, there is a configuration in which the cholesteric liquid crystal layer 10 has a region A1 having a central wavelength of selective reflection in a red light wavelength range, a region A2 having a central wavelength of selective reflection in a green light wavelength range, and a region A3 having a central wavelength of selective reflection in a blue light wavelength range. The region A1, the region A2, and the region A3 can be formed by mask exposure (patterned exposure) which is carried out by irradiating the main surface 11 (or the main surface 12) with light from an oblique direction (which is preferably carried out by irradiating light from a direction substantially parallel to the arrangement direction $P_1$).

Although the configuration in which the cholesteric liquid crystal layer 10 has the region A1, the region A2, and the region A3 has been described above, the present invention is not limited thereto. The cholesteric liquid crystal layer 10 may have a configuration having two or more regions having different selective reflection wavelengths. In addition, the central wavelength of selective reflection may be infrared or ultraviolet.

In addition, in the cholesteric liquid crystal layer of the present invention, the coefficient of variation of one period Λ is preferably 0.6 or less, more preferably 0.0 to 0.4, and still more preferably 0.0 to 0.1 in a case where the length by which the direction of the molecular axis of the liquid crystal compound rotates by 180° is defined as one period Λ, in the main surface in which the direction of the molecular axis of the liquid crystal compound changes while continuously rotating along at least one in-plane direction.

By setting the coefficient of variation of one period Λ to be 0.6 or less, the haze can be further reduced, and the circular polarization degree of the reflected light can be further increased.

The coefficient of variation of one period Λ is preferably in the above range on both main surface sides of the cholesteric liquid crystal layer.

The one period Λ corresponds to an interval between the bright and dark lines in the observation with a reflection polarization microscope. Therefore, the coefficient of variation (standard deviation/average value) of one period Λ may be calculated by measuring the intervals of the bright and dark lines in the observation with a reflection polarization microscope at 10 points on both main surfaces of the cholesteric liquid crystal layer.

In addition, the cholesteric liquid crystal layer of the present invention may have a configuration which has, in at least one main surface of the cholesteric liquid crystal layer, two or more regions among which one direction along which the direction of the molecular axis of the liquid crystal compound changes while continuously rotating in the plane, and reflects light in different directions in the two or more regions. That is, the cholesteric liquid crystal layer may have a configuration having two or more regions in which the directions of the arrangement axes are different.

For example, the cholesteric liquid crystal layer can have a configuration in which regions having different directions of the arrangement axes are formed in a striped shape. By the configuration having a plurality of regions having different directions of arrangement axes, it is possible to have a configuration in which light is reflected in different directions in each region.

In the present specification, the term "sense" for circularly polarized light means dextrorotatory circularly polarized light or levorotatory circularly polarized light. The sense of circularly polarized light is defined such that, in a case where light is viewed as it proceeds toward an observer and in a case where the distal end of the electric field vector rotates clockwise as time increases, the sense is dextrorotatory circularly polarized light, and in a case where it rotates counterclockwise, the sense is levorotatory circularly polarized light. In the present specification, the term "sense" may be used for the twisted direction of the helix of the cholesteric liquid crystal. Selective reflection by the cholesteric liquid crystal reflects dextrorotatory circularly polarized light and transmits levorotatory circularly polarized light in a case where the twisted direction (sense) of the helix of the cholesteric liquid crystal is right-handed, whereas it reflects levorotatory circularly polarized light and transmits dextrorotatory circularly polarized light in a case where the sense is left-handed.

For example, a liquid crystal diffraction element including a cholesteric liquid crystal layer exhibiting selective reflection properties in a visible light wavelength range (a wavelength of 400 to 750 nm) can diffract and reflect light in the visible light wavelength range.

The center wavelength λ of the selective reflection depends on the pitch P of the helical structure (=the period of the helix) in a cholesteric liquid crystalline phase and follows the relationship of the average refractive index n of the cholesteric liquid crystal layer and λ=n×P. Here, the center wavelength λ of the selective reflection of the cholesteric liquid crystal layer means a wavelength at the center position of the reflection peak of a circularly polarized reflection spectrum measured from the normal direction of the cholesteric liquid crystal layer. As can be seen from the above Expression, the center wavelength of the selective reflection can be adjusted by adjusting the pitch of the helical structure. Since the pitch of the cholesteric liquid crystalline phase depends on the type of the chiral agent or the addition concentration thereof, a desired pitch can be obtained by adjusting these factors. As a method for measuring sense or pitch of helix, methods described in "Easy Steps in Liquid Crystal Chemistry Experiment" p 46, edited by The Japanese Liquid Crystal Society, Sigma Publishing, published in 2007, and "Liquid Crystal Handbook" p 196, Editorial Committee of Liquid Crystal Handbook, Maruzen can be used.

In addition, a liquid crystal diffraction element capable of diffracting white light can be obtained by preparing and laminating cholesteric liquid crystal layers having an apparent center wavelength of the selective reflection in the red light wavelength range, the green light wavelength range, and the blue light wavelength range, respectively.

[Method for Producing Liquid Crystal Diffraction Element]

The method for producing a liquid crystal diffraction element according to the embodiment of the present invention is a method for producing the above-mentioned liquid crystal diffraction element, including an alignment film forming step of forming an alignment film having alignment elements, in which the alignment elements having different tilt angles are periodically arranged, or the alignment elements are arranged so that an azimuth direction of the alignment element swings along one in-plane direction, and a cholesteric liquid crystal layer forming step of forming a cholesteric liquid crystal layer on the alignment film, using a liquid crystal composition containing a liquid crystal compound, in which the liquid crystal composition contains two or more chiral agents, at least one of the chiral agents is any chiral agent selected from the group consisting of a chiral agent X whose helical twisting power changes upon irradiation with light and a chiral agent Y whose helical twisting power changes upon a change of temperature, and in the cholesteric liquid crystal layer forming step, in a case where the liquid crystal composition contains the chiral agent X, a light irradiation treatment is carried out to cholesterically align the liquid crystal compound, and in a case where the liquid crystal composition contains the chiral agent Y, a cooling treatment or a heat treatment is carried out to cholesterically align the liquid crystal compound.

In addition, the alignment film forming step includes an alignment treatment step of forming a photo-alignment film for forming an alignment element on the surface, and in the alignment treatment step, it is preferable to carry out the alignment treatment by interfering with light emitted from two different directions.

In addition, it is preferable that the alignment film has a liquid crystal layer containing a liquid crystal compound, and the liquid crystal compound in the liquid crystal layer is an alignment element. That is, it is preferable that, in the alignment film forming step, the alignment film is imparted with a periodic pattern by forming a liquid crystal layer in which liquid crystal compounds having different tilt angles are periodically arranged, or the azimuth directions of the molecular axes of the liquid crystal compounds are arranged so as to swing along one in-plane direction.

Hereinafter, the method for producing a liquid crystal diffraction element according to the embodiment of the present invention will be described in detail.

One embodiment of the method for producing a liquid crystal diffraction element according to the embodiment of the present invention includes the following step 1 and step 2.

Step 1: an alignment film forming step (step 1) of forming an alignment film having a liquid crystal layer containing a liquid crystal compound, and Step 2: a cholesteric liquid crystal layer forming step (step 2) of forming a cholesteric liquid crystal layer on the liquid crystal layer, using a composition containing a liquid crystal compound.

Hereinafter, the step 1 and the step 2 will be described in detail by taking the liquid crystal diffraction element 50 shown in FIG. 1 as an example.

[Step 1]

The step 1 is a step of forming an alignment film having a liquid crystal layer containing a disk-like liquid crystal compound.

The liquid crystal layer is aligned such that disk-like liquid crystal compounds having different inclination angles (tilt angles) of molecular axes are periodically arranged along one direction. In the production method according to the embodiment of the present invention, a cholesteric liquid crystal layer is formed on the surface of the liquid crystal layer having a surface in which the disk-like liquid crystal compound is aligned.

The specific method of the step 1 is not particularly limited and preferably includes the following step 1-1 and the following step 1-2.

In addition, in a case where the disk-like liquid crystal compound has a polymerizable group, in the step 1, it is preferable to carry out a curing treatment on the composition layer, as will be described later.

Step 1-1: an alignment treatment step of forming a photo-alignment film having a predetermined alignment pattern on a substrate for forming a liquid crystal layer on a surface Step 1-2: a liquid crystal layer forming step of forming a composition (composition for forming a liquid crystal layer) layer containing a disk-like liquid crystal compound on the photoalignment layer Hereinafter, the step 1 will be described.

<Substrate>

The substrate is a plate that supports a composition layer which will be described later. Among others, a transparent substrate is preferable. The transparent substrate is intended to refer to a substrate having a visible light transmittance of 60% or more and preferably has a visible light transmittance of 80% or more and more preferably 90% or more.

The material constituting the substrate is not particularly limited, and examples thereof include a cellulose-based polymer, a polycarbonate-based polymer, a polyester-based polymer, a (meth)acrylic polymer, a styrene-based polymer, a polyolefin-based polymer, a vinyl chloride-based polymer, an amide-based polymer, an imide-based polymer, a sulfone-based polymer, a polyether sulfone-based polymer, and a polyether ether ketone-based polymer.

The substrate may contain various additives such as an ultraviolet (UV) absorber, a matting agent fine particle, a plasticizer, a deterioration inhibitor, and a release agent.

In addition, the substrate preferably has low birefringence in the visible light region. For example, the phase difference at a wavelength of 550 nm of the substrate is preferably 50 nm or less and more preferably 20 nm or less.

The thickness of the substrate is not particularly limited, but it is preferably 10 to 200 µm and more preferably 20 to 100 µm from the viewpoint of thinning and handleability.

The thickness is intended to refer to an average thickness, and is obtained by measuring thicknesses at any five places of the substrate and then arithmetically averaging the measured values. Regarding the method of measuring the thickness, the same applies to the thickness of the liquid crystal layer and the thickness of the cholesteric liquid crystal layer.

<Step 1-1>

The step 1-1 is an alignment treatment step of forming a photoalignment layer having a predetermined alignment pattern on a substrate for forming a liquid crystal layer on a surface. As described above, in the alignment treatment step (method for forming a photo-alignment film), a coating liquid containing a photo-alignment material is applied and dried on a substrate, and then a photoalignment layer having an alignment pattern as shown in FIG. 1 is formed by subjecting the photoalignment layer before exposure to light to irradiation and interference of light from two different directions, by using an exposure device as shown in FIG. 19.

<Step 1-2>

The step 1-2 is a liquid crystal layer forming step of forming a composition (composition for forming a liquid crystal layer) layer containing a disk-like liquid crystal compound on the photoalignment layer.

The step 1-2 includes, for example, a step of forming a composition layer containing a disk-like liquid crystal compound on the photoalignment layer, a step of aligning the disk-like liquid crystal compound in the composition layer in a predetermined periodic pattern, and a step of curing a composition layer containing the aligned disk-like liquid crystal compound.

The method for forming the composition layer of the composition for forming a liquid crystal layer is not limited, is preferably coating.

The application method is not particularly limited, and examples thereof include a wire bar coating method, an extrusion coating method, a direct gravure coating method, a reverse gravure coating method, and a die-coating method.

If necessary, a treatment for drying the composition layer applied onto the substrate may be carried out after application of the composition for forming a liquid crystal layer. The solvent can be removed from the composition layer by carrying out the drying treatment.

The thickness of the composition layer is not particularly limited and is preferably 0.1 to 20 μm, more preferably 0.2 to 15 μm, and still more preferably 0.5 to 10 μm.

The alignment treatment method for aligning the disk-like liquid crystal compound in the composition layer may be, for example, a method of heating the composition layer.

As to preferred heating conditions, it is preferable to heat the composition layer at 40° C. to 150° C. (preferably 60° C. to 100° C.) for 0.5 to 5 minutes (preferably 0.5 to 2 minutes). In a case of heating the composition layer, it is preferable not to heat the composition layer to a temperature at which the liquid crystal compound is in an isotropic phase (Iso). In a case where the composition layer is heated above the temperature at which the disk-like liquid crystal compound becomes an isotropic phase, defects of the tilt-aligned liquid crystalline phase are increased, which is not preferable.

By the alignment treatment, the disk-like liquid crystal compound in the composition layer is aligned according to the alignment pattern of the photoalignment layer. For example, in the example shown in FIG. 1, the disk-like liquid crystal compound 18a present on the region 104a of the photoalignment layer 104 is tilt-aligned with respect to the surface, and the disk-like liquid crystal compound 18b present on the region 104b is aligned parallel to the surface. As a result, the liquid crystal compounds 18 having different tilt angles are periodically arranged in the composition layer.

In a case where the disk-like liquid crystal compound has a polymerizable group, it is preferable to carry out a curing treatment on the composition layer.

The method of the curing treatment is not particularly limited, and examples thereof include a photo curing treatment and a thermal curing treatment. Among them, a light irradiation treatment is preferable, and an ultraviolet irradiation treatment is more preferable. In a case where the disk-like liquid crystal compound has a polymerizable group, the curing treatment is preferably a polymerization reaction upon irradiation with light (particularly ultraviolet irradiation), and more preferably a radical polymerization reaction upon irradiation with light (particularly ultraviolet irradiation).

For ultraviolet irradiation, a light source such as an ultraviolet lamp is used.

The irradiation energy amount of ultraviolet rays is not particularly limited, but it is generally preferably about 100 to 800 mJ/cm$^2$. The irradiation time of the ultraviolet rays is not particularly limited, but it may be determined as appropriate from the viewpoint of both sufficient strength and productivity of the obtained layer.

<Composition for Forming Liquid Crystal Layer>

Hereinafter, the composition for forming a liquid crystal layer will be described.

The composition for forming a liquid crystal layer contains a liquid crystal compound. The liquid crystal compound may be a disk-like liquid crystal compound or a rod-like liquid crystal compound. As the rod-like liquid crystal compound, a liquid crystal compound similar to the rod-like liquid crystal compound used for the cholesteric liquid crystal layer which will be described later is used.

(Disk-Like Liquid Crystal Compound)

The disk-like liquid crystal compound is not particularly limited, and known compounds can be used, but among them, those having a triphenylene skeleton are preferable.

The disk-like liquid crystal compound may have a polymerizable group. The type of the polymerizable group is not particularly limited, and a functional group capable of addition polymerization reaction is preferable, and a polymerizable ethylenic unsaturated group or a cyclic polymerizable group is more preferable. More specifically, the polymerizable group is preferably a (meth)acryloyl group, a vinyl group, a styryl group, an allyl group, an epoxy group, or an oxetane group, and more preferably a (meth)acryloyl group.

(Polymerization Initiator)

The composition for forming a liquid crystal layer may contain a polymerization initiator. In particular, in a case where the disk-like liquid crystal compound has a polymerizable group, the composition for forming a liquid crystal layer preferably contains a polymerization initiator.

The polymerization initiator is preferably a photopolymerization initiator capable of initiating a polymerization reaction upon irradiation with ultraviolet rays. Examples of the photopolymerization initiator include α-carbonyl compounds (as described in U.S. Pat. Nos. 2,367,661A and 2,367,670A), acyloin ethers (as described in U.S. Pat. No. 2,448,828A), α-hydrocarbon-substituted aromatic acyloin compounds (as described in U.S. Pat. No. 2,722,512A), polynuclear quinone compounds (as described in U.S. Pat. Nos. 3,046,127A and 2,951,758A), combinations of triarylimidazole dimer and p-aminophenyl ketone (as described in U.S. Pat. No. 3,549,367A), acridine and phenazine compounds (as described in JP1985-105667A (JP-S60-105667A) and U.S. Pat. No. 4,239,850A), and oxadiazole compounds (as described in U.S. Pat. No. 4,212,970A).

The content of the polymerization initiator in the composition for forming a liquid crystal layer (the total amount of polymerization initiators in a case where a plurality of polymerization initiators are contained) is not particularly limited, but it is preferably 0.1% to 20% by mass and more preferably 1.0% to 8.0% by mass with respect to the total mass of the disk-like liquid crystal compound.

(Surfactant)

The composition for forming a liquid crystal layer may contain a surfactant that can be unevenly distributed on the substrate-side surface of the composition layer and/or the surface of the composition layer opposite to the substrate. In a case where the composition for forming a liquid crystal layer contains a surfactant, the disk-like compound is easily aligned at a desired inclination angle.

Examples of the surfactant include an onium salt compound (as described in JP2012-208397A), a boronic acid compound (as described in JP2013-54201A), a perfluoroalkyl compound (as described in JP4592225B, for example, FTERGENT of Neos Corporation), and polymers containing these functional groups.

The surfactants may be used alone or in combination of two or more thereof.

The content of the surfactant in the composition for forming a liquid crystal layer (the total amount of surfactants in a case where a plurality of surfactants are contained) is not particularly limited, but it is preferably 0.01% to 10% by mass, more preferably 0.01% to 5.0% by mass, and still more preferably 0.01% to 2.0% by mass with respect to the total mass of the disk-like compound.

(Solvent)

The composition for forming a liquid crystal layer may contain a solvent.

The solvent may be, for example, water or an organic solvent. Examples of the organic solvent include amides such as N,N-dimethylformamide; sulfoxides such as dimethylsulfoxide; heterocyclic compounds such as pyridine; hydrocarbons such as benzene and hexane; alkyl halides such as chloroform and dichloromethane; esters such as methyl acetate, butyl acetate, and propylene glycol monoethyl ether acetate; ketones such as acetone, methyl ethyl ketone, cyclohexanone, and cyclopentanone; ethers such as tetrahydrofuran and 1,2-dimethoxyethane; and 1,4-butanediol diacetate. These solvents may be used alone or in combination of two or more thereof.

(Other Additives)

The composition for forming a liquid crystal layer may contain one or two or more other additives such as an antioxidant, an ultraviolet absorber, a sensitizer, a stabilizer, a plasticizer, a chain transfer agent, a polymerization inhibitor, an antifoaming agent, a leveling agent, a thickener, a flame retardant, a surface-active substance, a dispersant, and a coloring material such as a dye and a pigment.

[Step 2]

The step 2 is a step of forming a cholesteric liquid crystal layer on a liquid crystal layer using a composition containing a liquid crystal compound. Hereinafter, the step 2 will be described.

The step 2 preferably includes the following step 2-1 and the following step 2-2.

Step 2-1:

A step of forming a composition layer satisfying the following condition 1 or the following condition 2 on the liquid crystal layer formed in the step 1

Condition 1: at least a part of the liquid crystal compound in the composition layer is tilt-aligned with respect to a surface of the composition layer Condition 2: The liquid crystal compound is aligned such that a tilt angle of the liquid crystal compound in the composition layer continuously changes along a thickness direction Step 2-2:

a step of subjecting a liquid crystal compound in a composition layer to a cholesteric alignment treatment to form a cholesteric liquid crystal layer.

Hereinafter, the step 2-1 and the 2-2 will be described.

<Action Mechanism of Step 2-1>

Figure 14:
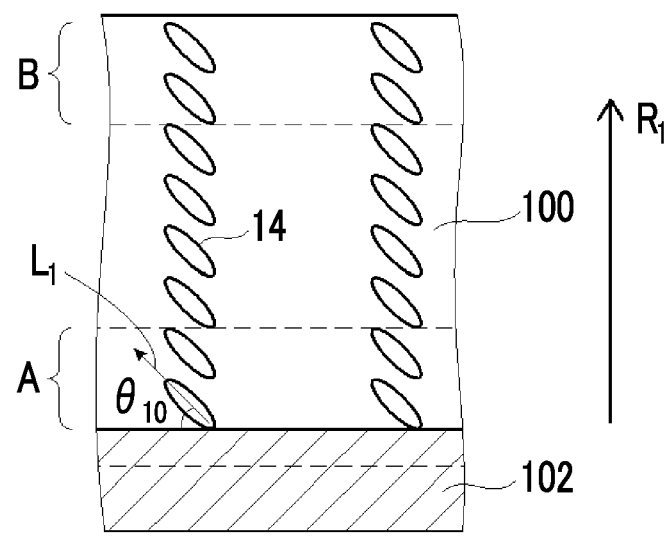
FIG. 14 is a schematic cross-sectional diagram for explaining an example of an embodiment of a composition layer satisfying a condition 1 in a step 2-1.

First, FIG. 14 shows a schematic cross-sectional diagram of a composition layer satisfying the condition 1 obtained in the step 2-1. The liquid crystal compound 14 shown in FIG. 14 is a rod-like liquid crystal compound.

As shown in FIG. 14, a composition layer 100 is formed on a liquid crystal layer 102 formed using a disk-like liquid crystal compound. The liquid crystal layer 102 has a periodic pattern in which a disk-like liquid crystal compound in which the molecular axis of the disk-like liquid crystal compound is tilted with respect to the surface of the liquid crystal layer 102 and a disk-like liquid crystal compound in which the molecular axis of the disk-like liquid crystal compound is not tilted are periodically arranged on the surface on the side in contact with the composition layer 100.

As shown in FIG. 14, in the composition layer 100 disposed on the liquid crystal layer 102, the liquid crystal compound 14 is loosely alignment-regulated by the liquid crystal layer 102, and thus is aligned so as to be tilted with respect to the surface of the liquid crystal layer. In other words, in the composition layer 100, the liquid crystal compound 14 is aligned in a fixed direction (uniaxial direction) such that the molecular axis $L_1$ of the liquid crystal compound 14 forms a predetermined angle $\theta_{10}$ with respect to the surface of the composition layer 100.

The liquid crystal layer 102 contains a tilted disk-like liquid crystal compound and a non-tilted disk-like liquid crystal compound, but the liquid crystal compound 14 in the composition layer 100 is aligned according to the average alignment regulation of the liquid crystal layer 102.

FIG. 14 shows an embodiment in which the liquid crystal compound 14 is aligned over the entire area of the composition layer 100 in a thickness direction $R_1$ such that the molecular axis $L_1$ forms a predetermined angle $\theta_{10}$ with respect to the tilt alignment surface 102a, but the composition layer satisfying the condition 1 obtained in the step 2-1 may be sufficient such that a part of the liquid crystal compound 14 is tilt-aligned; and, in at least one of the surface of the composition layer 100 on the liquid crystal layer 102 side (corresponding to a region A in FIG. 14) or the surface of the composition layer 100 opposite to the liquid crystal layer 102 side (corresponding to a region B in FIG. 14), the liquid crystal compound 14 is preferably aligned such that the molecular axis $L_1$ forms a predetermined angle $\theta_{10}$ with respect to the surface of the composition layer 100, and the liquid crystal compound 14 is more preferably tilt-aligned on the surface of the composition layer 100 on the liquid crystal layer 102 side such that the molecular axis $L_1$ forms a predetermined angle $\theta_{10}$ with respect to the surface of the composition layer 100. In at least one of the region A or the region B, in a case where the liquid crystal compound 14 is aligned such that the molecular axis $L_1$ forms a predetermined angle $\theta_{10}$ with respect to the surface of the composition layer 100, and then in a case where the liquid crystal compound 14 is brought into a state of a cholesteric liquid crystalline phase in the subsequent step 2-2, the cholesteric alignment of the liquid crystal compound 14 in the other region can be induced by an alignment regulating force based on the aligned liquid crystal compound 14 in the region A and/or the region B.

In addition, although not shown, the composition layer satisfying the above-mentioned condition 2 corresponds to the composition layer 100 shown in FIG. 14 in which the liquid crystal compound 14 is hybrid-aligned with respect to the surface of the composition layer 100. That is, this corresponds to an aspect in which the angle $\theta_{10}$ continuously changes in a thickness direction, in the above description of FIG. 14. Specifically, the liquid crystal compound 14 is aligned such that its tilt angle $\theta$ (an angle of the molecular axis $L_1$ with respect to the surface of the composition layer 100) continuously changes along the thickness direction of the composition layer 100.

The composition layer satisfying the condition 2 obtained in the step 2-1 may be sufficient such that a part of the liquid crystal compound 14 is hybrid-aligned; and, in at least one of the surface of the composition layer 100 on the liquid crystal layer 102 side (corresponding to a region A in FIG. 14) or the surface of the composition layer 100 opposite to the liquid crystal layer 102 side (corresponding to a region B in FIG. 14), the liquid crystal compound 14 is preferably hybrid-aligned with respect to the surface of the composition layer 100, and the liquid crystal compound 14 is more preferably hybrid-aligned with respect to the surface of the composition layer 100 on the surface of the liquid crystal layer 102 side.

The angles $\theta_{10}$ is not particularly limited unless they are 0° in the entire composition layer (in a case where the angle $\theta_{10}$ is 0° in the entire composition layer, the molecular axis $L_1$ of the liquid crystal compound 14 is parallel to the composition layer surface in a case where the liquid crystal compound 14 is a rod-like liquid crystal compound). In other words, it does not prevent that the angles $\theta_{10}$ is 0° in a partial region of the composition layer.

The angles $\theta_{10}$ is, for example, 0° to 90°. Above all, the angles $\theta_{10}$ is preferably 0° to 50° and more preferably 0° to 10°.

<Action Mechanism of Step 2-2>

After obtaining the composition layer satisfying the condition 1 or the condition 2 by the step 2-1, the liquid crystal compound in the composition layer is cholesterically aligned in the step 2-2 (in other words, the liquid crystal compound is brought into a cholesteric liquid crystalline phase) to form a cholesteric liquid crystal layer.

As a result, the cholesteric liquid crystal layer (the cholesteric liquid crystal layer 10 shown in FIG. 1 and FIG. 2) is obtained.

<Action Mechanism of Liquid Crystal Composition>

The present inventors have found, as one of the methods for achieving a method for producing a cholesteric liquid crystal layer, a method of using a liquid crystal composition containing a chiral agent X whose helical twisting power (HTP) changes upon irradiation with light, or a chiral agent Y whose helical twisting power changes upon a change of temperature. Hereinafter, the action mechanism of the liquid crystal composition containing the chiral agent X and the action mechanism of the liquid crystal composition containing the chiral agent Y will be described in detail.

The helical twisting power (HTP) of the chiral agent is a factor indicating the helical alignment ability expressed by Expression (1A).

$$HTP = 1/(\text{length (unit: } \mu m) \text{ of helical pitch} \times \text{concentration (\% by mass) of chiral agent with respect to liquid crystal compound)} \, [\mu m^{-1}] \quad \text{Expression (1A)}$$

The length of the helical pitch refers to the length of the pitch P (=period of the helix) of the helical structure of the cholesteric liquid crystalline phase and can be measured by the method described on page 196 of the Liquid Crystal Handbook (published by Maruzen Co., Ltd.).

In addition, the value of HTP is influenced not only by the type of chiral agent but also by the type of liquid crystal compound contained in the composition. Therefore, for example, in a case where a composition containing a predetermined chiral agent X and a liquid crystal compound A and a composition containing a predetermined chiral agent X and a liquid crystal compound B different from the liquid crystal compound A are prepared, and HTPs of both compositions are measured at the same temperature, the values of HTPs thus measured may be different therebetween.

In addition, the helical twisting power (HTP) of the chiral agent is also expressed as Expression (1B).

$$HTP = (\text{average refractive index of liquid crystal compound})/\{(\text{concentration (\% by mass) of chiral agent with respect to liquid crystal compound}) \times (\text{central relection wavelength (nm)})\} \, [\mu m^{-1}] \quad \text{Expression (1B)}$$

In a case where the liquid phase composition contains two or more types of chiral agents, the "concentration of chiral agent in liquid crystal composition" in Expressions (1A) and (1B) corresponds to the sum of the concentrations of all the chiral agents.

(Action Mechanism of Liquid Crystal Composition Containing Chiral Agent X)

Hereinafter, a method for forming a cholesteric liquid crystal layer using a liquid crystal composition containing the chiral agent X will be described.

In a case where a cholesteric liquid crystal layer is formed using a liquid crystal composition containing a chiral agent X, a composition layer satisfying the condition 1 or the condition 2 is formed in the step 2-1, and then the composition layer is subjected to a light irradiation treatment in the step 2-2, whereby a liquid crystal compound in the composition layer is cholesterically aligned. That is, in the step 2-2, the liquid crystal compound in the composition layer is cholesterically aligned by changing the helical twisting power of the chiral agent X in the composition layer by the light irradiation treatment.

Here, in a case where the liquid crystal compound in the composition layer is aligned into a state of a cholesteric liquid crystalline phase, the helical twisting power that induces the helix of the liquid crystal compound is considered to roughly correspond to the weighted average helical twisting power of the chiral agents contained in the composition layer. The weighted average helical twisting power here is represented by Expression (1C), for example, in a case where two types of chiral agents (chiral agent A and chiral agent B) are used in combination.

$$\text{Weighted average helical twisting power } (\mu m^{-1}) = \qquad \text{Expression (1C)}$$
$$(\text{helical twisting power } (\mu m^{-1}) \text{ of chiral agent } A \times$$
$$\text{concentration (\% by mass) of chiral agent } A \text{ with}$$
$$\text{respect to liquid crystal compound} + \text{helical twisting}$$
$$\text{power } (\mu m^{-1}) \text{ of chiral agent } B) \times \text{concentration}$$
$$(\% \text{ by mass) of chiral agent } B \text{ with respect to liquid}$$
$$\text{crystal compound}) / (\text{concentration (\% by mass) of}$$
$$\text{chiral agent } A \text{ with respect to liquid crystal}$$
$$\text{compound} + \text{concentration (\% by mass) of chiral}$$
$$\text{agent } B \text{ with respect to liquid crystal compound})$$

However, in Expression (1C), in a case where the helical direction of the chiral agent is dextrorotatory, the helical twisting power has a positive value. In addition, in a case where the helical direction of the chiral agent is left-handed, the helical twisting power has a negative value. That is, for example, in a case of a chiral agent having a helical twisting power of 10 $\mu m^{-1}$, the helical twisting power is expressed as 10 $\mu m^{-1}$ in a case where the helical direction of the helix induced by the chiral agent is right-handed. On the other hand, in a case where the helical direction of the helix induced by the chiral agent is left-handed, the helical twisting power is expressed as −10 $\mu m^{-1}$.

The weighted average helical twisting power ($\mu m^{-1}$) obtained by Expression (1C) can also be calculated from Expression (1A) and Expression (1B).

Hereinafter, for example, the weighted average helical twisting power in a case where the composition layer contains the chiral agent A and the chiral agent B having the following characteristics will be described.

Figure 15:
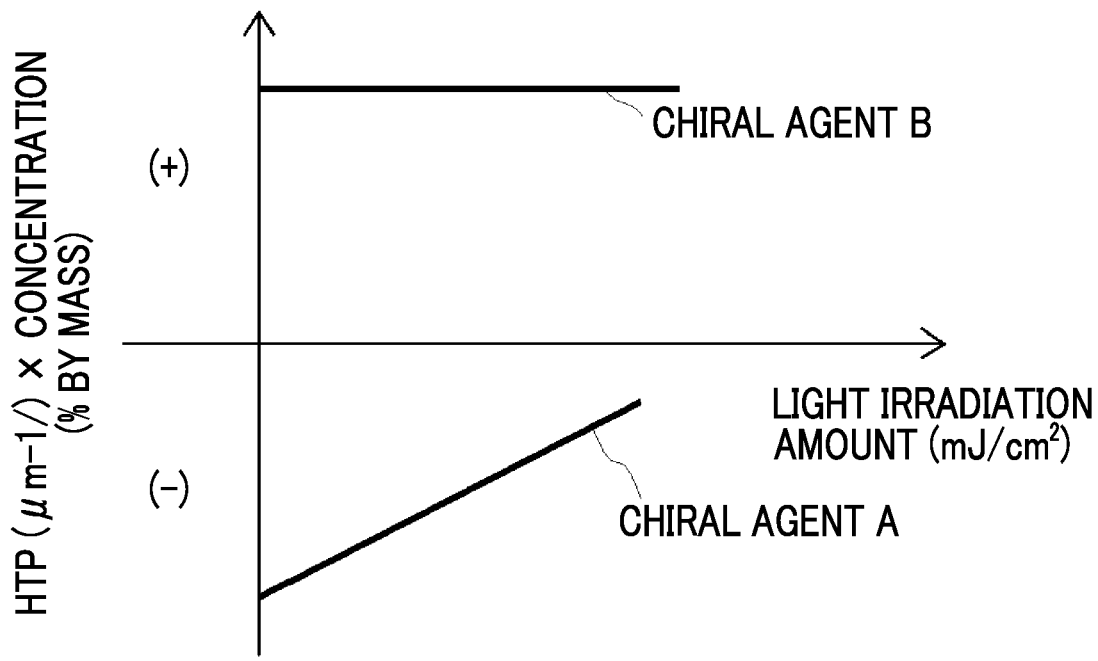
FIG. 15 is a schematic diagram of a graph plotting a relationship between a helical twisting power (HTP) ($\mu m^{-1}$)×a concentration (% by mass) and a light irradiation amount ($mJ/cm^2$) for each of chiral agent A and chiral agent B.

As shown in FIG. 15, the chiral agent A is a chiral agent that corresponds to the chiral agent X, has a left-handed (−) helical twisting power, and reduces the helical twisting power depending on irradiation with light.

In addition, as shown in FIG. 15, the chiral agent B is a chiral agent which has a right-handed (+) helical twisting power opposite to that of the chiral agent A, and has a helical twisting power that is not changed depending on irradiation with light. Here, "helical twisting power of chiral agent A ($\mu m^{-1}$)×concentration of chiral agent A (% by mass)" and "helical twisting power of chiral agent B ($\mu m^{-1}$)×concentration of chiral agent B (% by mass)" at the time of no light irradiation treatment are equal. In addition, in FIG. 15, with regard to the "helical twisting power of chiral agent ($\mu m^{-1}$)×concentration (% by mass) of chiral agent" on the vertical axis, the more the value thereof deviates from zero, the larger the helical twisting power.

Figure 16:
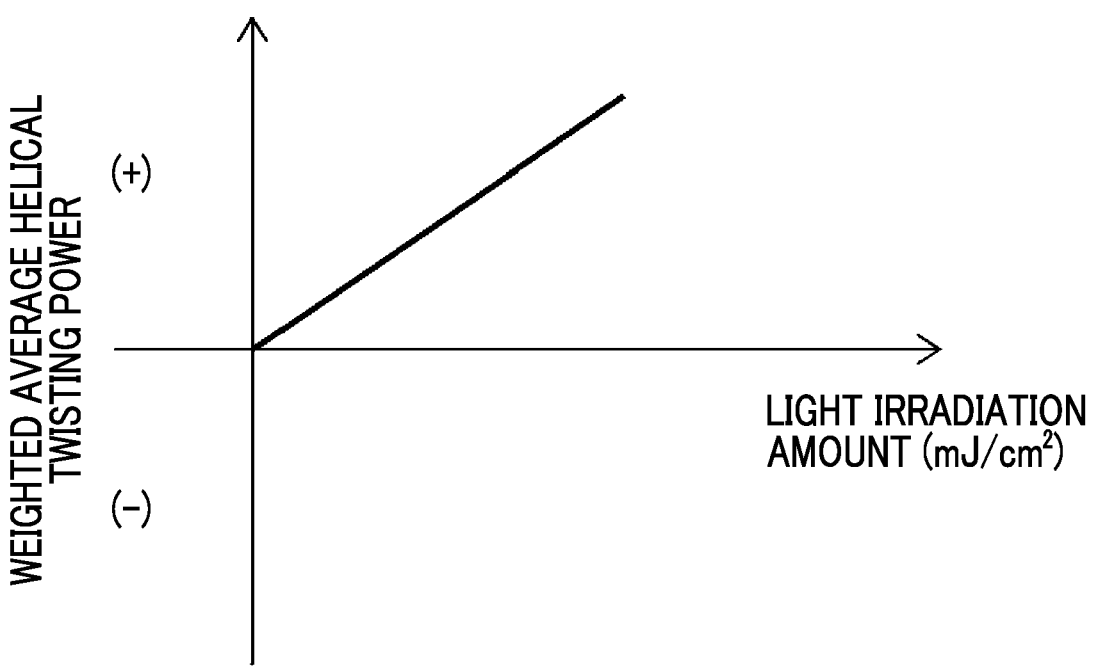
FIG. 16 is a schematic diagram of a graph plotting the relationship between a weighted average helical twisting power ($\mu m^{-1}$) and a light irradiation amount ($mJ/cm^2$) in a system in which chiral agent A and chiral agent B are used in combination.

In a case where the composition layer contains the chiral agent A and the chiral agent B, the helical twisting power that induces the helix of the liquid crystal compound matches the weighted average helical twisting power of the chiral agent A and the chiral agent B. As a result, in a system in which the chiral agent A and the chiral agent B are used in combination, as shown in FIG. 16, it is considered that a larger light irradiation amount leads to an increase in helical twisting power that induces the helix of the liquid crystal compound in the direction (+) of the helix induced by the chiral agent B (which corresponds to chiral agent Y).

In the method for producing a cholesteric liquid crystal layer, the absolute value of the weighted average helical twisting power of the chiral agent in the composition layer formed in the step 2-1 is not particularly limited, but from the viewpoint of easy formation of the composition layer, it is, for example, preferably 0.0 to 1.9 $\mu m^{-1}$, more preferably 0.0 to 1.5 $\mu m^{-1}$, still more preferably 0.0 to 0.5 $\mu m^{-1}$, and most preferably zero (see FIG. 15). On the other hand, in the light irradiation treatment of the step 2-2, the absolute value of the weighted average helical twisting power of the chiral agent in the composition layer is not particularly limited as long as the liquid crystal compound can be cholesterically aligned, but it is preferably 10.0 $\mu m^{-1}$ or more, more preferably 10.0 to 200.0 $\mu m^{-1}$, and still more preferably 20.0 to 200.0 $\mu m^{-1}$.

That is, in the step 2-1, the helical twisting power of the chiral agent X in the composition layer is offset to almost zero, and therefore the liquid crystal compound in the composition layer can be aligned into tilt alignment or hybrid alignment. Next, the light irradiation treatment in the step 2-2 is used as a trigger to change the helical twisting power of the chiral agent X such that the weighted average helical twisting power of the chiral agent in the composition layer is increased either in the right-handed direction (+) or in the left-handed direction (−), whereby the cholesteric liquid crystal layer (for example, the cholesteric liquid crystal layer 10) can be obtained.

Here, as described above, the present invention has a configuration in which the alignment film 110 has a periodic pattern by periodic arrangement of liquid crystal compounds 18 having different tilt angles in the liquid crystal layer 102. As a result, the alignment film 110 has a periodic pattern in which a region having a large azimuthal angle regulating force and a region having a small azimuthal angle regulating force are periodically arranged. Therefore, in the step 2-2, in a case where the liquid crystal compound 14 in the composition layer is cholesterically aligned by carrying out the light irradiation treatment, the liquid crystal compound 14 present on a region having a large azimuthal angle regulating force, that is, a region in which the liquid crystal compound 18 having a large tilt angle is present, is aligned in a predetermined direction by this azimuthal angle regulating force, and the other liquid crystal compounds 14 are cholesterically aligned starting from this liquid crystal compound 14. Since the liquid crystal compound 18 in the liquid crystal layer 102 is arranged periodically, the liquid crystal compound 14 in the cholesterically aligned cholesteric liquid crystal layer 10 is aligned according to this period. Therefore, one period Λ of the liquid crystal alignment pattern of the cholesteric liquid crystal layer 10 is uniformly formed.

(Action Mechanism of Liquid Crystal Composition Containing Chiral Agent Y)

Next, a method for forming a cholesteric liquid crystal layer using a liquid crystal composition containing a chiral agent Y will be described.

In a case where a cholesteric liquid crystal layer is formed using a liquid crystal composition containing a chiral agent Y, a composition layer satisfying the condition 1 or the condition 2 is formed in the step 2-1, and then the composition layer is subjected to a cooling treatment or a heating treatment in the step 2-2, whereby a liquid crystal compound in the composition layer is cholesterically aligned. That is, in the step 2-2, the liquid crystal compound in the composition layer is cholesterically aligned by changing the helical twisting power of the chiral agent Y in the composition layer by the cooling treatment or the heating treatment.

As described above, in a case where the liquid crystal compound in the composition layer is aligned into a state of cholesteric liquid crystalline phase, the helical twisting power that induces the helix of the liquid crystal compound is considered to roughly correspond to the weighted average helical twisting power of the chiral agents contained in the composition layer. The weighted average helical twisting power here is as described above.

Hereinafter, the action mechanism of the chiral agent Y will be described by taking an embodiment in which the liquid crystal compound in the composition layer is cholesterically aligned by carrying out the cooling treatment in the step 2-2 as an example.

First, in the following, for example, the weighted average helical twisting power in a case where the composition layer contains the chiral agent A and the chiral agent B having the following characteristics will be described.

Figure 17:
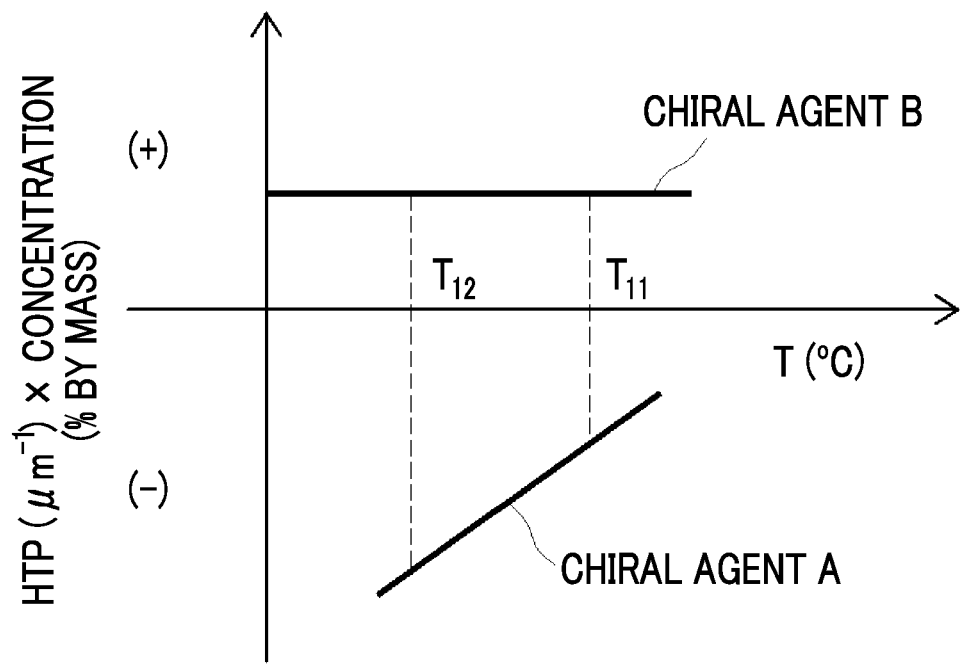
FIG. 17 is a schematic diagram of a graph plotting a relationship between a HTP ($\mu m^{-1}$)×a concentration (% by mass) and a temperature (° C.) for each of chiral agent A and chiral agent B.

As shown in FIG. 17, the chiral agent A corresponds to the chiral agent Y and is a chiral agent which has a left-handed (−) helical twisting power at a temperature $T_{11}$ at which an alignment treatment of the liquid crystal compound for forming the composition layer satisfying the condition 1 or the condition 2 is carried out in the step 1 and at a temperature $T_{12}$ at which the cooling treatment in the step 2-2 is carried out and whose left-handed (−) helical twisting power is increased as the temperature is lower. In addition, as shown in FIG. 17, the chiral agent B is a chiral agent which has a right-handed (+) helical twisting power opposite to that of the chiral agent A, and has a helical twisting power that is not changed depending on a change of temperature. Here, "helical twisting power of chiral agent A ($\mu m^{-1}$)× concentration of chiral agent A (% by mass)" and "helical twisting power of chiral agent B ($\mu m^{-1}$)×concentration of chiral agent B (% by mass)" at the temperature $T_{11}$ are equal.

In a case where the composition layer contains the chiral agent A and the chiral agent B, the helical twisting power that induces the helix of the liquid crystal compound matches the weighted average helical twisting power of the chiral agent A and the chiral agent B. As a result, in a system in which the chiral agent A and the chiral agent B are used in combination, as shown in FIG. 18, it is considered that a lower temperature region leads to an increase in helical twisting power that induces the helix of the liquid crystal compound in the direction (−) of the helix induced by the chiral agent A (which corresponds to chiral agent Y).

In the method for producing a cholesteric liquid crystal layer of the present embodiment, the absolute value of the weighted average helical twisting power of the chiral agent in the composition layer is not particularly limited, but in a case of forming a composition layer satisfying the condition 1 or the condition 2 of the step 2-1 (that is, in a case of the present embodiment, at the temperature $T_{11}$ at which an alignment treatment of a liquid crystal compound for forming a composition layer satisfying the condition 1 or the condition 2 is carried out), it is preferably 0.0 to 1.9 $\mu m^{-1}$, more preferably 0.0 to 1.5 $\mu m^{-1}$, still more preferably 0.0 to 0.5 $\mu m^{-1}$, and most preferably zero, from the viewpoint of easy formation of the composition layer.

Figure 18:
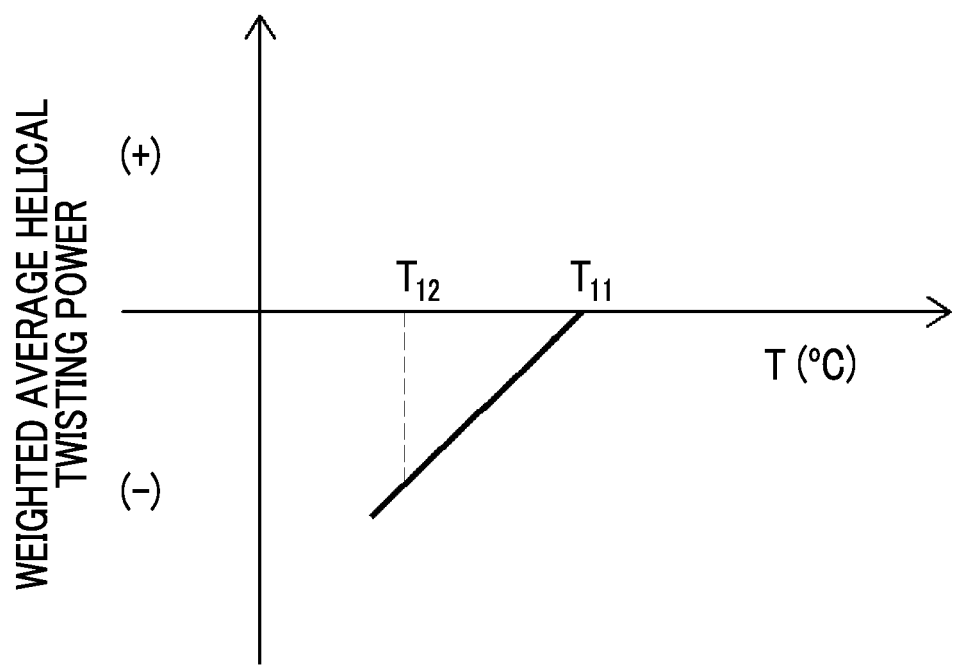
FIG. 18 is a schematic diagram of a graph plotting a relationship between a weighted average helical twisting power ($\mu m^{-1}$) and a temperature (° C.) in a system in which chiral agent A and chiral agent B are used in combination.

On the other hand, at the temperature $T_{12}$ at which the cooling treatment in the step 2-2 is carried out, the absolute value of the weighted average helical twisting power of the chiral agent in the composition layer is not particularly limited as long as the liquid crystal compound can be cholesterically aligned, but it is preferably 10.0 $\mu m^{-1}$ or more, more preferably 10.0 to 200.0 $\mu m^{-1}$, and still more preferably 20.0 to 200.0 $\mu m^{-1}$ (see FIG. 18).

That is, at the temperature $T_1$, the helical twisting power of the chiral agent Y is offset to almost zero, and therefore the liquid crystal compound can be brought into tilt alignment or hybrid alignment. Next, the cooling treatment or the heating treatment (temperature change to temperature $T_{12}$) in the step 2-2 is used as a trigger to increase the helical twisting power of the chiral agent Y such that the weighted average helical twisting power of the chiral agent in the composition layer is increased either in the right-handed direction (+) or in the left-handed direction (−), whereby the cholesteric liquid crystal layer (for example, the cholesteric liquid crystal layer 10) can be obtained.

<Procedure of Step 2>

Hereinafter, the procedure of the step 2 will be described in detail. It should be noted that, in the following, an aspect in which a liquid crystal composition containing the chiral agent X is used and an aspect in which a liquid crystal composition containing the chiral agent Y is used will be separately described in detail.

(Aspect Using Liquid Crystal Composition Containing Chiral Agent X)

Hereinafter, the procedure of the step 2 using the liquid crystal composition containing the chiral agent X (hereinafter, also referred to as "step 2X") will be described.

The step 2X includes at least the following step 2X-1 and step 2X-2.

Step 2X-1: a step of forming a composition layer satisfying the following condition 1 or the following condition 2 on a liquid crystal layer, using a liquid crystal composition containing a chiral agent X and a liquid crystal compound Step 2X-2: a step of subjecting the composition layer to a light irradiation treatment to result in cholesteric alignment of the liquid crystal compound in the composition layer, thereby forming a cholesteric liquid crystal layer Condition 1: at least a part of the liquid crystal compound in the composition layer is tilt-aligned with respect to a surface of the composition layer Condition 2: The liquid crystal compound is aligned such that a tilt angle of the liquid crystal compound in the composition layer continuously changes along a thickness direction In addition, in a case where the liquid crystal compound has a polymerizable group, in the step 2X, it is preferable to carry out a curing treatment on the composition layer, as will be described later.

Hereinafter, the materials used in each step and the procedure of each step will be described in detail.

<<Step 2X-1>>

Step 2X-1 is a step of forming a composition layer satisfying the condition 1 or the condition 2 on a liquid crystal layer, using a liquid crystal composition containing a chiral agent X and a liquid crystal compound (hereinafter, also referred to as "composition X").

Hereinafter, the composition X will be described in detail, and then the procedure of the step will be described in detail.

<<<<Composition X>>>>

The composition X contains a liquid crystal compound and a chiral agent X having a helical twisting power changed depending on irradiation with light. Hereinafter, each component will be described.

As described above, the absolute value of the weighted average helical twisting power of the chiral agent in the composition layer obtained in the step 2X-1 is preferably 0.0 to 1.9 $\mu m^{-1}$, more preferably 0.0 to 1.5 $\mu m^{-1}$, still more preferably 0.0 to 0.5 $\mu m^{-1}$, and most preferably zero, from the viewpoint of easy formation of the composition layer. Therefore, in a case where the chiral agent X has a helical twisting power exceeding the above-mentioned predetermined range in a state of no light irradiation treatment, it is preferable that the composition X contains a chiral agent that induces a helix in a direction opposite to that of the chiral agent X (hereinafter, also referred to as "chiral agent XA"), and the helical twisting power of the chiral agent X is offset to almost zero in the step 2X-1 (that is, the weighted average helical twisting power of the chiral agent in the composition layer obtained in the step 2X-1 is set to the above predetermined range). It is more preferable that the chiral agent XA is a compound that does not change the helical twisting power by the light irradiation treatment.

In addition, in a case where the liquid crystal composition contains a plurality of chiral agents X as the chiral agent and then in a case where the weighted average helical twisting power of the plurality of chiral agents X is a helical twisting power outside the above-mentioned predetermined range in a state of no light irradiation treatment, "another chiral agent XA that induces a helix in a direction opposite to that of the chiral agent X" is intended to mean a chiral agent that induces a helix in a direction opposite to that of the weighted average helical twisting power of the plurality of chiral agents X.

In a case where the chiral agent X alone has no helical twisting power in a state of no light irradiation treatment and has a property of increasing a helical twisting power depending on irradiation with light, the chiral agent XA may not be used in combination therewith.

Liquid Crystal Compound

The type of the liquid crystal compound is not particularly limited.

Generally, liquid crystal compounds can be classified into a rod-like type (rod-like liquid crystal compound) and a disk-like type (discotic liquid crystal compound, disk-like liquid crystal compound) depending on the shape thereof. Further, the rod-like type and the disk-like type are each classified into a low molecular weight type and a high molecular weight type. The high molecular weight generally refers to having a polymerization degree of 100 or more (Polymer Physics-Phase Transition Dynamics, Masao Doi, page 2, Iwanami Shoten, 1992). Any liquid crystal compound can be used in the present invention. In addition, two or more liquid crystal compounds may be used in combination.

The liquid crystal compound may have a polymerizable group. The type of the polymerizable group is not particularly limited, and a functional group capable of addition polymerization reaction is preferable, and a polymerizable ethylenic unsaturated group or a cyclic polymerizable group is more preferable. More specifically, the polymerizable group is preferably a (meth)acryloyl group, a vinyl group, a styryl group, an allyl group, an epoxy group, or an oxetane group, and more preferably a (meth)acryloyl group.

A liquid crystal compound represented by Formula (I) is suitably used as the liquid crystal compound.

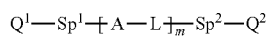

(I)

In the formula,

A represents a phenylene group which may have a substituent or a trans-1,4-cyclohexylene group which may have a substituent, at least one of A's represents a trans-1,4-cyclohexylene group which may have a substituent, L represents a single bond or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=N—N=CH—, —CH=CH—, —C≡C—, —NHC(=O)—, —C(=O)NH—, —CH=N—, —N=CH—, —CH=CH—C(=O)O—, and —OC(=O)—CH=CH—, m represents an integer of 3 to 12, Sp$^1$ and Sp$^2$ each independently represent a single bond or a linking group selected from the group consisting of a linear or branched alkylene group having 1 to 20 carbon atoms and a group where one or two or more —CH$_2$— in a linear or branched alkylene group having 1 to 20 carbon atoms is substituted with —O—, —S—, —NH—, —N(CH$_3$)—, —C(=O)—, —OC(=O)—, or C(=O)O—, and Q$^1$ and Q$^2$ each independently represent a hydrogen atom or a polymerizable group selected from the group consisting of groups represented by Formula (Q-1) to Formula (Q-5), provided that one of Q$^1$ and Q$^2$ represents a polymerizable group.

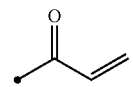

(Q-1)

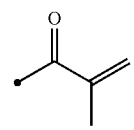

(Q-2)

(Q-3)

(Q-4)

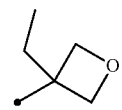

(Q-5)

A is a phenylene group which may have a substituent or a trans-1,4-cyclohexylene group which may have a substituent. In the present specification, the phenylene group is preferably a 1,4-phenylene group.

At least one of A's is a trans-1,4-cyclohexylene group which may have a substituent.

m pieces of A's may be the same as or different from each other.

m represents an integer of 3 to 12, preferably an integer of 3 to 9, more preferably an integer of 3 to 7, and still more preferably an integer of 3 to 5.

The substituent which the phenylene group and the trans-1,4-cyclohexylene group in Formula (I) may have is not particularly limited, and examples thereof include substituents selected from the group consisting of an alkyl group, a cycloalkyl group, an alkoxy group, an alkyl ether group, an amide group, an amino group, a halogen atom, and a group formed by combining two or more of these substituents. In addition, examples of the substituent include substituents represented by —C(=O)—X$^3$-Sp$^3$-Q$^3$ which will be described later. The phenylene group and the trans-1,4-cyclohexylene group may have 1 to 4 substituents. In a case of having two or more substituents, the two or more substituents may be the same as or different from each other.

In the present specification, the alkyl group may be either linear or branched. The number of carbon atoms in the alkyl group is preferably 1 to 30, more preferably 1 to 10, and still more preferably 1 to 6. Examples of the alkyl group include a methyl group, an ethyl group, an n-propyl group, an isopropyl group, an n-butyl group, an isobutyl group, a sec-butyl group, a tert-butyl group, an n-pentyl group, an isopentyl group, a neopentyl group, a 1,1-dimethylpropyl group, an n-hexyl group, an isohexyl group, a heptyl group, an octyl group, a nonyl group, a decyl group, an undecyl group, and a dodecyl group. The explanation of the alkyl group in the alkoxy group is also the same as the explanation on the foregoing alkyl group. In addition, in the present specification, specific examples of the alkylene group in a case of being referred to as an alkylene group include divalent groups obtained by removing one hydrogen atom from each of the foregoing examples of the alkyl group. Examples of the halogen atom include a fluorine atom, a chlorine atom, a bromine atom, and an iodine atom.

In the present specification, the number of carbon atoms in the cycloalkyl group is preferably 3 or more and more preferably 5 or more and is preferably 20 or less, more preferably 10 or less, still more preferably 8 or less, and particularly preferably 6 or less. Examples of the cycloalkyl group include a cyclopropyl group, a cyclobutyl group, a cyclopentyl group, a cyclohexyl group, a cycloheptyl group, and a cyclooctyl group.

The substituent which the phenylene group and the trans-1,4-cyclohexylene group may have is preferably a substituent selected from the group consisting of an alkyl group, an alkoxy group, and —C(=O)—$X^3$-$Sp^3$-$Q^3$. Here, $X^3$ represents a single bond, —O—, —S—, or —N($Sp^4$-$Q^4$)- or represents a nitrogen atom forming a ring structure together with $Q^3$ and $Sp^3$. $Sp^3$ and $Sp^4$ each independently represent a single bond or a linking group selected from the group consisting of a linear or branched alkylene group having 1 to 20 carbon atoms and a group where one or two or more —$CH_2$— in a linear or branched alkylene group having 1 to 20 carbon atoms is substituted with —O—, —S—, —NH—, —N($CH_3$)—, —C(=O)—, —OC(=O)—, or —C(=O)O—.

$Q^3$ and $Q^4$ each independently represent a hydrogen atom, a cycloalkyl group, a group where one or two or more —$CH_2$— in a cycloalkyl group is substituted with —O—, —S—, —NH—, —N($CH_3$)—, —C(=O)—, —OC(=O)—, or —C(=O)O—, or any polymerizable group selected from the group consisting of groups represented by Formula (Q-1) to Formula (Q-5).

Specific examples of the group where one or two or more —$CH_2$— in a cycloalkyl group is substituted with —O—, —S—, —NH—, —N($CH_3$)—, —C(=O)—, —OC(=O)—, or —C(=O)O— include a tetrahydrofuranyl group, a pyrrolidinyl group, an imidazolidinyl group, a pyrazolidinyl group, a piperidyl group, a piperazinyl group, and a morpholinyl group. Among them, a tetrahydrofuranyl group is preferable, and a 2-tetrahydrofuranyl group is more preferable.

In Formula (I), L represents a single bond or a linking group selected from the group consisting of —$CH_2$O—, —O$CH_2$—, —($CH_2$)$_2$OC(=O)—, —C(=O)O($CH_2$)$_2$—, —C(=O)O—, —OC(=O)—, —OC(=O)O—, —CH=CH—C(=O)O—, and —OC(=O)—CH=CH—. L is preferably —C(=O)O— or —OC(=O)—. m pieces of L's may be the same as or different from each other.

$Sp^1$ and $Sp^2$ each independently represent a single bond or a linking group selected from the group consisting of a linear or branched alkylene group having 1 to 20 carbon atoms and a group where one or two or more —$CH_2$— in a linear or branched alkylene group having 1 to 20 carbon atoms is substituted with —O—, —S—, —NH—, —N($CH_3$)—, —C(=O)—, —OC(=O)—, or —C(=O)O—. $Sp^1$ and $Sp^2$ are each independently preferably a linking group formed by combining one or two or more groups selected from the group consisting of a linear alkylene group having 1 to 10 carbon atoms to which a linking group selected from the group consisting of —O—, —OC(=O)—, and —C(=O)O— is bonded to both terminals thereof, —OC(=O)—, —C(=O)O—, —O—, and a linear alkylene group having 1 to 10 carbon atoms, and more preferably a linear alkylene group having 1 to 10 carbon atoms to which —O— is bonded to both terminals thereof.

$Q^1$ and $Q^2$ each independently represent a hydrogen atom or a polymerizable group selected from the group consisting of groups represented by Formula (Q-1) to Formula (Q-5). However, either $Q^1$ or $Q^2$ represents a polymerizable group.

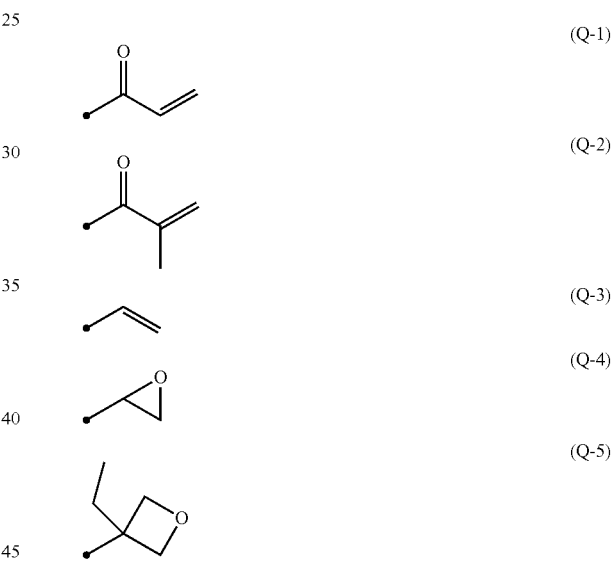

The polymerizable group is preferably an acryloyl group (Formula (Q-1)) or a methacryloyl group (Formula (Q-2)).

Specific examples of the liquid crystal compound include a liquid crystal compound represented by Formula (I-11), a liquid crystal compound represented by Formula (I-21), and a liquid crystal compound represented by Formula (I-31). In addition to the foregoing compounds, known compounds such as a compound represented by Formula (I) in JP2013-112631A, a compound represented by Formula (I) in JP2010-70543A, a compound represented by Formula (I) in JP2008-291218A, a compound represented by Formula (I) in JP4725516B, a compound represented by Formula (II) in JP2013-087109A, a compound described in paragraph 0043 of JP2007-176927A, a compound represented by Formula (1-1) in JP2009-286885A, a compound represented by Formula (I) in WO2014/10325A, a compound represented by Formula (1) in JP2016-81035A, and a compound represented by Formulae (2-1) and (2-2) in JP2016-121339A can be mentioned.

A liquid crystal compound represented by Formula (I-11)

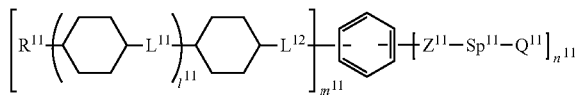
(I-11)

In the formula, $R^{11}$ represents a hydrogen atom, a linear or branched alkyl group having 1 to 12 carbon atoms, or $-Z^{12}\text{-Sp}^{12}\text{-}Q^{12}$, $L^{11}$ represents a single bond, $-C(=O)O-$, or $-O(C=O)-$, $L^{12}$ represents $-C(=O)O-$, $-OC(=O)-$, or $-CONR^2-$ $R^2$ represents a hydrogen atom or an alkyl group having 1 to 3 carbon atoms, $Z^{11}$ and $Z^{12}$ each independently represent a single bond, $-O-$, $-NH-$, $-N(CH_3)-$, $-S-$, $-C(=O)O-$, $-OC(=O)-$, $-OC(=O)O-$, or $-C(=O)NR^{12}-$, $R^{12}$ represents a hydrogen atom or $Sp^{12}\text{-}Q^{12}$, $Sp^{11}$ and $Sp^{12}$ each independently represent a single bond, a linear or branched alkylene group having 1 to 12 carbon atoms which may be substituted with $Q^{11}$, or a linking group obtained by substituting one or more $-CH_2-$ in a linear or branched alkylene group having 1 to 12 carbon atoms which may be substituted with $Q^{11}$ with $-O-$, $-S-$, $-NH-$, $-N(Q^{11})$-, or $-C(=O)-$, $Q^{11}$ represents a hydrogen atom, a cycloalkyl group, a group where one or more $-CH_2-$ in a cycloalkyl group is substituted with $-O-$, $-S-$, $-NH-$, $-N(CH_3)-$, $-C(=O)-$, $-OC(=O)-$, or $-C(=O)O-$, or a polymerizable group selected from the group consisting of groups represented by Formula (Q-1) to Formula (Q-5), $Q^{12}$ represents a hydrogen atom or a polymerizable group selected from the group consisting of groups represented by Formula (Q-1) to Formula (Q-5), $l^{11}$ represents an integer of 0 to 2, $m^{11}$ represents an integer of 1 or 2, $n^{11}$ represents an integer of 1 to 3, and a plurality of $R^{11}$'s, a plurality of $L^{11}$'s, a plurality of $L^{12}$'s, a plurality of $l^{11}$'s, a plurality of $Z^{11}$'s, a plurality of $Sp^{11}$'s, and a plurality of $Q^{11}$'s may be respectively the same as or different from each other.

In addition, the liquid crystal compound represented by Formula (I-11) contains at least one $-Z^{12}-Sp^{12}-Q^{12}$ in which $Q^{12}$ is a polymerizable group selected from the group consisting of groups represented by Formula (Q-1) to Formula (Q-5), as $R^{11}$.

In addition, in the liquid crystal compound represented by Formula (I-11), preferred is $-Z^{11}-Sp^{11}-Q^{11}$ in which $Z^{11}$ is $-C(=O)O-$ or $C(=O)NR^{12}-$ and $Q^{11}$ is a polymerizable group selected from the group consisting of groups represented by Formula (Q-1) to Formula (Q-5). In addition, in the liquid crystal compound represented by Formula (I-11), $R^{11}$ is preferably $-Z^{12}-Sp^{12}-Q^{12}$ in which $Z^{12}$ is $-C(=O)O-$ or $C(=O)NR^{12}-$, and $Q^{12}$ is a polymerizable group selected from the group consisting of groups represented by Formula (Q-1) to Formula (Q-5).

Any 1,4-cyclohexylene group contained in the liquid crystal compound represented by Formula (I-11) is a trans-1,4-cyclohexylene group.

A suitable aspect of the liquid crystal compound represented by Formula (I-11) may be, for example, a compound in which $L^{11}$ is a single bond, $l^{11}$ is 1 (a dicyclohexyl group), and $Q^{11}$ is a polymerizable group selected from the group consisting of groups represented by Formula (Q-1) to Formula (Q-5).

Another suitable aspect of the liquid crystal compound represented by Formula (I-11) may be, for example, a compound in which $m^{11}$ is 2, $l^{11}$ is 0, and two $R^{11}$'s each represent $-Z^{12}-Sp^{12}-Q^{12}$, and $Q^{12}$ is a polymerizable group selected from the group consisting of groups represented by Formula (Q-1) to Formula (Q-5).

The liquid crystal compound represented by Formula (I-21)

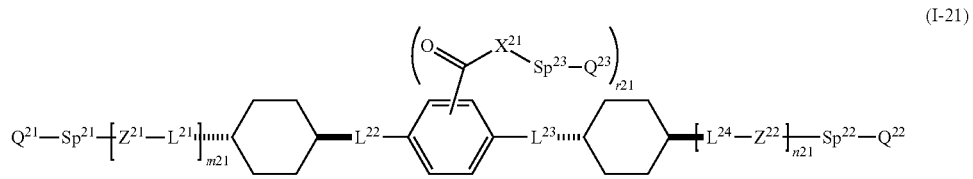
(I-21)

In the formula, $Z^{21}$ and $Z^{22}$ each independently represent a trans-1,4-cyclohexylene group which may have a substituent or a phenylene group which may have a substituent, the above substituents are each independently 1 to 4 substituents selected from the group consisting of $-CO-X^{21}-Sp^{23}-Q^{23}$, an alkyl group, and an alkoxy group, m21 represents an integer of 1 or 2, and n21 represents an integer of 0 or 1, in a case where m21 represents 2, n21 represents 0, in a case where m21 represents 2, two $Z^{21}$'s may be the same or different, at least one of $Z^{21}$ or $Z^{22}$ is a phenylene group which may have a substituent, $L^{21}$, $L^{22}$, $L^{23}$, and $L^{24}$ each independently represent a single bond or a linking group selected from the group consisting of $-CH_2O-$, $-OCH_2-$, $-(CH_2)_2OC(=O)-$, $-C(=O)O(CH_2)_2-$, $-C(=O)O-$, $-OC(=O)-$, $-OC(=O)O-$, $-CH=CH-C(=O)O-$, and $-OC(=O)-CH=CH-$, $X^{21}$ represents $-O-$, $-S-$, or $-N(Sp^{25}-Q^{25})$- or represents a nitrogen atom forming a ring structure together with $Q^{23}$ and $Sp^{23}$, $r^{21}$ represents an integer of 1 to 4, $Sp^{21}$, $Sp^{22}$, $Sp^{23}$, and $Sp^{25}$ each independently represent a single bond or a linking group selected from the group consisting of a linear or branched alkylene group having 1 to 20 carbon atoms and a group where one or two or more $-CH_2-$ in a linear or branched alkylene group having 1 to 20 carbon atoms is substituted with $-O-$, $-S-$, $-NH-$, $-N(CH_3)-$, $-C(=O)-$, $-OC(=O)-$, or $C(=O)O-$, $Q^{21}$ and $Q^{22}$ each independently represent a polymerizable group selected from the group consisting of groups represented by Formula (Q-1) to Formula (Q-5), $Q^{23}$ represents a hydrogen atom, a cycloalkyl group, a group where one or two or more —$CH_2$— in a cycloalkyl group is substituted with —O—, —S—, —NH—, —N($CH_3$)—, —C(=O)—, —OC(=O)—, or —C(=O)O—, any one polymerizable group selected from the group consisting of groups represented by Formula (Q-1) to Formula (Q-5), or a single bond in a case where $X^{21}$ is a nitrogen atom forming a ring structure together with $Q^{23}$ and $Sp^{23}$, and $Q^{25}$ represents a hydrogen atom, a cycloalkyl group, a group where one or two or more —$CH_2$— in a cycloalkyl group is substituted with —O—, —S—, —NH—, —N($CH_3$)—, —C(=O)—, —OC(=O)—, or —C(=O)O—, or any one polymerizable group selected from the group consisting of groups represented by Formula (Q-1) to Formula (Q-5), provided that in a case where $Sp^{25}$ is a single bond, $Q^{25}$ is not a hydrogen atom.

It is also preferred that the liquid crystal compound represented by Formula (I-21) has a structure in which a 1,4-phenylene group and a trans-1,4-cyclohexylene group are alternately present. For example, preferred is a structure in which m21 is 2, n21 is 0, and $Z^{21}$ is a trans-1,4-cyclohexylene group which may have a substituent or an arylene group which may have a substituent, each of which from the $Q^{21}$ side, or a structure in which m21 is 1, n21 is 1, $Z^{21}$ is an arylene group which may have a substituent, and $Z^{22}$ is an arylene group which may have a substituent.

A liquid crystal compound represented by Formula (I-31);

consisting of a linear or branched alkylene group having 1 to 20 carbon atoms and a group where one or two or more —$CH_2$— in a linear or branched alkylene group having 1 to 20 carbon atoms is substituted with —O—, —S—, —NH—, —N($CH_3$)—, —C(=O)—, —OC(=O)—, or C(=O)O—, $Q^{31}$ and $Q^{32}$ each independently represent a polymerizable group selected from the group consisting of groups represented by Formula (Q-1) to Formula (Q-5), and $Q^{33}$ and $Q^{34}$ each independently represent a hydrogen atom, a cycloalkyl group, a group where one or two or more —$CH_2$— in a cycloalkyl group is substituted with —O—, —S—, —NH—, —N($CH_3$)—, —C(=O)—, —OC(=O)—, or —C(=O)O—, or any one polymerizable group selected from the group consisting of groups represented by Formula (Q-1) to Formula (Q-5), provided that $Q^{33}$ may represent a single bond in a case of forming a ring structure together with $X^{31}$ and $Sp^{33}$, and $Q^{34}$ is not a hydrogen atom in a case where $Sp^{34}$ is a single bond.

As the liquid crystal compound represented by Formula (I-31), particularly preferable compounds include a compound in which $Z^{32}$ is a phenylene group and a compound in which m32 is 0.

It is also preferred that the compound represented by Formula (I) has a partial structure represented by Formula (II).

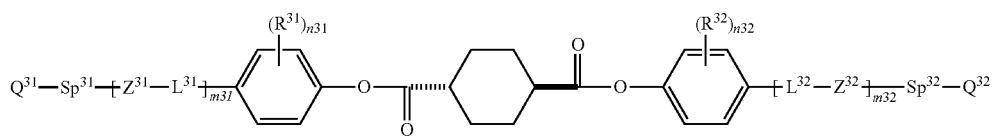

(I-31)

In the formula, $R^{31}$ and $R^{32}$ each independently represent an alkyl group, an alkoxy group, and a group selected from the group consisting of —C(=O)—$X^{31}$-$Sp^{33}$-$Q^{33}$, n31 and n32 each independently represent an integer of 0 to 4, $X^{31}$ represents a single bond, —O—, —S—, or —N($Sp^{34}$-$Q^{34}$)- or represents a nitrogen atom forming a ring structure together with $Q^{33}$ and $Sp^{33}$, $Z^{31}$ represents a phenylene group which may have a substituent, $Z^{32}$ represents a trans-1,4-cyclohexylene group which may have a substituent or a phenylene group which may have a substituent, the above substituents are each independently 1 to 4 substituents selected from the group consisting of an alkyl group, an alkoxy group, and —C(=O)—$X^{31}$-$Sp^{33}$-$Q^{33}$, m31 represents an integer of 1 or 2, and m32 represents an integer of 0 to 2, in a case where m31 and m32 represent 2, two $Z^{31}$'s and $Z^{32}$'s may be the same or different, $L^{31}$ and $L^{32}$ each independently represent a single bond or a linking group selected from the group consisting of —$CH_2$O—, —O$CH_2$—, —($CH_2)_2$OC(=O)—, —C(=O)O ($CH_2)_2$—, —C(=O)O—, —OC(=O)—, —OC(=O)O—, —CH=CH—C(=O)O—, and —OC(=O)—CH=CH—, $Sp^{31}$, $Sp^{32}$, $Sp^{33}$, and $Sp^{34}$ each independently represent a single bond or a linking group selected from the group

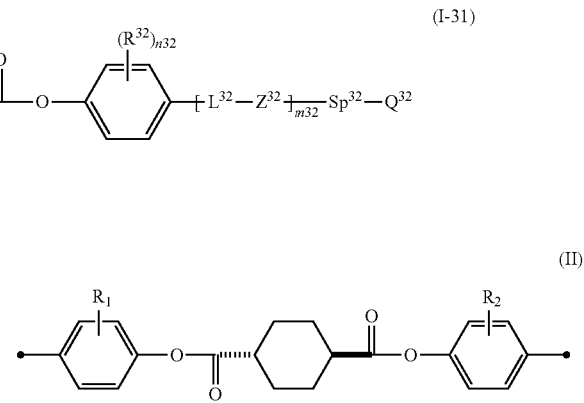

(II)

In Formula (II), black circles indicate the bonding positions with other moieties of Formula (I). It is sufficient that the partial structure represented by Formula (II) is included as a part of the partial structure represented by Formula (III) in Formula (I).

(III)

In the formula, $R^1$ and $R^2$ are each independently a group selected from the group consisting of a hydrogen atom, an alkyl group, an alkoxy group, and a group represented by —C(=O)—$X^3$-$Sp^3$-$Q^3$. Here, $X^3$ represents a single bond, —O—, —S—, or —N($Sp^4$-$Q^4$)- or represents a nitrogen atom forming a ring structure together with $Q^3$ and $Sp^3$. $X^3$ is preferably a single bond or O—. $R^1$ and $R^2$ are preferably —C(=O)—$X^3$-$Sp^3$-$Q^3$. In addition, it is also preferred that $R^1$ and $R^2$ are the same. The bonding position of each of $R^1$ and $R^2$ to the phenylene group is not particularly limited.

Sp³ and Sp⁴ each independently represent a single bond or a linking group selected from the group consisting of a linear or branched alkylene group having 1 to 20 carbon atoms and a group where one or two or more —CH₂— in a linear or branched alkylene group having 1 to 20 carbon atoms is substituted with —O—, —S—, —NH—, —N(CH₃)—, —C(=O)—, —OC(=O)—, or C(=O)O—. Sp³ and Sp⁴ are each independently preferably a linear or branched alkylene group having 1 to 10 carbon atoms, more preferably a linear alkylene group having 1 to 5 carbon atoms, and still more preferably a linear alkylene group having 1 to 3 carbon atoms.

Q³ and Q⁴ each independently represent a hydrogen atom, a cycloalkyl group, a group where one or two or more —CH₂— in a cycloalkyl group is substituted with —O—, —S—, —NH—, —N(CH₃)—, —C(=O)—, —OC(=O)—, or —C(=O)O—, or any one polymerizable group selected from the group consisting of groups represented by Formula (Q-1) to Formula (Q-5).

It is also preferred that the compound represented by Formula (I) has, for example, a structure represented by Formula (II-2).

In Formula (IV), A¹ represents an alkylene group having 2 to 18 carbon atoms, in which one CH₂ or two or more non-adjacent CH₂'s in the alkylene group may be substituted with —O—;

Z¹ represents —C(=O)—, —O—C(=O)—, or a single bond;

Z² represents —C(=O)— or C(=O)—CH=CH—;

R¹ represents a hydrogen atom or a methyl group;

R² represents a hydrogen atom, a halogen atom, a linear alkyl group having 1 to 4 carbon atoms, a methoxy group, an ethoxy group, a phenyl group which may have a substituent, a vinyl group, a formyl group, a nitro group, a cyano group, an acetyl group, an acetoxy group, an N-acetylamide group, an acryloylamino group, an N,N-dimethylamino group, a maleimide group, a methacryloylamino group, an allyloxy group, an allyloxycarbamoyl group, an N-alkyloxycarbamoyl group in which the alkyl group has 1 to 4 carbon atoms, an N-(2-methacryloyloxyethyl)carbamoyloxy group, an N-(2-acryloyloxyethyl)carbamoyloxy group, or a structure represented by Formula (IV-2); and

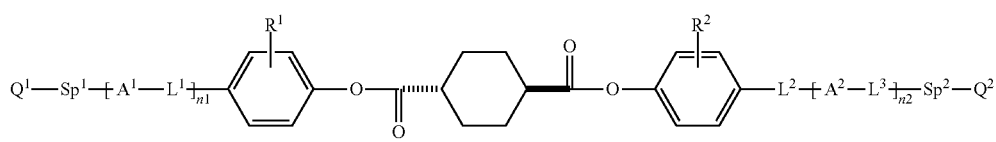

(II-2)

In the formula, A¹ and A² each independently represent a phenylene group which may have a substituent or a trans-1,4-cyclohexylene group which may have a substituent, and the above substituents are each independently 1 to 4 substituents selected from the group consisting of an alkyl group, an alkoxy group, and —C(=O)—X³-Sp³-Q³, L¹, L², and L³ each represent a single bond or a linking group selected from the group consisting of —CH₂O—, —OCH₂—, —(CH₂)₂OC(=O)—, —C(=O)O(CH₂)₂—, —C(=O)O—, —OC(=O)—, —OC(=O)O—, —CH=CH—C(=O)O—, and —OC(=O)—CH=CH—, and n1 and n2 each independently represent an integer of 0 to 9, and n1+n2 is 9 or less.

Each of Q¹, Q², Sp¹, and Sp² has the same definition as that of each group in Formula (I). Each of X³, Sp³, Q³, R¹, and R² has the same definition as that of each group in Formula (II).

As the liquid crystal compound for use in the present invention, a compound represented by Formula (IV) and described in JP2014-198814A, in particular, a polymerizable liquid crystal compound having one (meth)acrylate group represented by Formula (IV) is also suitably used.

L¹, L², L³, and L⁴ each independently represent an alkyl group having 1 to 4 carbon atoms, an alkoxy group having 1 to 4 carbon atoms, an alkoxycarbonyl group having 2 to 5 carbon atoms, an acyl group having 2 to 4 carbon atoms, a halogen atom, or a hydrogen atom, and at least one of L¹, L², L³, or L⁴ represents a group other than a hydrogen atom.

—Z⁵-T-Sp-P                            Formula (IV-2)

In Formula (IV-2), P represents an acryloyl group, a methacryl group, or a hydrogen atom, and Z⁵ represents a single bond, —C(=O)O—, —OC(=O)—, —C(=O)NR¹— (where R¹ represents a hydrogen atom or a methyl group), —NR¹C(=O)—, —C(=O)S—, or —SC(=O)—, T represents 1,4-phenylene, and Sp represents a divalent aliphatic group having 1 to 12 carbon atoms which may have a substituent, in which one CH₂ or two or more non-adjacent CH₂'s in the aliphatic group may be substituted with —O—, —S—, —OC(=O)—, —C(=O)O—, or OC(=O)O—.

The compound represented by Formula (IV) is preferably a compound represented by Formula (V).

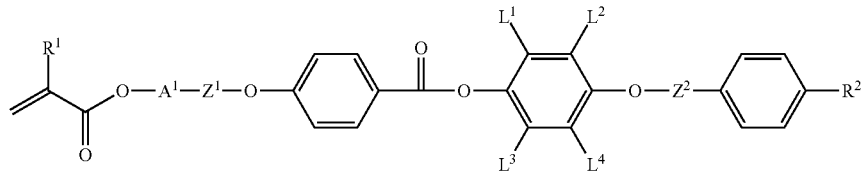

Formula (IV)

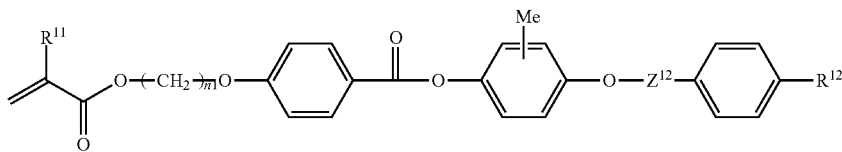
Formula (V)

In Formula (V), n1 represents an integer of 3 to 6;
$R^{11}$ represents a hydrogen atom or a methyl group;
$Z^{12}$ represents —C(=O)— or C(=O)—CH=CH—; and
$R^{12}$ represents a hydrogen atom, a linear alkyl group having 1 to 4 carbon atoms, a methoxy group, an ethoxy group, a phenyl group, an acryloylamino group, a methacryloylamino group, an allyloxy group, or a structure represented by Formula (IV-3).

—$Z^{51}$-T-Sp-P   Formula (IV-3)

In Formula (IV-3), P represents an acryloyl group or a methacryl group;
$Z^{51}$ represents —C(=O)O— or —OC(=O)—; T represents 1,4-phenylene; and
Sp represents a divalent aliphatic group having 2 to 6 carbon atoms which may have a substituent. One $CH_2$ or two or more non-adjacent $CH_2$'s in this aliphatic group may be substituted with —O—, —OC(=O)—, —C(=O)O—, or OC(=O)O—.

n1 represents an integer of 3 to 6, preferably 3 or 4.

$Z^{12}$ represents —C(=O)— or C(=O)—CH=CH— and preferably represents —C(=O)—.

$R^{12}$ is a hydrogen atom, a linear alkyl group having 1 to 4 carbon atoms, a methoxy group, an ethoxy group, a phenyl group, an acryloylamino group, a methacryloylamino group, an allyloxy group, or a group represented by Formula (IV-3), preferably represents a methyl group, an ethyl group, a propyl group, a methoxy group, an ethoxy group, a phenyl group, an acryloylamino group, a methacryloylamino group, or a group represented by Formula (IV-3), and more preferably represents a methyl group, an ethyl group, a methoxy group, an ethoxy group, a phenyl group, an acryloylamino group, a methacryloylamino group, or a structure represented by Formula (IV-3).

As the liquid crystal compound for use in the present invention, a compound represented by Formula (VI) and described in JP2014-198814A, in particular, a liquid crystal compound having no (meth)acrylate group represented by Formula (VI) is also suitably used.

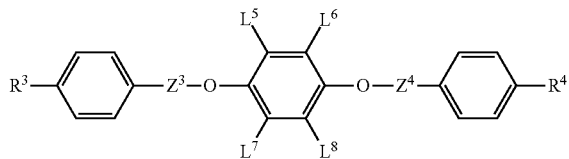
Formula (VI)

In Formula (VI), $Z^3$ represents —C(=O)— or CH=CH—C(=O)—;
$Z^4$ represents —C(=O)— or C(=O)—CH=CH—;
$R^3$ and $R^4$ each independently represent a hydrogen atom, a halogen atom, a linear alkyl group having 1 to 4 carbon atoms, a methoxy group, an ethoxy group, an aromatic ring which may have a substituent, a cyclohexyl group, a vinyl group, a formyl group, a nitro group, a cyano group, an acetyl group, an acetoxy group, an acryloylamino group, an N,N-dimethylamino group, a maleimide group, a methacryloylamino group, an allyloxy group, an allyloxycarbamoyl group, an N-alkyloxycarbamoyl group in which the alkyl group has 1 to 4 carbon atoms, an N-(2-methacryloyloxyethyl)carbamoyloxy group, an N-(2-acryloyloxyethyl)carbamoyloxy group, or a structure represented by Formula (VI-2); and $L^5$, $L^6$, $L^7$, and $L^8$ each independently represent an alkyl group having 1 to 4 carbon atoms, an alkoxy group having 1 to 4 carbon atoms, an alkoxycarbonyl group having 2 to 5 carbon atoms, an acyl group having 2 to 4 carbon atoms, a halogen atom, or a hydrogen atom, and at least one of $L^5$, $L^6$, $L^7$, or $L^8$ represents a group other than a hydrogen atom.

—$Z^5$-T-Sp-P   Formula (VI-2)

In Formula (VI-2), P represents an acryloyl group, a methacryl group, or a hydrogen atom, $Z^5$ represents —C(=O)O—, —OC(=O)—, —C(=O)$NR^1$— (where $R^1$ represents a hydrogen atom or a methyl group), —$NR^1$C(=O)—, —C(=O)S—, or —SC(=O)—, T represents 1,4-phenylene, and Sp represents a divalent aliphatic group having 1 to 12 carbon atoms which may have a substituent. However, one $CH_2$ or two or more non-adjacent $CH_2$'s in this aliphatic group may be substituted with —O—, —S—, —OC(=O)—, —C(=O)O—, or OC(=O)O—.

The compound represented by Formula (VI) is preferably a compound represented by Formula (VII).

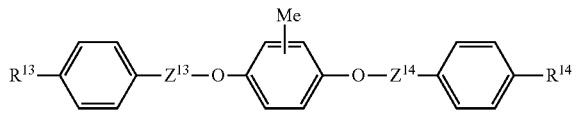
Formula (VII)

In Formula (VII), $Z^{13}$ represents —C(=O)— or C(=O)—CH=CH—;
$Z^{14}$ represents —C(=O)— or —CH=CH—C(=O)—; and
$R^{13}$ and $R^{14}$ each independently represent a hydrogen atom, a linear alkyl group having 1 to 4 carbon atoms, a methoxy group, an ethoxy group, a phenyl group, an acryloylamino group, a methacryloylamino group, an allyloxy group, or a structure represented by Formula (IV-3).

$Z^{13}$ represents —C(=O)— or C(=O)—CH=CH— and is preferably —C(=O)—.

$R^{13}$ and $R^{14}$ each independently represent a hydrogen atom, a linear alkyl group having 1 to 4 carbon atoms, a methoxy group, an ethoxy group, a phenyl group, an acryloylamino group, a methacryloylamino group, an allyloxy group, or a structure represented by Formula (IV-3), preferably represents a methyl group, an ethyl group, a propyl group, a methoxy group, an ethoxy group, a phenyl group, an acryloylamino group, a methacryloylamino group, or a structure represented by Formula (IV-3), and more preferably represents a methyl group, an ethyl group, a methoxy group, an ethoxy group, a phenyl group, an acryloylamino group, a methacryloylamino group, or a structure represented by Formula (IV-3).

As the liquid crystal compound for use in the present invention, a compound represented by Formula (VIII) and described in JP2014-198814A, in particular, a polymerizable liquid crystal compound having two (meth)acrylate groups represented by Formula (VIII) is also suitably used.

In order to obtain a composition layer satisfying the above condition 1 and the above condition 2, it is preferable to use a liquid crystal compound having a large pre-tilt angle at the interface.

Chiral Agent X Having a Helical Twisting Power Changed Depending on Irradiation with Light The chiral agent X is a compound that induces a helix of a liquid crystal compound, and is not particularly limited as long as it is a chiral agent having a helical twisting power (HTP) changed depending on irradiation with light.

Formula (VIII)

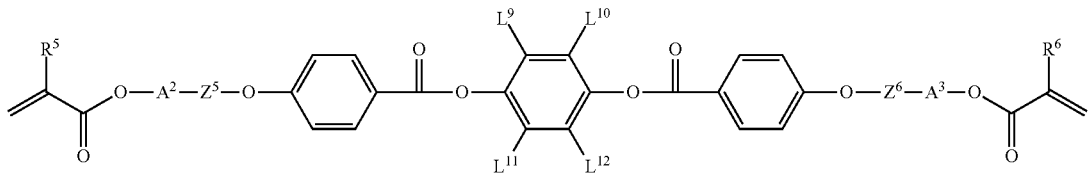

In Formula (VIII), $A^2$ and $A^3$ each independently represent an alkylene group having 2 to 18 carbon atoms, and one $CH_2$ or two or more non-adjacent $CH_2$'s in the alkylene group may be substituted with —O—;

$Z^5$ represents —C(=O)—, —OC(=O)—, or a single bond;

$Z^6$ represents —C(=O)—, —C(=O)O—, or a single bond;

$R^5$ and $R^6$ each independently represent a hydrogen atom or a methyl group; and $L^9$, $L^{10}$, $L^{11}$, and $L^{12}$ each independently represent an alkyl group having 1 to 4 carbon atoms, an alkoxy group having 1 to 4 carbon atoms, an alkoxycarbonyl group having 2 to 5 carbon atoms, an acyl group having 2 to 4 carbon atoms, a halogen atom, or a hydrogen atom, and at least one of $L^9$, $L^{10}$, $L^{11}$, or $L^{12}$ represents a group other than a hydrogen atom.

The compound represented by Formula (VIII) is preferably a compound represented by Formula (IX).

In addition, the chiral agent X may be liquid crystalline or non-liquid crystalline. The chiral agent X generally contains an asymmetric carbon atom. However, an axially asymmetric compound or planarly asymmetric compound not containing an asymmetric carbon atom can also be used as the chiral agent X. The chiral agent X may have a polymerizable group.

The chiral agent X may be a chiral agent whose helical twisting power increases upon irradiation with light, or may be a chiral agent whose helical twisting power decreases upon irradiation with light. Of these, a chiral agent whose helical twisting power decreases upon irradiation with light is preferable.

The "increase and decrease in helical twisting power" in the present specification represent increase/decrease in helical twisting power in a case where an initial helical direction (helical direction before light irradiation) of the chiral agent A is set to "positive". Therefore, even in a case where the helical twisting power of a chiral agent continues to decrease Formula (IX)

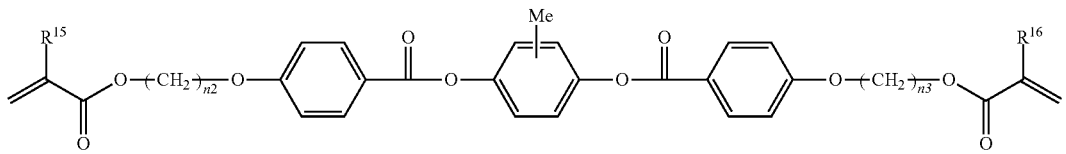

In Formula (IX), n2 and n3 each independently represent an integer of 3 to 6; and $R^{15}$ and $R^{16}$ each independently represent a hydrogen atom or a methyl group.

In Formula (IX), it is preferred that n2 and n3 each independently represent an integer of 3 to 6, and n2 and n3 are 4.

In Formula (IX), it is preferred that $R^{15}$ and $R^{16}$ each independently represent a hydrogen atom or a methyl group, and $R^{15}$ and $R^{16}$ each represent a hydrogen atom.

Such liquid crystal compounds can be produced by a known method.

and goes below zero upon irradiation with light and therefore the helical direction becomes "negative" (that is, even in a case where a chiral agent induces a helix in a helical direction opposite to an initial helical direction (before light irradiation)), such a chiral agent also corresponds to a "chiral agent whose helical twisting power decreases".

The chiral agent X may be, for example, a so-called photoreactive chiral agent. The photoreactive chiral agent is a compound which has a chiral site and a photoreactive site that undergoes a structural change upon irradiation with light, and greatly changes the twisting power of the liquid crystal compound in accordance with the light irradiation amount, for example.

Examples of the photoreactive site that undergoes a structural change upon irradiation with light include photochromic compounds (written by Kingo Uchida and Masahiro Irie, Chemical Industry, Vol. 64, p. 640, 1999, and written by Kingo Uchida and Masahiro Irie, Fine Chemical, Vol. 28(9), p. 15, 1999). In addition, the structural change means decomposition, addition reaction, isomerization, racemization, [2+2] photocyclization, dimerization reaction, or the like occurred upon irradiation of a photoreactive site with light, and the structural change may be irreversible. In addition, the chiral site corresponds to an asymmetric carbon described in Chemistry of Liquid Crystal, No. 22, Hiroyuki Nohira, Chemistry Review, p. 73, 1994.

Examples of the chiral agent X include photoreactive chiral agents described in paragraphs [0044] to [0047] of JP2001-159709A, optically active compounds described in paragraphs [0019] to [0043] of JP2002-179669A, optically active compounds described in paragraphs [0020] to [0044] of JP2002-179633A, optically active compounds described in paragraphs [0016] to [0040] of JP2002-179670A, optically active compounds described in paragraphs [0017] to [0050] of JP2002-179668A, optically active compounds described in paragraphs [0018] to [0044] of JP2002-180051A, optically active isosorbide derivatives described in paragraphs [0016] to [0055] of JP2002-338575A, photoreactive optically active compounds described in paragraphs [0023] to [0032] of JP2002-080478A, photoreactive chiral agents described in paragraphs [0019] to [0029] of JP2002-080851A, optically active compounds described in paragraphs [0022] to [0049] of JP2002-179681A, optically active compounds described in paragraphs [0015] to [0044] of JP2002-302487A, optically active polyesters described in paragraphs [0015] to [0050] of JP2002-338668A, binaphthol derivatives described in paragraphs [0019] to [0041] of JP2003-055315A, optically active fulgide compounds described in paragraphs [0008] to [0043] of JP2003-073381A, optically active isosorbide derivatives described in paragraphs [0015] to [0057] of JP2003-306490A, optically active isosorbide derivatives described in paragraphs [0015] to [0041] of JP2003-306491A, optically active isosorbide derivatives described in paragraphs [0015] to [0049] of JP2003-313187A, optically active isomannide derivatives described in paragraphs [0015] to [0057] of JP2003-313188A, optically active isosorbide derivatives described in paragraphs [0015] to [0049] of JP2003-313189A, optically active polyesters/amides described in paragraphs [0015] to [0052] of JP2003-313292A, optically active compounds described in paragraphs [0012] to [0053] of WO2018/194157A, and optically active compounds described in paragraphs [0020] to [0049] of JP2002-179682A.

Above all, the chiral agent X is preferably a compound having at least a photoisomerization site, and the photoisomerization site more preferably has a photoisomerizable double bond. The photoisomerization site having a photoisomerizable double bond is preferably a cinnamoyl site, a chalcone site, an azobenzene site, or a stilbene site from the viewpoint that photoisomerization is likely to occur and the difference in helical twisting power before and after light irradiation is large; and more preferably a cinnamoyl site, a chalcone site, or a stilbene site from the viewpoint that the absorption of visible light is small. In addition, the photoisomerization site corresponds to the above-mentioned photoreactive site that undergoes a structural change upon irradiation with light.

In addition, the chiral agent X more preferably has a trans photoisomerizable double bond from the viewpoint that the initial helical twisting power (helical twisting power before light irradiation) is high and the amount of decrease in the helical twisting power upon irradiation with light is more excellent.

In addition, the chiral agent X preferably has a cis photoisomerizable double bond from the viewpoint that the initial helical twisting power (helical twisting power before light irradiation) is low and the amount of increase in the helical twisting power upon irradiation with light is more excellent.

The chiral agent X preferably has any partial structure selected from a binaphthyl partial structure, an isosorbide partial structure (a partial structure derived from isosorbide), and an isomannide partial structure (a partial structure derived from isomannide). The binaphthyl partial structure, the isosorbide partial structure, and the isomannide partial structure are intended to have the following structures, respectively.

The portion of the binaphthyl partial structure in which the solid line and the broken line are parallel to each other represents a single bond or a double bond. In the structure shown below, *represents a bonding position.

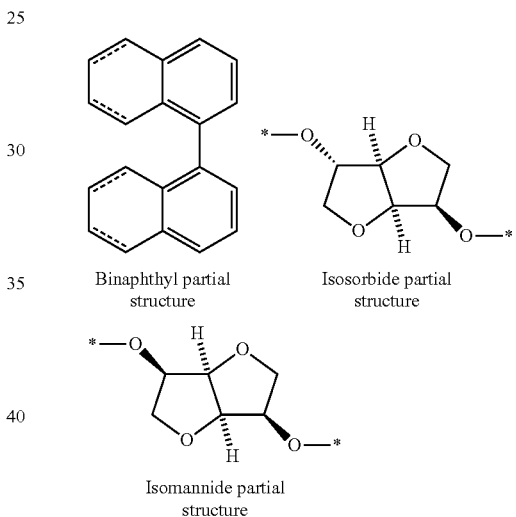

Binaphthyl partial structure    Isosorbide partial structure

Isomannide partial structure

The chiral agent X may have a polymerizable group. The type of the polymerizable group is not particularly limited, and is preferably a functional group capable of an addition polymerization reaction, more preferably a polymerizable ethylenic unsaturated group or a cyclic polymerizable group, and still more preferably a (meth)acryloyl group, a vinyl group, a styryl group, or an allyl group.

In the step 2, at least the above-mentioned chiral agent X is used. The step 2 may be an aspect in which two or more chiral agents X are used, or may be an aspect in which at least one chiral agent X and at least one chiral agent whose helical twisting power does not change upon irradiation with light (hereinafter, simply referred to as "chiral agent XA") are used.

The chiral agent XA may be liquid crystalline or non-liquid crystalline. The chiral agent XA generally contains an asymmetric carbon atom in many cases. The chiral agent XA may be an axially asymmetric compound or planarly asymmetric compound that does not contain an asymmetric carbon atom.

The chiral agent XA may have a polymerizable group. Examples of the type of the polymerizable group include polymerizable groups that the chiral agent X may have.

A known chiral agent can be used as the chiral agent XA.

The chiral agent XA is preferably a chiral agent that induces a helix in a direction opposite to the direction of the helix induced by the chiral agent X. That is, for example, in a case where the helix induced by the chiral agent X is right-handed, the helix induced by the chiral agent XA is left-handed.

The molar absorption coefficient of each of the chiral agent X and the chiral agent XA is not particularly limited. The molar absorption coefficient at a wavelength (for example, 365 nm) of light for irradiation in the step 2 is preferably 100 to 100,000 L/(mol·cm) and preferably 500 to 50,000 L/(mol·cm).

The content of each of the chiral agent X and the chiral agent XA in the composition layer can be appropriately set according to the characteristics (for example, retardation and wavelength dispersion) of an optically anisotropic layer to be formed. Since the twisted angle of liquid crystal compound in the optically anisotropic layer largely depends on the types and addition concentrations of the chiral agent X and the chiral agent XA, a desired twisted angle can be obtained by adjusting these factors.

The content of the chiral agent X in the composition layer is not particularly limited, and is preferably 5.0% by mass or less, more preferably 3.0% by mass or less, still more preferably 2.0% by mass or less, particularly preferably less than 1.0% by mass, particularly preferably 0.8% by mass or less, and most preferably 0.5% by mass or less with respect to the total mass of the liquid crystal compound, from the viewpoint that the liquid crystal compound is easily aligned uniformly. The lower limit thereof is not particularly limited, and is preferably 0.01% by mass or more, more preferably 0.02% by mass or more, and still more preferably 0.05% by mass.

The chiral agent X may be used alone or in combination of two or more thereof. In a case where two or more chiral agents X are used in combination, the total content thereof is preferably within the above range.

The content of the chiral agent XA in the composition layer is not particularly limited, and is preferably 5.0% by mass or less, more preferably 3.0% by mass or less, still more preferably 2.0% by mass or less, particularly preferably less than 1.0% by mass, more preferably 0.8% by mass or less, and most preferably 0.5% by mass or less with respect to the total mass of the liquid crystal compound, from the viewpoint that the liquid crystal compound is easily aligned uniformly. The lower limit thereof is not particularly limited, and is preferably 0.01% by mass or more, more preferably 0.02% by mass or more, and still more preferably 0.05% by mass.

The chiral agent XA may be used alone or in combination of two or more thereof. In a case where two or more chiral agents XA are used in combination, the total content thereof is preferably within the above range.

The total content of the chiral agent (total content of all chiral agents) in the composition layer is 5.0% by mass or less with respect to the total mass of the liquid crystal compound. Above all, the total content of the chiral agent is preferably 4.0% by mass or less, more preferably 2.0% by mass or less, and still more preferably 1.0% by mass or less, from the viewpoint that the effect of the present invention is more excellent. The lower limit thereof is not particularly limited, and is preferably 0.01% by mass or more, more preferably 0.02% by mass or more, and still more preferably 0.05% by mass.

Optional Components

The composition X may contain components other than the liquid crystal compound, the chiral agent X, and the chiral agent XA.

Polymerization Initiator

The composition X may contain a polymerization initiator. In particular, in a case where the liquid crystal compound has a polymerizable group, the composition X preferably contains a polymerization initiator.

Examples of the polymerization initiator include those similar to the polymerization initiator that may be contained in the liquid crystal layer. The polymerization initiator that may be contained in the liquid crystal layer is as described above.

The content of the polymerization initiator in the composition X (the total amount of polymerization initiators in a case where a plurality of polymerization initiators are contained) is not particularly limited, but it is preferably 0.1% to 20% by mass and more preferably 1.0% to 8.0% by mass with respect to the total mass of the liquid crystal compound.

Surfactant

The composition X may contain a surfactant that can be unevenly distributed on the surface of the composition layer on the liquid crystal layer 102 side and/or the surface of the composition layer opposite to the liquid crystal layer 102.

In a case where the alignment control agent contains a surfactant in the composition X, a composition layer satisfying the condition 1 or the condition 2 is easily obtained, and therefore stable or rapid formation of a cholesteric liquid crystalline phase is possible.

Examples of the surfactant include those similar to the surfactant that may be contained in the liquid crystal layer. The surfactant that may be contained in the liquid crystal layer is as described above.

Above all, the composition X preferably contains a surfactant (for example, an onium salt compound (as described in JP2012-208397A)) capable of controlling the tilt angle (see FIG. 14) of the molecular axis $L_1$ of the liquid crystal compound 14 with respect to the surface on the liquid crystal layer 102 side surface in the composition layer formed in the step 2X-1, and a surfactant (for example, a polymer having a perfluoroalkyl group in the side chain thereof) capable of controlling the tilt angle (see FIG. 14) of the molecular axis $L_1$ of the liquid crystal compound 14 with respect to the surface on the surface opposite to the liquid crystal layer 102 side. In addition, in a case where the composition X contains the above-mentioned surfactant, the obtained cholesteric liquid crystal layer also has an advantage that the haze is small.

The surfactants may be used alone or in combination of two or more thereof.

The content of the surfactant in the composition X (the total amount of surfactants in a case where a plurality of surfactants are contained) is not particularly limited, but it is preferably 0.01% to 10% by mass, more preferably 0.01% to 5.0% by mass, and still more preferably 0.01% to 2.0% by mass with respect to the total mass of the liquid crystal compound.

Solvent

The composition X may contain a solvent.

Examples of the solvent include those similar to the solvent that may be contained in the liquid crystal layer. The solvent that may be contained in the liquid crystal layer is as described above.

Other Additives

The composition X may contain one or two or more other additives such as an antioxidant, an ultraviolet absorber, a sensitizer, a stabilizer, a plasticizer, a chain transfer agent, a polymerization inhibitor, an antifoaming agent, a leveling agent, a thickener, a flame retardant, a surface-active substance, a dispersant, and a coloring material such as a dye and a pigment.

It is preferable that one or more of the compounds constituting the composition X are compounds having a plurality of polymerizable groups (polyfunctional compound). Further, the total content of the compounds having a plurality of polymerizable groups in the composition X is preferably 80% by mass or more with respect to the total solid content in the composition X. The solid content is a component that forms the cholesteric liquid crystal layer and does not include a solvent.

By making 80% by mass or more of the total solid content in the composition X a compound having a plurality of polymerizable groups, it is preferable in that the structure of the cholesteric liquid crystalline phase can be firmly fixed and durability can be imparted.

The compound having a plurality of polymerizable groups is a compound having two or more immobilizable groups in one molecule. In the present invention, the polyfunctional compound contained in the composition X may or may not have liquid crystallinity.

<<<<Procedure of Step 2X-1>>>>

The step 2X-1 preferably includes the following step 2X-1-1 and the following step 2X-1-2.

Step 2X-1-1: a step of bringing the composition X into contact with a liquid crystal layer to form a coating film on the liquid crystal layer Step 2X-1-2: a step of heating the coating film to form a composition layer satisfying the condition 1 or the condition 2

Step 2X-1-1: Coating Film Forming Step

In the step 2X-1-1, the composition X described above is first applied onto a liquid crystal layer. The application method is not particularly limited, and examples thereof include a wire bar coating method, an extrusion coating method, a direct gravure coating method, a reverse gravure coating method, and a die-coating method. Prior to application of the composition X, a known rubbing treatment may be applied to the liquid crystal layer.

If necessary, a treatment for drying the coating film applied onto the liquid crystal layer may be carried out after application of the composition X. By carrying out the drying treatment, the solvent can be removed from the coating film.

The film thickness of the coating film is not particularly limited, but is preferably 0.1 to 20 µm, more preferably 0.2 to 15 µm, and still more preferably 0.5 to 10 µm from the viewpoint of more excellent reflection anisotropy and haze of the cholesteric liquid crystal layer.

Step 2X-1-2: Composition Layer Forming Step

The liquid crystal phase transition temperature of the composition X is preferably in a range of 10° C. to 250° C. and more preferably in a range of 10° C. to 150° C., from the viewpoint of manufacturing suitability.

As to preferred heating conditions, it is preferable to heat the composition layer at 40° C. to 100° C. (preferably 60° C. to 100° C.) for 0.5 to 5 minutes (preferably 0.5 to 2 minutes).

In a case of heating the composition layer, it is preferable not to heat the composition layer to a temperature at which the liquid crystal compound becomes an isotropic phase (Iso). In a case where the composition layer is heated above the temperature at which the liquid crystal compound becomes an isotropic phase, the number of defects in the tilt-aligned liquid crystal phase or the hybrid-aligned liquid crystal phase increases, which is not preferable.

A composition layer satisfying the condition 1 or the condition 2 can be obtained by the step 2X-1-2.

In order to make the liquid crystal compound tilt-aligned or hybrid-aligned, it is effective to give a pre-tilt angle to the interface, and specifically, the following method can be mentioned.

(1) an alignment control agent that is unevenly distributed at the air interface and/or the liquid crystal layer interface and controls the alignment of the liquid crystal compound is added to the composition X.

(2) A liquid crystalline compound having a large pre-tilt angle at the interface is added to the composition X as the liquid crystal compound.

<<Step 2X-2>>

The step 2X-2 is a step in which the composition layer obtained in the 2X-1 is subjected to a light irradiation treatment to change the helical twisting power of the chiral agent X, and the liquid crystal compound in the composition layer is cholesterically aligned to form a cholesteric liquid crystal layer.

By dividing a light irradiation region into a plurality of domains and adjusting a light irradiation amount for each domain, a region having a different helical pitch (a region having a different selective reflection wavelength) can be formed.

The irradiation intensity of the light irradiation in the step 2X-2 is not particularly limited and can be appropriately determined based on the helical twisting power of the chiral agent X. In general, the irradiation intensity of light irradiation in the step 2X-2 is preferably about 0.1 to 200 mW/cm$^2$. In addition, the time for light irradiation is not particularly limited, but may be appropriately determined from the viewpoint of both sufficient strength and productivity of the layer to be obtained.

In addition, the temperature of the composition layer at the time of light irradiation is, for example, 0° C. to 100° C., and preferably 10° C. to 60° C.

The light used for the light irradiation is not particularly limited as long as it is an actinic ray or radiation that changes the helical twisting power of the chiral agent X, which refers to, for example, an emission line spectrum of a mercury lamp, far ultraviolet rays represented by an excimer laser, extreme ultraviolet rays (EUV light), X-rays, ultraviolet rays, and electron beams (EB). Of these, ultraviolet rays are preferable.

Here, in the production method of the present invention, in a case where the composition layer is exposed to wind, the surface state of the cholesteric liquid crystal layer to be formed may be uneven. Considering this point, in the method for producing a cholesteric liquid crystal layer of the present invention, it is preferable that the wind speed of the environment to which the composition layer is exposed is low in all steps of the step 2X. Specifically, in the production method of the present invention, the wind speed of the environment to which the composition layer is exposed is preferably 1 m/s or less in all steps of the step 2X.

<<Curing Treatment>>

In addition, in a case where the liquid crystal compound has a polymerizable group, it is preferable to carry out a curing treatment on the composition layer. Examples of the procedure for carrying out the curing treatment on the composition layer include the following (1) and (2).

There is further included a step 3X of (1) carrying out a curing treatment for immobilizing a cholesteric alignment state at the time of the step 2X-2 to form a cholesteric liquid crystal layer in which the cholesteric alignment state is immobilized (that is, the curing treatment is carried out simultaneously with the step 2X-2), or (1) carrying out a curing treatment for immobilizing a cholesteric alignment state after the step 2X-2 to form a cholesteric liquid crystal layer in which the cholesteric alignment state is immobilized.

That is, the cholesteric liquid crystal layer obtained by carrying out the curing treatment corresponds to a layer formed by immobilizing the cholesteric liquid crystalline phase.

Here, as the state where the cholesteric liquid crystalline phase is "immobilized", the most typical and preferred aspect is a state in which the alignment of the liquid crystal compound brought into a cholesteric liquid crystalline phase is retained. The state where the liquid crystalline phase is "immobilized" is not limited thereto, and specifically, it refers to a state in which, in a temperature range of usually 0° C. to 50° C. and in a temperature range of −30° C. to 70° C. under more severe conditions, this layer has no fluidity and can keep an immobilized alignment state stably without causing changes in alignment state due to external field or external force. In the present invention, as will be described later, it is preferable to immobilize the alignment state of a cholesteric liquid crystalline phase by a curing reaction proceeding upon irradiation with ultraviolet rays.

In the layer obtained by immobilizing a cholesteric liquid crystalline phase, it is sufficient that the optical properties of the cholesteric liquid crystalline phase are retained in the layer, and finally the composition in the layer no longer needs to show liquid crystallinity.

The method of the curing treatment is not particularly limited, and examples thereof include a photo curing treatment and a thermal curing treatment. Among them, a light irradiation treatment is preferable, and an ultraviolet irradiation treatment is more preferable. In addition, as described above, the liquid crystal compound is preferably a liquid crystal compound having a polymerizable group. In a case where the liquid crystal compound has a polymerizable group, the curing treatment is preferably a polymerization reaction upon irradiation with light (particularly ultraviolet irradiation), and more preferably a radical polymerization reaction upon irradiation with light (particularly ultraviolet irradiation).

For ultraviolet irradiation, a light source such as an ultraviolet lamp is used.

The irradiation energy amount of ultraviolet rays is not particularly limited, but it is generally preferably about 100 to 800 mJ/cm². The irradiation time of the ultraviolet rays is not particularly limited, but it may be determined as appropriate from the viewpoint of both sufficient strength and productivity of the obtained layer.

(Aspect Using Liquid Crystal Composition Containing Chiral Agent Y)

Hereinafter, a method for producing a cholesteric liquid crystal layer using a liquid crystal composition containing a chiral agent Y (hereinafter, also referred to as "step 2Y") will be described.

The production method 2Y includes at least the following step 2Y-1 and step 2Y-2.

Step 2Y-1: a step of forming a composition layer satisfying the following condition 1 or the following condition 2 on the liquid crystal layer, using a liquid crystal composition containing a chiral agent Y and a liquid crystal compound Step 2Y-2: a step of subjecting the composition layer to a cooling treatment or a heating treatment to result in cholesteric alignment of the liquid crystal compound in the composition layer, thereby forming a cholesteric liquid crystal layer Condition 1: at least a part of the liquid crystal compound in the composition layer is tilt-aligned with respect to a surface of the composition layer Condition 2: The liquid crystal compound is aligned such that a tilt angle of the liquid crystal compound in the composition layer continuously changes along a thickness direction In addition, in a case where the liquid crystal compound has a polymerizable group, in the step 2Y, it is preferable to carry out a curing treatment on the composition layer, as will be described later.

Hereinafter, the materials used in each step and the procedure of each step will be described in detail.

<<Step 2Y-1>>

The step 2Y-1 is a step of forming a composition layer satisfying the condition 1 or the condition 2 on a liquid crystal layer, using a liquid crystal composition containing a chiral agent Y and a liquid crystal compound (hereinafter, also referred to as "composition Y").

The step 2Y-1 has the same step procedure as that of the step 2X-1 described above except that the composition Y is used in place of the composition X, and thus the description thereof will be omitted.

<<<<Composition Y>>>>

The composition Y contains a liquid crystal compound and a chiral agent Y having a helical twisting power changed depending on a change of temperature. Hereinafter, each component will be described.

As described above, the absolute value of the weighted average helical twisting power of the chiral agent in the composition layer is, for example, 0.0 to 1.9 $\mu m^{-1}$, preferably 0.0 to 1.5 $\mu m^{-1}$, more preferably 0.0 to 0.5 $\mu m^{-1}$, and particularly preferably zero, from the viewpoint of easy formation of the composition layer at the temperature $T_{11}$ at which an alignment treatment of a liquid crystal compound for forming a composition layer satisfying the condition 1 or the condition 2 in the step 2Y-1 is carried out. Therefore, in a case where the chiral agent Y has a helical twisting power exceeding the predetermined range at the temperature $T_{11}$, it is preferable that the composition Y contains a chiral agent that induces a helix in a direction opposite to that of the chiral agent Y (hereinafter, also referred to as "chiral agent YA") at the temperature $T_{11}$, and the helical twisting power of the chiral agent Y is offset to almost zero in the step 2Y-1 (that is, the weighted average helical twisting power of the chiral agent in the composition layer is set to the above predetermined range). In addition, it is preferable that the chiral agent YA does not change the helical twisting power depending on a change of temperature.

In addition, in a case where the liquid crystal composition contains a plurality of chiral agents Y as the chiral agent and then in a case where the weighted average helical twisting power of the plurality of chiral agents Y is a helical twisting power outside the predetermined range at the temperature $T_{11}$, "another chiral agent YA that induces a helix in a direction opposite to that of the chiral agent Y" is intended to mean a chiral agent that induces a helix in a direction opposite to that of the weighted average helical twisting power of the plurality of chiral agents Y.

In a case where the chiral agent Y alone has no helical twisting power at the temperature $T_{11}$ and has a property of increasing a helical twisting power depending on a change of temperature, the chiral agent YA may not be used in combination therewith.

Hereinafter, various materials contained in the composition Y will be described. Of the materials contained in the composition Y, the components other than the chiral agent are the same as the materials contained in the composition X, and thus the description thereof will be omitted.

Chiral Agent Y Having a Helical Twisting Power Changed Depending on Cooling or Heating The chiral agent Y is a compound that induces a helix of a liquid crystal compound, and is not particularly limited as long as it is a chiral agent having a helical twisting power that is increased depending on cooling or heating. The term "cooling or heating" as used herein means a cooling treatment or heating treatment which is carried out in the step 2Y-1. In addition, the upper limit of the cooling or heating temperature is usually about ±150° C. (in other words, a chiral agent whose helical twisting power is increased depending on cooling or heating within ±150° C. is preferable). Above all, a chiral agent whose helical twisting power is increased depending on cooling is preferable.

The chiral agent Y may be liquid crystalline or non-liquid crystalline. The chiral agent can be selected from various known chiral agents (for example, chiral agents described in Liquid Crystal Device Handbook, Chap. 3, Item 4-3, Chiral Agents for Twisted Nematic (TN) and Super Twisted Nematic (STN), p. 199, edited by the 142nd Committee of the Japan Society for the Promotion of Science, 1989). The chiral agent Y generally contains an asymmetric carbon atom. However, an axially asymmetric compound or planarly asymmetric compound not containing an asymmetric carbon atom can also be used as the chiral agent Y. Examples of the axially asymmetric compound or planarly asymmetric compound include binaphthyl, helicene, paracyclophane, and derivatives thereof. The chiral agent Y may have a polymerizable group.

Above all, from the viewpoint that the difference in the helical twisting power after a change of temperature is large, the chiral agent Y is preferably an isosorbide-based optically active compound, an isomannide-based optically active compound, or a binaphthol-based optically active compound, and more preferably a binaphthol-based optically active compound.

The total content of the chiral agent in the composition Y (the total content of all chiral agents in the composition Y) is preferably 2.0% by mass or more and more preferably 3.0% by mass or more with respect to the total mass of the liquid crystal compound. In addition, from the viewpoint of suppressing the haze of the cholesteric liquid crystal layer, the upper limit of the total content of the chiral agent in the composition X is preferably 15.0% by mass or less and more preferably 12.0% by mass or less with respect to the total mass of the liquid crystal compound.

A smaller amount of the chiral agent Y used is preferred because it tends not to affect the liquid crystallinity. Therefore, the chiral agent Y is preferably a compound having a strong twisting power in order that the compound could achieve twisted alignment of a desired helical pitch even in a case where the amount thereof used is small.

Chiral Agent YA

The chiral agent YA is preferably a chiral agent which is a compound that induces a helix of a liquid crystal compound and has a helical twisting power (HTP) that is not changed depending on a change of temperature.

In addition, the chiral agent YA may be liquid crystalline or non-liquid crystalline. The chiral agent XA generally contains an asymmetric carbon atom. However, an axially asymmetric compound or planarly asymmetric compound not containing an asymmetric carbon atom can also be used as the chiral agent YA. The chiral agent YA may have a polymerizable group.

A known chiral agent can be used as the chiral agent YA.

In a case where the liquid crystal composition contains one type of the chiral agent Y alone and the chiral agent Y has a helical twisting power exceeding a predetermined range (for example, 0.0 to 1.9 $\mu m^{-1}$) at the temperature $T_{11}$, the chiral agent YA is preferably a chiral agent that induces a helix in a direction opposite to that of the above-mentioned chiral agent Y. That is, for example, in a case where the helix induced by the chiral agent Y is right-handed, the helix induced by the chiral agent YA is left-handed.

In addition, in a case where the liquid crystal composition contains a plurality of chiral agents Y as the chiral agent and then the weighted average helical twisting power of the plurality of chiral agents Y exceeds the above-mentioned predetermined range at the temperature $T_1$, the chiral agent YA is preferably a chiral agent that induces a helix in a direction opposite to that of the above-mentioned weighted average helical twisting power.

<<Step 2Y-2>>

The step 2Y-2 is a step in which the composition layer obtained in the step 2Y-1 is subjected to a cooling treatment or a heating treatment to change the helical twisting power of the chiral agent Y, and the liquid crystal compound in the composition layer is cholesterically aligned to form a cholesteric liquid crystal layer. Above all, it is preferable to cool the composition layer in the present step.

In a case where the composition layer is cooled, it is preferable to cool the composition layer such that the temperature of the composition layer is lowered by 30° C. or more, from the viewpoint that the reflection anisotropy of the cholesteric liquid crystal layer is more excellent. Above all, from the viewpoint that the above effect is more excellent, it is preferable to cool the composition layer such that the temperature of the composition layer is lowered by 40° C. or more, and it is more preferable to cool the composition layer such that the temperature of the composition layer is lowered by 50° C. or more. The upper limit value of the reduced temperature range of the cooling treatment is not particularly limited, but is usually about 150° C.

In addition, in other words, the cooling treatment is intended to cool the composition layer such that the temperature of the composition layer becomes T–30° C. or lower, in a case where the temperature of the composition layer satisfying the condition 1 or the condition 2 obtained in the step 1 before cooling of the composition layer is T° C. (that is, $T_{12} \leq T_{11} - 30°$ C. in a case of an aspect shown in FIG. 17).

The cooling method is not particularly limited and may be, for example, a method in which a liquid crystal layer on which the composition layer is disposed[[arranged is allowed to stand in an atmosphere of a predetermined temperature.

Although there is no limitation on the cooling rate in the cooling treatment, it is preferable to set the cooling rate to a certain rate from the viewpoint that the reflection anisotropy of the cholesteric liquid crystal layer is more excellent.

Specifically, the maximum value of the cooling rate in the cooling treatment is preferably 1° C. or more per second, more preferably 2° C. or more per second, and still more preferably 3° C. or more per second. The upper limit of the cooling rate is not particularly limited and is often 10° C. or less per second.

Here, in the production method of the present invention, in a case where the composition layer is exposed to wind, the surface state of the cholesteric liquid crystal layer to be formed may be uneven. Considering this point, in the method for producing a cholesteric liquid crystal layer according to the embodiment of the present invention, it is preferable that the wind speed of the environment to which the composition layer is exposed is low in all steps of the step 2Y. Specifically, in the production method of the present invention, the wind speed of the environment to which the composition layer is exposed is preferably 1 m/s or less in all steps of the step 2Y.

In a case where the composition layer is heated, the upper limit value of the increased temperature range of the heating treatment is not particularly limited, but is usually about 150° C.

<<Curing Treatment>>

In addition, in a case where the liquid crystal compound has a polymerizable group, it is preferable to carry out a curing treatment on the composition layer. The procedure for carrying out the curing treatment on the composition layer is the same as in the method described in the production method 2X, and a suitable aspect thereof is also the same.

EXAMPLES

Hereinafter, the present invention will be described in more detail with reference to Examples. The materials, the used amount, the ratio, the contents of a treatment, and the procedures of a treatment described in Examples below may be suitably modified without departing from the spirit of the present invention. Accordingly, the scope of the present invention should not be limitatively interpreted by Examples described below.

[Various Components]

Hereinafter, first, various components used in Examples and Comparative Examples will be described.

<Chiral Agent A>

(Synthesis of Compound CD-1)

The compound CD-1 was synthesized by a general method according to the following synthetic procedure.

The compound CD-1 is a chiral agent whose helical direction is left-handed and whose helical twisting power is not changed depending on a change of temperature or irradiation with light.

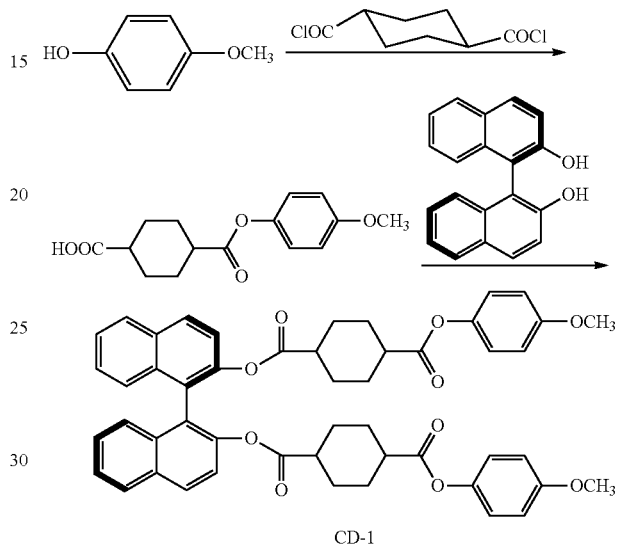

CD-1

(Synthesis of Compound CD-2)

The following compound CD-2 used was synthesized according to JP2002-338575A. The compound CD-2 is a chiral agent whose helical direction is right-handed and whose helical twisting power is changed depending on irradiation with light (which corresponds to the chiral agent X).

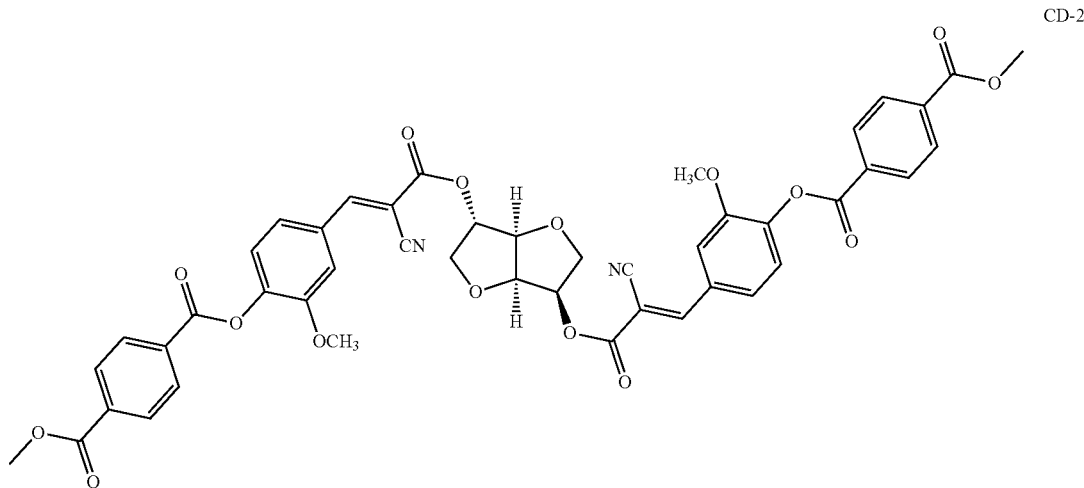

<Disk-Like Liquid Crystal Compound>
(Disk-Like Liquid Crystal Compound D-1)
As the disk-like liquid crystal compound, the following disk-like liquid crystal compound D-1 described in JP2007-131765A was used.

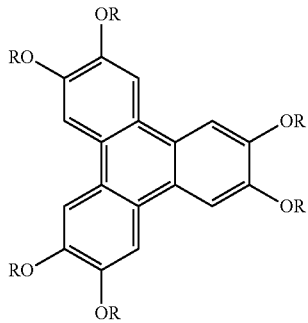

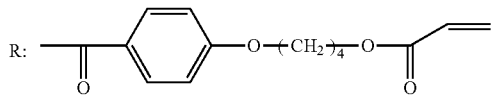

<Surfactant>
(Surfactant S-1)
Surfactant S-1 was used as the surfactant.
The surfactant S-1 is a compound described in JP5774518B and has the following structure.

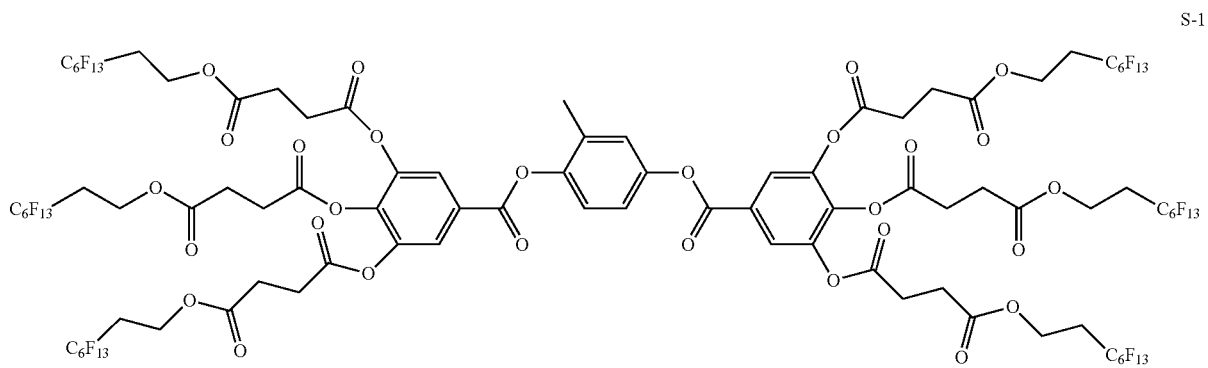

Example 1

(Formation of alignment film)
A glass substrate was prepared as a support. The following coating liquid for forming an alignment film was applied onto a support at 2500 rpm for 30 seconds using a spin coater. The support on which the coating film of the coating liquid for forming an alignment film was formed was dried on a hot plate at 60° C. for 60 seconds to form an alignment film.

Coating liquid for forming an alignment film

|  |  |
| --- | --- |
| Material for photo-alignment shown below | 1.00 parts by mass |
| Water | 16.00 parts by mass |
| Butoxyethanol | 42.00 parts by mass |
| Propylene glycol monomethyl ether | 42.00 parts by mass |

—Material for Photoalignment—

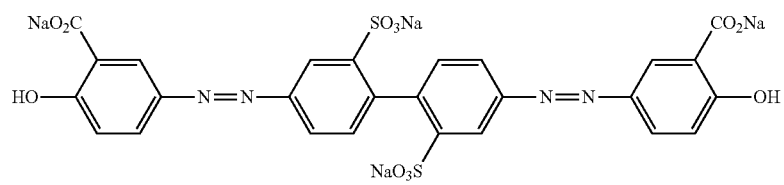

(Exposure of Photoalignment Layer to Light)

The photoalignment layer was exposed to light using the exposure device shown in FIG. 19 to form a photoalignment layer having an alignment pattern.

In the exposure device, a laser that emits laser light having a wavelength (325 nm) was used. The exposure amount in terms of the interfered light was set to 300 mJ/cm². The length $G_1$ of one period of the periodic pattern formed by the interference between the two laser beams was controlled by changing the intersecting angle (intersecting angle α) of the two lights and the tilt angle (tilt angle β) of the substrate. The intersecting angle α was set to 42 degrees and the tilt angle β was set to 42 degrees in order to set the length $G_1$ of one period of the periodic pattern to 0.61 μm and to give the alignment film a tilt angle in an oblique direction.

(Preparation of Liquid Crystal Layer 1)

Next, 30 μL of the following sample solution was applied by spin coating onto the exposure surface of the photoalignment layer under the conditions of a rotation speed of 3000 rpm for 10 seconds, followed by aging at 120° C. for 1 minute. Subsequently, the coating film was cured by irradiation with UV (ultraviolet ray) at an irradiation amount of 500 mJ/cm² in a nitrogen atmosphere at 30° C. to obtain a liquid crystal layer.

Sample Solution

| | |
|---|---|
| Compound D-1 | 100 parts by mass |
| Initiator IRG-907 (manufactured by BASF SE) | 3.0 parts by mass |
| Solvent (methyl ethyl ketone (MEK)/cyclohexanone = 90/10 (mass ratio)) | added to make a solute concentration of 10% by mass |

<Production of Cholesteric Liquid Crystal Layer>

(Preparation of Sample Solution)

A sample solution having the following composition was prepared.

| | |
|---|---|
| Liquid crystalline compound LC-1 represented by the following structure | 100 parts by mass |
| Surfactant S-1 | 0.1 parts by mass |
| Compound CD-1 | 5.5 parts by mass |
| Compound CD-2 | 5.5 parts by mass |
| Initiator IRG-907 (manufactured by BASF SE) | 2.0 parts by mass |
| Solvent (methyl ethyl ketone (MEK)/cyclohexanone = 90/10 (mass ratio)) | added to make a solute concentration of 30% by mass |

(Measurement of Weighted Average Helical Twisting Power)

After the solvent of the sample solution was distilled off, the helical pitch was measured by a trial wedge method (Liquid Crystal Handbook, published by Maruzen, pp. 196 to 197), and the helical twisting power was calculated from Expression (1A).

The helical twisting power calculated by the above-mentioned method also matches the weighted average helical twisting power obtained from Expression (1C). The weighted average helical twisting power at this time was 0 $\mu m^{-1}$.

(Preparation of Cholesteric Liquid Crystal Layer)

Next, 40 μL of the sample solution was applied by spin coating onto the liquid crystal layer under the conditions of a rotation speed of 1500 rpm for 10 seconds to form a composition layer, and then the composition layer was aged at 90° C. for 1 minute. Subsequently, the composition layer after aging was ultraviolet-irradiated with 365 nm light from a light source (2UV TRANSILLUMINATOR, manufactured by UVP, LLC) at an irradiation intensity of 2 mW/cm² and at 30° C. for 60 seconds. This was followed by UV (ultraviolet ray) irradiation at an irradiation amount of 500 mJ/cm² in a nitrogen atmosphere at 30° C. to carry out a polymerization reaction of the liquid crystal compound, thereby obtaining a cholesteric liquid crystal layer in which a cholesteric alignment state was immobilized.

Through the above steps, a liquid crystal diffraction element having a liquid crystal layer and a cholesteric liquid crystal layer disposed on the liquid crystal layer was prepared.

The following evaluations were carried out on the cholesteric liquid crystal layer in the obtained liquid crystal diffraction element.

(Cross-Sectional SEM Observation)

As a result of cross-sectional SEM observation (cross-sectional SEM micrograph) of the cholesteric liquid crystal layer, it was confirmed that the arrangement directions of the bright portions and the dark portions derived from the cholesteric liquid crystalline phase are tilted in one direction with respect to both main surfaces of the cholesteric liquid crystal layer (the interface side surface with the liquid crystal layer and the air interface side surface).

(Measurement of Tilt Angle)

The cholesteric liquid crystal layer was cut with a microtome, and the cross section thereof was observed by a polarization microscope to measure the tilt angle of the disk-like liquid crystal compound present on the surface of the liquid crystal layer in contact with the cholesteric liquid

LC-1

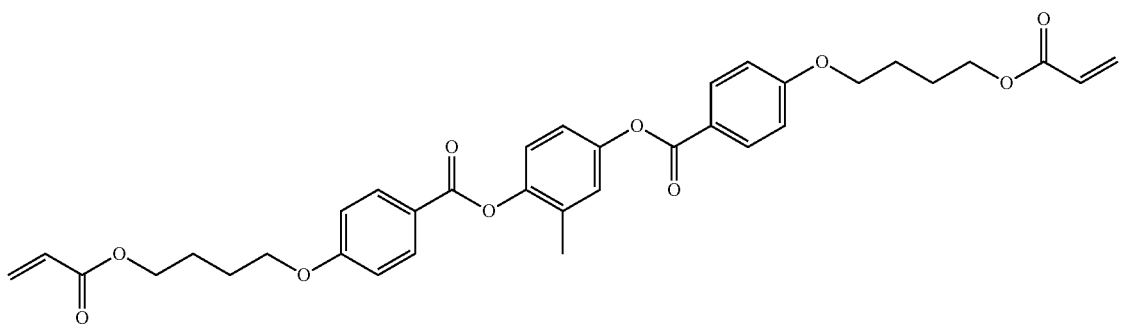

crystal layer and the average tilt angle of the liquid crystal compound in the cholesteric liquid crystal layer.

In the liquid crystal layer, the disk-like liquid crystal compound present on the surface on the side in contact with the cholesteric liquid crystal layer was present in an alternate manner of a disk-like liquid crystal compound tilted by 40° with respect to the surface of the liquid crystal layer on the cholesteric liquid crystal layer side and a non-tiled disk-like liquid crystal compound. In addition, the liquid crystal compound in the cholesteric liquid crystal layer was tilted by 20° with respect to the main surface of the cholesteric liquid crystal layer.

(Measurement of Arrangement of Molecular Axes)

Only the cholesteric liquid crystal layer was peeled from the liquid crystal diffraction element, and the molecular axis pattern on the surface thereof was observed by observation with a reflection polarization microscope. In a case of being observed from both main surfaces of the cholesteric liquid crystal layer, periodic bright and dark lines derived from the arrangement of molecular axes were observed. The period was very stable in the plane, and there was almost no fluctuation thereof at the interface on the substrate side and the interface on the air side.

Furthermore, it was confirmed that the molecular axis continuously rotates along one in-plane direction since the bright and dark lines continuously move by rotating a polarizer in the observation with a reflection polarization microscope. At this time, the in-plane period of the periodic bright and dark lines was 0.61 μm, and the period of the bright and dark lines in a vertical direction was 0.42 μm.

Comparative Example 1

A cholesteric liquid crystal layer Y was prepared by the method described in Example 1 of JP2006-317656A. Similarly, in a case where the molecular axis pattern on the surface was observed by reflection polarization microscope observation, tilted bright and dark lines were observed, but the period thereof was unstable in the plane and showed large fluctuation at the substrate side interface and the air side interface.

[Evaluation]

Each of the prepared liquid crystal diffraction elements was incorporated into an AR image display apparatus to evaluate the image clearness.

A light guide plate with a liquid crystal diffraction element was prepared for an AR image display apparatus. As an incident diffraction element and an emission diffraction element, those diffraction elements obtained by transferring the prepared cholesteric liquid crystal layer were used. The incident diffraction element and the emission diffraction element were disposed so as to be spaced from each other in a plane direction. At this time, the cholesteric layers were disposed so that the tilt angles of the cholesteric layers faced each other and transferred to the same surface of the light guide plate. In this manner, the light incident on the incident diffraction element from the air layer is diffracted at an angle that totally reflects inside the light guide plate, and after repeating total reflection inside the light guide plate to guide the light, it is diffracted by the emission diffraction element into the air layer and emitted. An AR image display apparatus was prepared by disposing a projection display used in a Vuzix Blade on the light guide plate so as to irradiate an image toward an incident diffraction element.

An image was displayed using the prepared image display apparatus, and the image display clearness was evaluated.

As a result of the evaluation, it was confirmed that Example 1 can display a clear image as an AR image display apparatus.

On the other hand, in Comparative Example 1, only unclear light was observed, and the image was hardly visually recognized.

The effect of the present invention is clear from the above results.

EXPLANATION OF REFERENCES

10, 20, 30, 40: cholesteric liquid crystal layer
11, 12, 13, 21, 22, 23, 41, 42, 43: main surface
14, 24, 44: liquid crystal compound
$L_1, L_2, L_4, L_5$: molecular axis
$D_1, D_2$: arrangement axis
$\theta_2, \theta_5, \theta_{10}, \theta_{a1}, \theta_{a2}, \theta_{a3}, \theta_{b1}, \theta_{b2}, \theta_{b3}$: angle
$C_1, C_2, C_3$: helical axis derived from cholesteric liquid crystalline phase
$T_1, T_2, T_3$: reflecting surface
15, 25: bright portion
16, 26, 36: dark portion
18a, 18b: disk-like liquid crystal compound
$P_1, P_2$: arrangement direction in which bright portions and dark portions are alternately arranged
50: liquid crystal diffraction element
60: exposure device
62: laser light source
64: light source
68: beam splitter
70A, 70B: mirror
100: composition layer
102, 120: liquid crystal layer
104: photoalignment layer
104a, 104b: region
32, 110: alignment film
122a, 122b: rod-like liquid crystal compound
$T_{11}$: temperature at which alignment treatment of liquid crystal compound is carried out in step 2-1 (step 2Y-1)
$T_{12}$: temperature at which cooling treatment of step 2-2 (step 2Y-2) is carried out
$G_1$: length of one period

What is claimed is:

1. A liquid crystal diffraction element comprising:
an alignment film having a periodic pattern in an alignment treatment direction at least in a part of a plane, and
a cholesteric liquid crystal layer formed of a liquid crystal compound on the alignment film,
wherein, in the alignment film, alignment elements having different tilt angles, which are angles with respect to a main surface of the alignment film, are periodically arranged, or azimuth directions of the alignment elements are arranged to swing along one in-plane direction such that the periodic pattern is imparted to the alignment film,
in at least one main surface out of a pair of main surfaces of the cholesteric liquid crystal layer, a direction of a molecular axis of the liquid crystal compound changes while continuously rotating along at least one in-plane direction in the cholesteric liquid crystal layer,
the molecular axis of the liquid crystal compound is tilted with respect to the main surface of the cholesteric liquid crystal layer, and
an arrangement direction of bright portion and dark portion derived from a cholesteric liquid crystalline phase, as observed by a scanning electron microscope in a cross section perpendicular to the main surface, is tilted with respect to the main surface of the cholesteric liquid crystal layer.

2. The liquid crystal diffraction element according to claim 1,
wherein the alignment film has a liquid crystal layer containing a liquid crystal compound, and
the liquid crystal compound in the liquid crystal layer is the alignment element.

3. The liquid crystal diffraction element according to claim 2,
wherein the liquid crystal compound contained in the liquid crystal layer is a disk-like liquid crystal compound.

4. The liquid crystal diffraction element according to claim 1,
wherein the period of a periodic pattern of the alignment film is 0.1 µm to 5 µm.

5. The liquid crystal diffraction element according to claim 1,
wherein one period of the periodic pattern of the alignment film is asymmetric in a periodic direction.

6. A method for producing a liquid crystal diffraction element according to claim 1, comprising:
an alignment film forming step of forming an alignment film having alignment elements, in which the alignment elements having different tilt angles are periodically arranged, or the alignment elements are arranged so that an azimuth direction of a molecular axis of the alignment element swings along one in-plane direction; and
a cholesteric liquid crystal layer forming step of forming a cholesteric liquid crystal layer on the alignment film, using a liquid crystal composition containing a liquid crystal compound,
wherein the liquid crystal composition contains two or more chiral agents,
at least one of the chiral agents is any chiral agent selected from the group consisting of a chiral agent X whose helical twisting power changes upon irradiation with light and a chiral agent Y whose helical twisting power changes upon a change of temperature, and
in the cholesteric liquid crystal layer forming step, in a case where the liquid crystal composition contains the chiral agent X, a light irradiation treatment is carried out to cholesterically align the liquid crystal compound, and in a case where the liquid crystal composition contains the chiral agent Y, a cooling treatment or a heat treatment is carried out to cholesterically align the liquid crystal compound.

7. The method for producing a liquid crystal diffraction element according to claim 6,
wherein the alignment film forming step includes an alignment treatment step of forming a photo-alignment film for forming the alignment elements on the surface, and
in the alignment treatment step, light emitted from two different directions are allowed to interfere with each other to carry out an alignment treatment.

8. The liquid crystal diffraction element according to claim 2,
wherein the period of a periodic pattern of the alignment film is 0.1 µm to 5 µm.

9. The liquid crystal diffraction element according to claim 2,
wherein one period of the periodic pattern of the alignment film is asymmetric in a periodic direction.

10. A method for producing a liquid crystal diffraction element according to claim 2, comprising:
an alignment film forming step of forming an alignment film having alignment elements, in which the alignment elements having different tilt angles are periodically arranged, or the alignment elements are arranged so that an azimuth direction of a molecular axis of the alignment element swings along one in-plane direction; and
a cholesteric liquid crystal layer forming step of forming a cholesteric liquid crystal layer on the alignment film, using a liquid crystal composition containing a liquid crystal compound,
wherein the liquid crystal composition contains two or more chiral agents,
at least one of the chiral agents is any chiral agent selected from the group consisting of a chiral agent X whose helical twisting power changes upon irradiation with light and a chiral agent Y whose helical twisting power changes upon a change of temperature, and
in the cholesteric liquid crystal layer forming step, in a case where the liquid crystal composition contains the chiral agent X, a light irradiation treatment is carried out to cholesterically align the liquid crystal compound, and in a case where the liquid crystal composition contains the chiral agent Y, a cooling treatment or a heat treatment is carried out to cholesterically align the liquid crystal compound.

11. The method for producing a liquid crystal diffraction element according to claim 10,
wherein the alignment film forming step includes an alignment treatment step of forming a photo-alignment film for forming the alignment elements on the surface, and
in the alignment treatment step, light emitted from two different directions are allowed to interfere with each other to carry out an alignment treatment.

12. The liquid crystal diffraction element according to claim 3,
wherein the period of a periodic pattern of the alignment film is 0.1 µm to 5 µm.

13. The liquid crystal diffraction element according to claim 3,
wherein one period of the periodic pattern of the alignment film is asymmetric in a periodic direction.

14. A method for producing a liquid crystal diffraction element according to claim 3, comprising:
an alignment film forming step of forming an alignment film having alignment elements, in which the alignment elements having different tilt angles are periodically arranged, or the alignment elements are arranged so that an azimuth direction of a molecular axis of the alignment element swings along one in-plane direction; and
a cholesteric liquid crystal layer forming step of forming a cholesteric liquid crystal layer on the alignment film, using a liquid crystal composition containing a liquid crystal compound,
wherein the liquid crystal composition contains two or more chiral agents,
at least one of the chiral agents is any chiral agent selected from the group consisting of a chiral agent X whose helical twisting power changes upon irradiation with light and a chiral agent Y whose helical twisting power changes upon a change of temperature, and
in the cholesteric liquid crystal layer forming step, in a case where the liquid crystal composition contains the chiral agent X, a light irradiation treatment is carried out to cholesterically align the liquid crystal compound, and in a case where the liquid crystal composition contains the chiral agent Y, a cooling treatment or a heat treatment is carried out to cholesterically align the liquid crystal compound.

15. The method for producing a liquid crystal diffraction element according to claim 14,
   wherein the alignment film forming step includes an alignment treatment step of forming a photo-alignment film for forming the alignment elements on the surface, and
   in the alignment treatment step, light emitted from two different directions are allowed to interfere with each other to carry out an alignment treatment.

16. The liquid crystal diffraction element according to claim 4,
   wherein one period of the periodic pattern of the alignment film is asymmetric in a periodic direction.

17. A method for producing a liquid crystal diffraction element according to claim 4, comprising:
   an alignment film forming step of forming an alignment film having alignment elements, in which the alignment elements having different tilt angles are periodically arranged, or the alignment elements are arranged so that an azimuth direction of a molecular axis of the alignment element swings along one in-plane direction; and
   a cholesteric liquid crystal layer forming step of forming a cholesteric liquid crystal layer on the alignment film, using a liquid crystal composition containing a liquid crystal compound,
   wherein the liquid crystal composition contains two or more chiral agents,
   at least one of the chiral agents is any chiral agent selected from the group consisting of a chiral agent X whose helical twisting power changes upon irradiation with light and a chiral agent Y whose helical twisting power changes upon a change of temperature, and
   in the cholesteric liquid crystal layer forming step, in a case where the liquid crystal composition contains the chiral agent X, a light irradiation treatment is carried out to cholesterically align the liquid crystal compound, and in a case where the liquid crystal composition contains the chiral agent Y, a cooling treatment or a heat treatment is carried out to cholesterically align the liquid crystal compound.

18. The method for producing a liquid crystal diffraction element according to claim 17,
   wherein the alignment film forming step includes an alignment treatment step of forming a photo-alignment film for forming the alignment elements on the surface, and
   in the alignment treatment step, light emitted from two different directions are allowed to interfere with each other to carry out an alignment treatment.

19. A method for producing a liquid crystal diffraction element according to claim 5, comprising:
   an alignment film forming step of forming an alignment film having alignment elements, in which the alignment elements having different tilt angles are periodically arranged, or the alignment elements are arranged so that an azimuth direction of a molecular axis of the alignment element swings along one in-plane direction; and
   a cholesteric liquid crystal layer forming step of forming a cholesteric liquid crystal layer on the alignment film, using a liquid crystal composition containing a liquid crystal compound,
   wherein the liquid crystal composition contains two or more chiral agents,
   at least one of the chiral agents is any chiral agent selected from the group consisting of a chiral agent X whose helical twisting power changes upon irradiation with light and a chiral agent Y whose helical twisting power changes upon a change of temperature, and
   in the cholesteric liquid crystal layer forming step, in a case where the liquid crystal composition contains the chiral agent X, a light irradiation treatment is carried out to cholesterically align the liquid crystal compound, and in a case where the liquid crystal composition contains the chiral agent Y, a cooling treatment or a heat treatment is carried out to cholesterically align the liquid crystal compound.

20. The method for producing a liquid crystal diffraction element according to claim 19,
   wherein the alignment film forming step includes an alignment treatment step of forming a photo-alignment film for forming the alignment elements on the surface, and
   in the alignment treatment step, light emitted from two different directions are allowed to interfere with each other to carry out an alignment treatment.

\* \* \* \* \*